（12) United States Patent
Cai et al.

(10) Patent No.: US 8,948,158 B2
(45) Date of Patent: Feb. 3, 2015

(54) METHODS OF MULTIPLE POINT HSDPA TRANSMISSION IN SINGLE OR DIFFERENT FREQUENCIES

(71) Applicant: InterDigital Patent Holdings, Inc., Wilmington, DE (US)

(72) Inventors: Lujing Cai, Morganville, NJ (US); Diana Pani, Montreal (CA); Joseph S. Levy, Merrick, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 154 days.

(21) Appl. No.: 13/668,069

(22) Filed: Nov. 2, 2012

(65) Prior Publication Data

US 2013/0114577 A1    May 9, 2013

Related U.S. Application Data

(60) Provisional application No. 61/555,882, filed on Nov. 4, 2011, provisional application No. 61/589,244, filed on Jan. 20, 2012, provisional application No. 61/611,829, filed on Mar. 16, 2012, provisional application No. 61/644,570, filed on May 9, 2012.

(51) Int. Cl.
*H04W 56/00* (2009.01)
*H04W 72/04* (2009.01)
*H04W 72/12* (2009.01)

(52) U.S. Cl.
CPC ................ *H04W 56/0045* (2013.01)
USPC ............ 370/350; 370/336; 370/503

(58) Field of Classification Search
USPC ......... 370/336, 345, 350, 503, 504, 508, 509, 370/510
See application file for complete search history.

(56) References Cited

U.S. PATENT DOCUMENTS 8,477,734 B2 *   7/2013   Sambhwani et al. ......... 370/332
8,514,820 B2 *   8/2013   Cai et al. ..................... 370/336
(Continued)

FOREIGN PATENT DOCUMENTS

JP        2011142516 A *  7/2011
WO     WO 2009/020876 A1   2/2009
(Continued)

OTHER PUBLICATIONS

3rd Generation Partnership Project (3GPP), R1-091599, "HS-DPCCH design for DC-HSDPA and MIMO", Qualcomm Europe, 3GPP TSG-RAN WG1 #56bis, Seoul, South Korea, Mar. 23-27, 2009, 21 pages.

(Continued)

*Primary Examiner* — Ahmed Elallam
(74) *Attorney, Agent, or Firm* — Condo Roccia Koptiw LLP

(57) ABSTRACT

Disclosed herein are methods and systems for uplink control feedback design in relation to the high speed dedicated physical control channel (HS-DPCCH). First uplink data may be transmitted on a HS-DPCCH to a first serving cell and a second serving cell, where the first serving cell may be used as a timing reference cell for the uplink transmission. The first serving cell may be associated with a first NodeB and the second serving cell may be associated with a second NodeB. First downlink data may be received from the first serving cell and second downlink data may be received from the second serving cell. A timing reference for uplink transmission may be changed such that the second serving cell may be used as the timing reference cell. Second uplink data may be transmitted on the HS-DPCCH using the second serving cell as the timing reference cell.

28 Claims, 51 Drawing Sheets

(56) References Cited

U.S. PATENT DOCUMENTS

| | | | | |
|---|---|---|---|---|
| 8,718,015 | B2* | 5/2014 | Cheng et al. | 370/331 |
| 8,780,792 | B2* | 7/2014 | Obuchi et al. | 370/328 |
| 2006/0133323 | A1* | 6/2006 | Obuchi et al. | 370/335 |
| 2008/0159427 | A1 | 7/2008 | Kang et al. | |
| 2008/0161003 | A1 | 7/2008 | Brueck et al. | |
| 2009/0196192 | A1 | 8/2009 | Lim et al. | |
| 2010/0061284 | A1 | 3/2010 | Chen et al. | |
| 2010/0323746 | A1 | 12/2010 | Zhang et al. | |
| 2010/0331035 | A1 | 12/2010 | Bark et al. | |
| 2011/0014875 | A1 | 1/2011 | Chao et al. | |
| 2011/0098076 | A1 | 4/2011 | Kim et al. | |
| 2011/0199990 | A1 | 8/2011 | Chang et al. | |
| 2012/0263068 | A1 | 10/2012 | Morimoto et al. | |

FOREIGN PATENT DOCUMENTS

| | | |
|---|---|---|
| WO | WO 2009/120797 A1 | 10/2009 |
| WO | WO 2011/140504 A1 | 11/2011 |

OTHER PUBLICATIONS

3rd Generation Partnership Project (3GPP), R1-104157, "On deploying DC-HSDPA UEs in Single Frequency Networks", Qualcomm Incorporated, 3GPP TSG RAN WG1 Meeting #61-bis, Dresden, Germany, Jun. 29-Jul. 2, 2010, 13 pages.

3rd Generation Partnership Project (3GPP), R1-104383, "Discussion on SFDC-HSDPA", Alcatel-Lucent, Alcatel-Lucent Shanghai Bell, 3GPP TSG-RAN WG1 Meeting #62, Madrid, Spain, Aug. 23-27, 2010, 3 pages.

3rd Generation Partnership Project (3GPP), R1-104913, "Multi-cell transmission techniques for HSDPA", NSN, Nokia, 3GPP TSG-RAN WG1 Meeting #62, Madrid, Espana, Aug. 23-27, 2010, 10 pages.

3rd Generation Partnership Project (3GPP), RP-101439, "Proposed study item on HSDPA multipoint transmission", Nokia Siemens Networks, 3GPP TSG RAN Meeting #50, Dec. 7-10, 2010, 5 pages.

3rd Generation Partnership Project (3GPP), RP-111207, "HSDPA Multipoint Transmission", 3GPP TR 25.872 V2.0.0, TSG RAN Meeting #53, Sep. 2011, 29 pages.

3rd Generation Partnership Project (3GPP), RP-111375, "HSDPA Multiflow Data Transmission", Qualcomm Inc, Orange, Nokia Siemens Networks, Ericsson, ST-Ericsson, T-Mobile USA, Alcatel-Lucent, Huawei, 3GPP TSG RAN Meeting #53, Sep. 13-16, 2011, 7 pages.

3rd Generation Partnership Project (3GPP), TS 25.211 V10.0.0, "3rd Generation Partnership Project; Technical Specification Group Radio Access Network; Physical channels and mapping of transport channels onto physical channels (FDD) (Release 10)", Sep. 2010, 58 pages.

3rd Generation Partnership Project (3GPP), TS 25.212 V10.0.0, "3rd Generation Partnership Project; Technical Specification Group Radio Access Network; Multiplexing and channel coding (FDD) (Release 10)", Sep. 2010, 114 pages.

3rd Generation Partnership Project (3GPP), TS 25.213 V10.0.0, "3rd Generation Partnership Project; Technical Specification Group Radio Access Network; Spreading and modulation (FDD) (Release 10)", Sep. 2010, 39 pages.

3rd Generation Partnership Project (3GPP), TS 25.214 V10.0.0, "3rd Generation Partnership Project; Technical Specification Group Radio Access Network; Physical layer procedures (FDD) (Release 10)", Sep. 2010, 99 pages.

3rd Generation Partnership Project (3GPP), TS 25.402 V10.0.0, "3rd Generation Partnership Project; Technical Specification Group Radio Access Network; Synchronisation in UTRAN Stage 2 (Release 10)", Mar. 2011, 51 pages.

3rd Generation Partnership Project (3GPP), TS 25.402 V10.1.0, "3rd Generation Partnership Project; Technical Specification Group Radio Access Network; Synchronisation in UTRAN Stage 2 (Release 10)", Jun. 2011, 51 pages.

3rd Generation Partnership Project (3GPP), R1-112983, "Considerations on Uplink for Introducing Multiflow Data Transmission", Huawei, HiSilicon, 3GPP TSG-RAN WG1 Meeting #66bis, Zhuhai, China, Oct. 10-14, 2011, 1-5.

* cited by examiner

METHODS OF MULTIPLE POINT HSDPA TRANSMISSION IN SINGLE OR DIFFERENT FREQUENCIES

CROSS-REFERENCE TO RELATED APPLICATIONS

This application claims the benefit of U.S. Provisional Patent Application No. 61/555,882, filed Nov. 4, 2011, U.S. Provisional Patent Application No. 61/589,244, filed Jan. 20, 2012, U.S. Provisional Patent Application No. 61/611,829, filed Mar. 16, 2012, and U.S. Provisional Patent Application No. 61/644,570, filed May 9, 2012, the contents of which are hereby incorporated by reference herein.

BACKGROUND

Multiple Point High-Speed Downlink Packet Access (MP-HSDPA) may have the potential to improve user experience at the cell edge of a wireless network. MP-HSDPA may be implemented in a number of ways depending on how the downlink transmission from the cell is collaborated.

MP-HSDPA technologies may rely on coordinated network scheduling that may allow data packets to be aggregated or switched between different cells. Current MP-HSDPA implementations may have problems.

SUMMARY

Disclosed herein are methods and systems for HSDPA multipoint transmissions operating in the same and/or different frequencies. Methods and systems are disclosed that may address uplink control feedback in relation to the high speed dedicated physical control channel (HS-DPCCH). Methods and systems are disclosed that may address cell transmission timing misalignment, transmission quality assured by independent power control of different HS-DPCCH fields or channels, and cubic metric performance. Methods and systems are disclosed that may address aspects related to HS-DPCCH design, such as methods of HARQ timing budget allocation between a wireless transmit/receive unit (WTRU) and NodeB when cell timing misalignment occurs and cell deactivation restriction to reduce complexity of configuring HS-DPCCH.

A wireless transmit/receive unit (WTRU) may include a processor that may be configured to transmit first uplink data on a high speed dedicated physical control channel (HS-DPCCH) to a first serving cell and a second serving cell, where the first serving cell may be used as a timing reference cell. The first serving cell may be associated with a first NodeB and the second serving cell may be associated with a second NodeB. The processor may be configured to receive first downlink data from the first serving cell and second downlink data from the second serving cell. A subframe of the first downlink data may be offset from a subframe of the second downlink data. The processor may be configured to receive the second downlink data prior to the first downlink data. The processor may be configured to change a timing reference for uplink transmission such that the second serving cell may be the timing reference cell (e.g., in response to the second downlink data being received prior to the first downlink data). The processor may not change a dedicated physical control channel (DPCCH) when changing the timing reference for uplink transmission. The processor may be configured to transmit uplink data on the HS-DPCCH to the first serving cell and the second serving cell using the second serving cell as the timing reference cell. The first uplink data and the second uplink data may include one or more of a HARQ-ACK, a HARQ-NACK, or CQI data.

The processor may be configured to pair a subframe of the first downlink data with a subframe of the second downlink data such that there may be a maximized overlap (e.g., a substantially maximized overlap) between the subframe of the first downlink data and the subframe of the second downlink data. Prior to changing the timing reference, the processor may be configured to receive a paired subframe of the second serving cell prior to a paired subframe of the first serving cell.

The first uplink data and the second uplink data may include first serving cell data and second serving cell data. The processor may be configured to allocate the first serving cell data and the second serving cell data into separate fields of the HS-DPCCH based on destination. The separate fields may have different transmit power.

Reception of data on a primary common control physical channel (P-CCPCH) of the timing reference cell may serve as a reference for the WTRU for timing of a transmission of uplink data on the HS-DPCCH. The processor may be configured to change the timing reference for uplink transmission based on an offset of the first downlink data or the second downlink data.

BRIEF DESCRIPTION OF THE DRAWINGS

A more detailed understanding may be had from the following description, given by way of example in conjunction with the accompanying drawings.

DETAILED DESCRIPTION

In response to increasing demand in terms of higher peak data rate and better user experience from end users, wireless communication systems, such as those involving WCDMA technologies, have been evolving. Simultaneous use of multiple (e.g., two) HSDPA downlink carriers may be provided. This may improve the bandwidth usage and user peak downlink rate, for example, via frequency aggregation and resource pooling. This may be extended to include a MIMO function. 4C-HSDPA may be provided, which may allow up to four carriers to operate simultaneously to achieve even higher downlink throughput.

Multipoint HSDPA transmission to the same WTRU may be utilized, for example, to improve cell edge performance. For example, simultaneous transmission of HS-PDSCH data flows from multiple serving cells may be utilized. This may be referred to as HSDPA multiflow data transmission (HSDPA MF-TX). Implementations of HSDPA MF-TX may include an intra-NodeB implementation and an inter-NodeB implementation.

Figure 1:
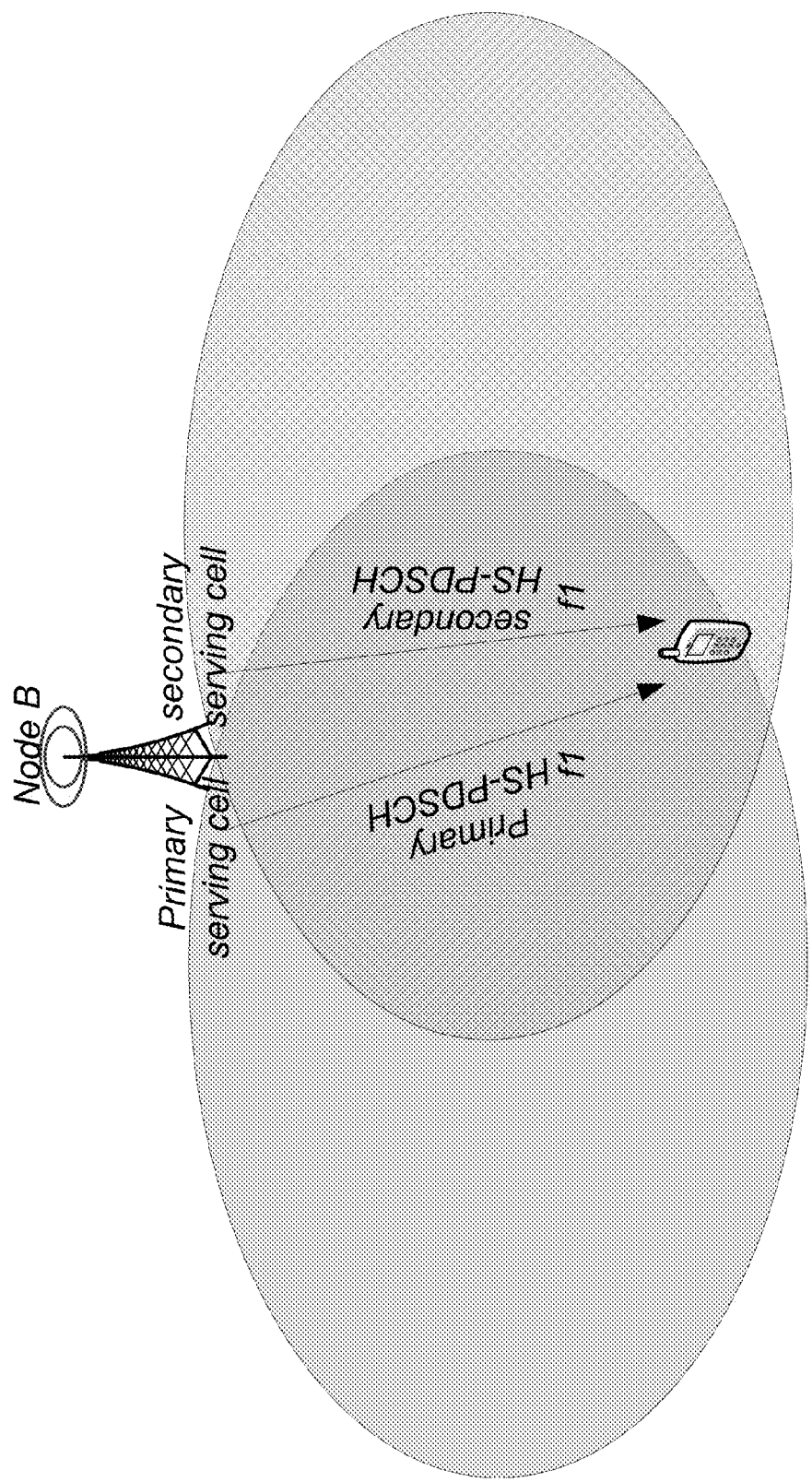
FIG. 1 is a diagram illustrating an example of intra-NodeB multipoint data transmission from two serving cells.

FIG. 1 depicts an example of intra-NodeB multipoint data transmission from two serving cells. In an intra-NodeB implementation, the serving cells involved in multipoint transmission may be controlled by the same Node-B, where multiple downlink data flows may be independently scheduled from these cells towards the same WTRU. The serving cells may share the same frequency resource but may serve different sectors of a geographic area, or the serving cells may operate in different frequencies. At the WTRU, the received multiflow data may be aggregated so that the overall data throughput to the WTRU may be increased. This may be beneficial for WTRUs that are located at a cell boundary between two or more cells. An example of multipoint transmission from two serving cells is illustrated in FIG. 1, where the two cells serving two different sectors may be operating in the same frequency f1.

Figure 2:
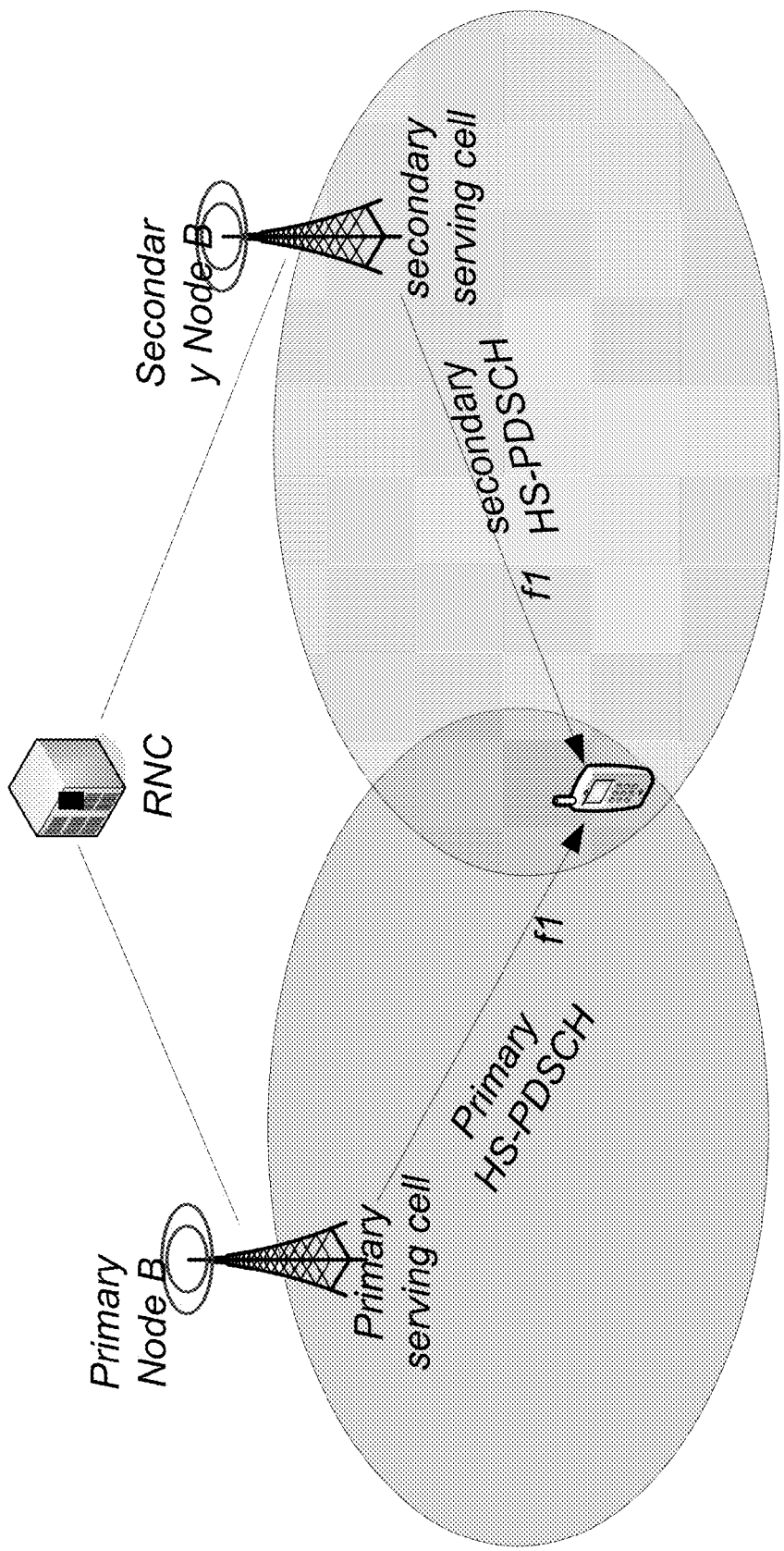
FIG. 2 is a diagram illustrating an example of inter-NodeB multipoint data transmission from two serving cells.

FIG. 2 depicts an example of inter-NodeB multipoint data transmission from two serving cells. In inter-NodeB deployment, the serving cells may belong to different Node-Bs residing at geographically separated sites. Communication between the cells, or the different NodeBs, may be conducted via a radio network controller (RNC). The RNC may have constrained capacity and latency performance. This may require more implementation complexity for the multipoint transmission. Inter-NodeB deployment may allow for a population of WTRUs at the cell edge to be significantly larger than the number of WTRUs which are at cell edge for the intra-Node-B deployment case. The impact to network performance may be more substantial if the inter-NodeB and intra-NodeB deployment cases are both considered.

Figure 3A:
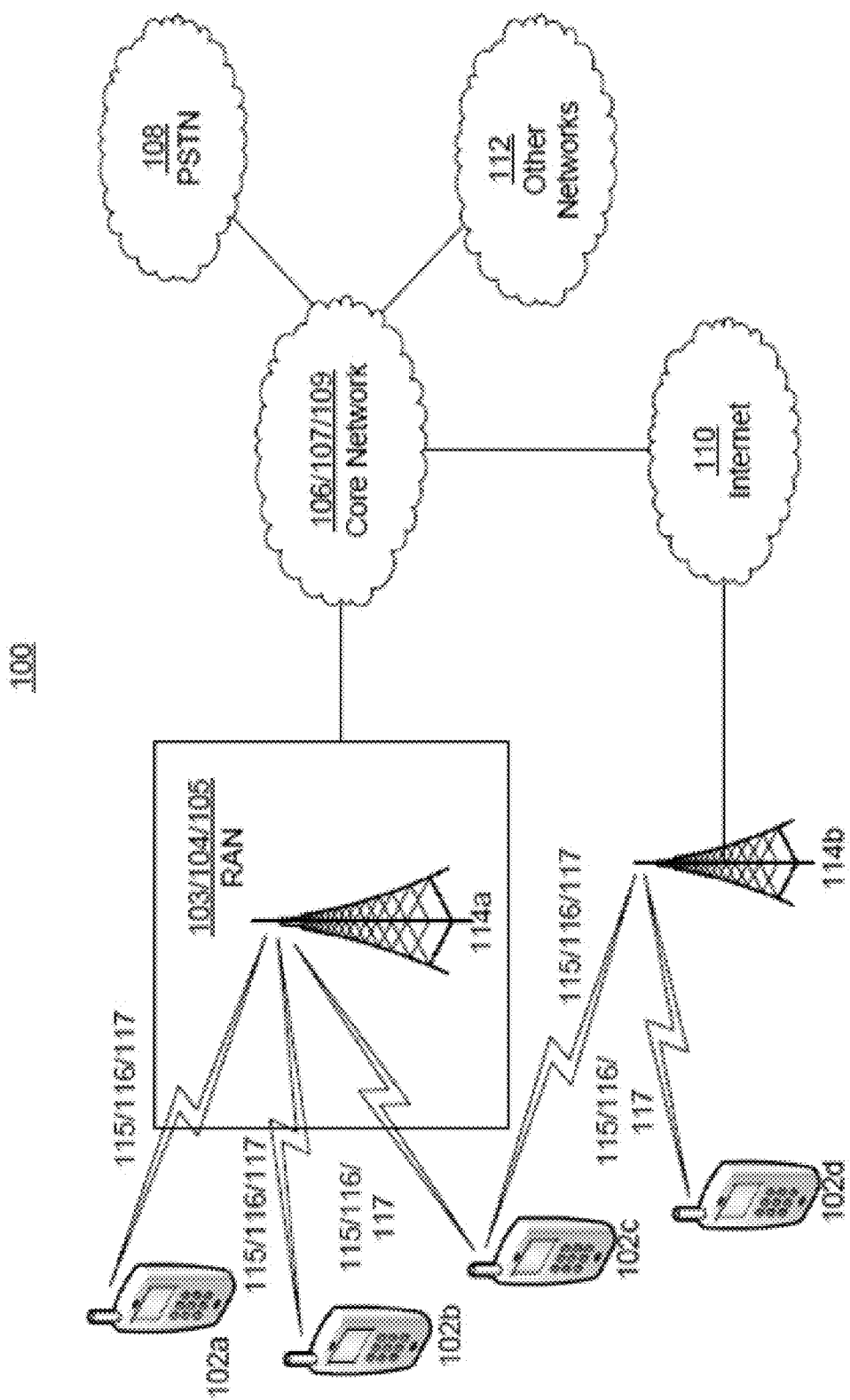
FIG. 3A is a system diagram of an example communications system in which one or more disclosed embodiments may be implemented.

FIG. 3A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 3A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNodeB, a Home NodeB, a Home eNodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 3A may be a wireless router, Home NodeB, Home eNodeB, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 3A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 3A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 3A may be configured to communicate with the base station 114a, which may employ a cellular-based radio technology, and with the base station 114b, which may employ an IEEE 802 radio technology.

Figure 3B:
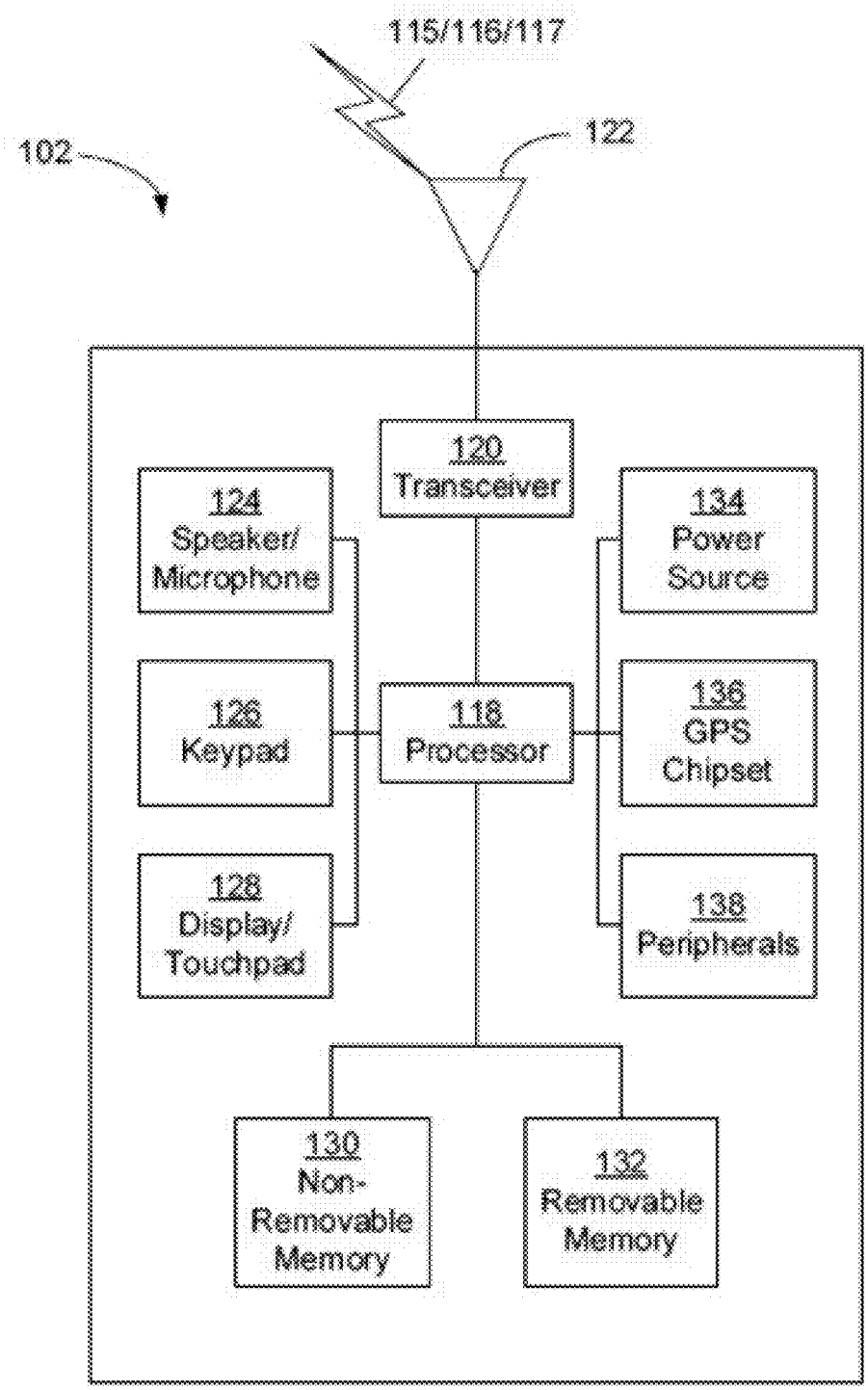
FIG. 3B is a system diagram of an example wireless transmit/receive unit (WTRU) that may be used within the communications system illustrated in FIG. 3A.

FIG. 3B is a system diagram of an example WTRU 102. As shown in FIG. 3B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. It is noted that the components, functions, and features described with respect to the WTRU 102 may also be similarly implemented in a base station.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 3B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 3B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 3C:
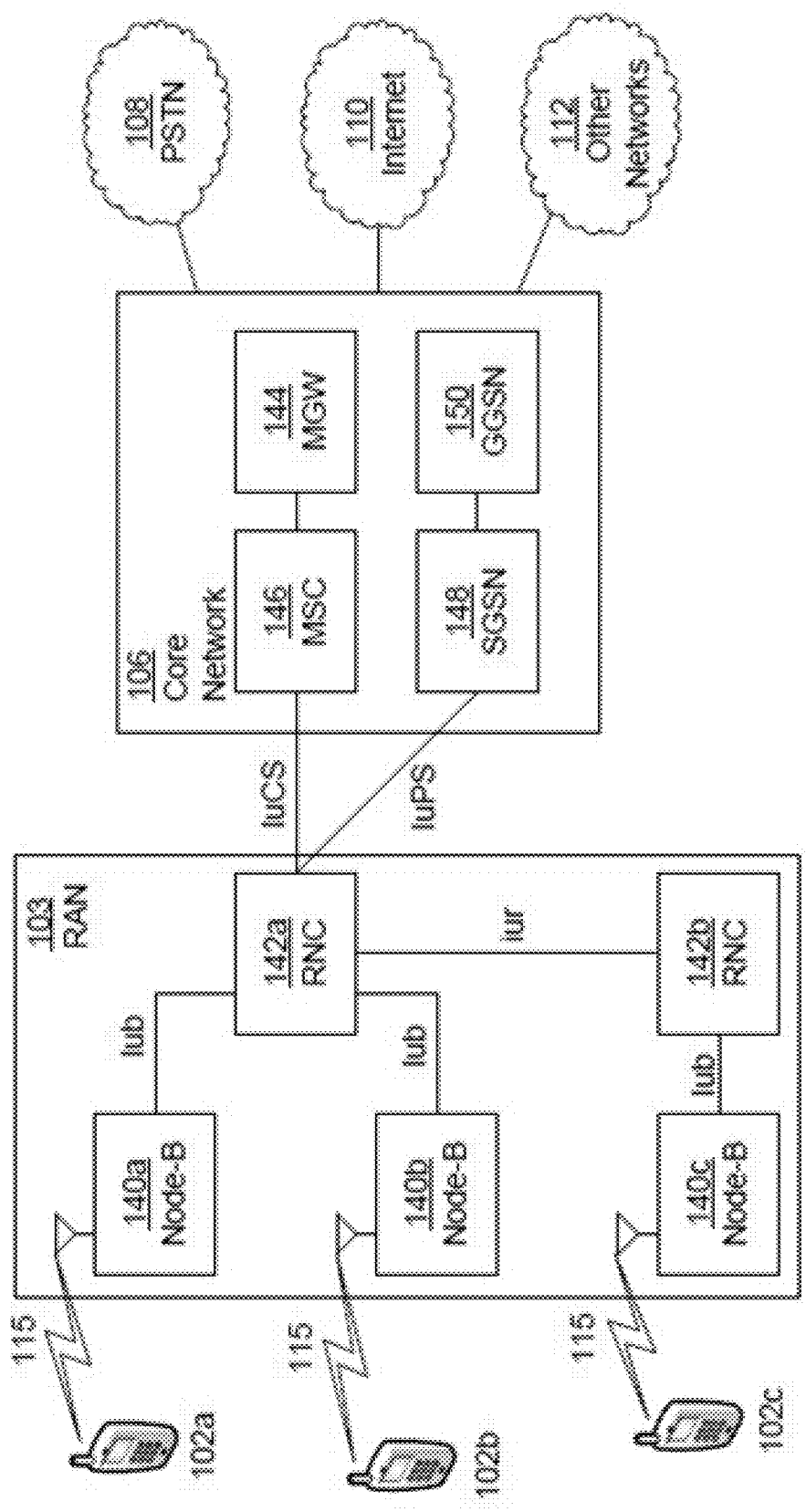
FIG. 3C is a system diagram of an example radio access network and an example core network that may be used within the communications system illustrated in FIG. 3A.

FIG. 3C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 3C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 3C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 3C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 3D:
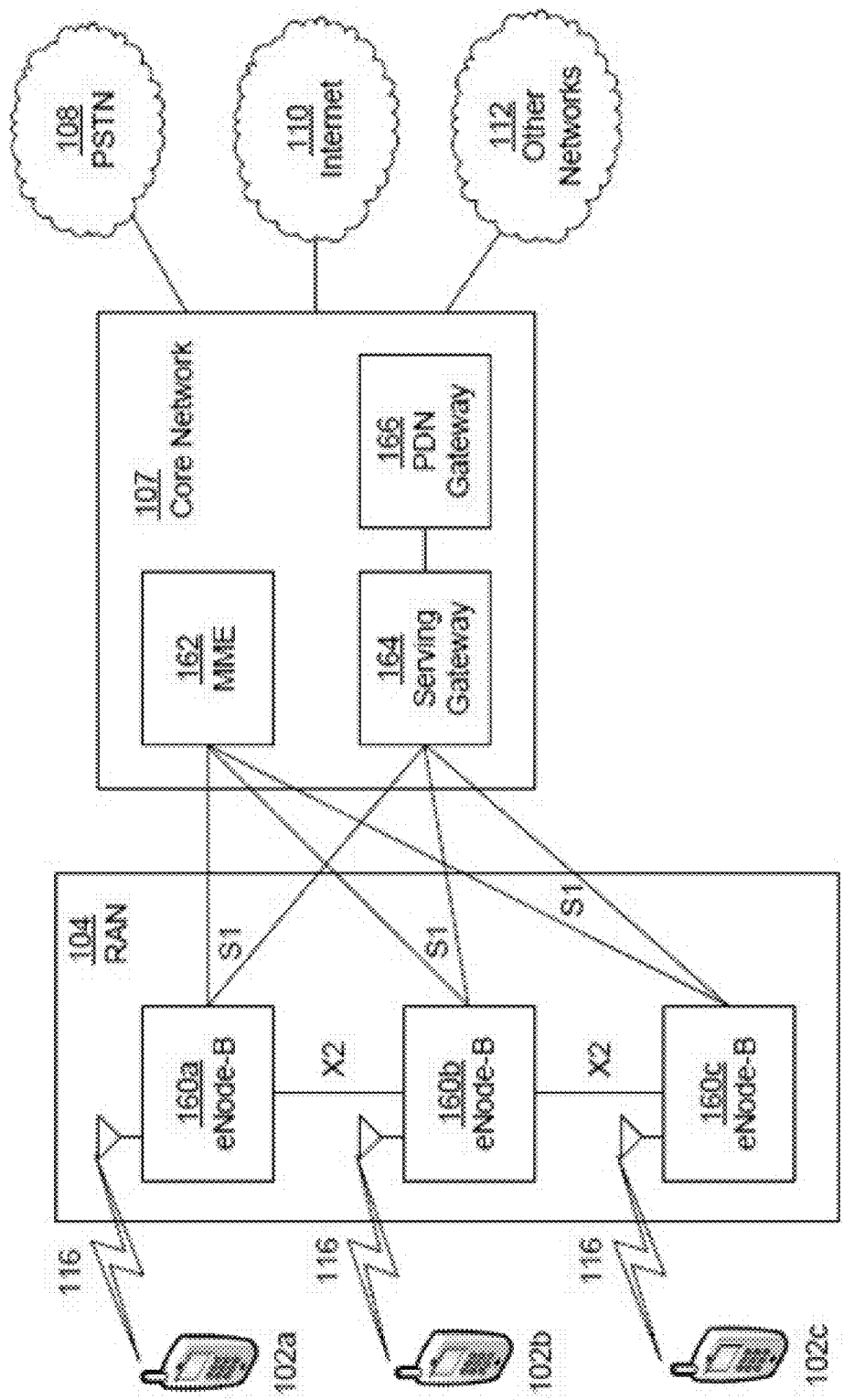
FIG. 3D is a system diagram of an another example radio access network and another example core network that may be used within the communications system illustrated in FIG. 3A.

FIG. 3D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 3D, the eNode-Bs 140a, 140b, 140c may communicate with one another over an X2 interface.

The core network 106 shown in FIG. 3C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNodeBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNodeB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 3E:
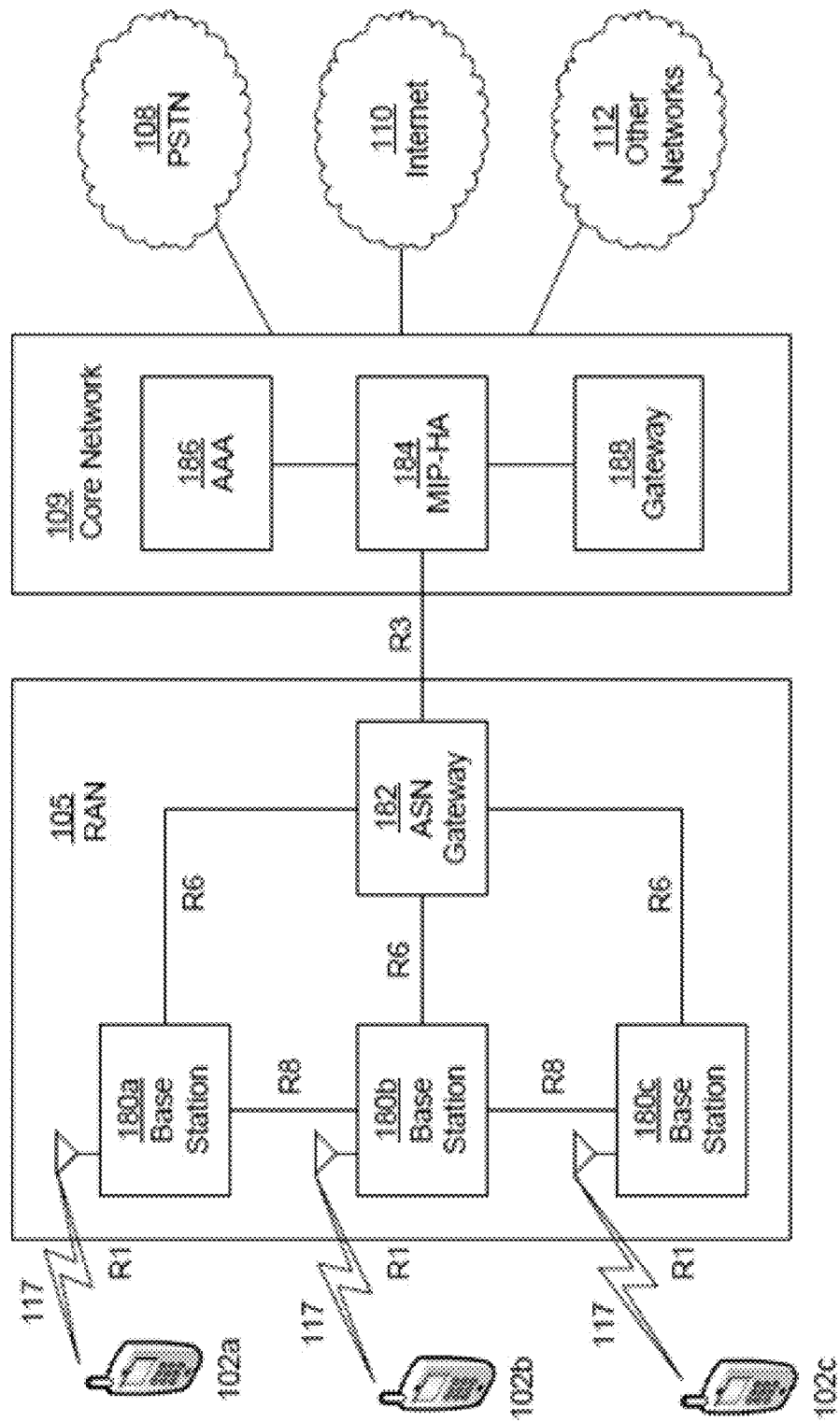
FIG. 3E is a system diagram of an another example radio access network and another example core network that may be used within the communications system illustrated in FIG. 3A.

FIG. 3E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 3E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 3E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 3E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

A WTRU may provide uplink feedback that may be received by multiple serving base stations. In responding to a downlink transmission, HARQ-ACK messages may be generated at a WTRU, for example, to inform the network about its reception of intended data transport blocks for reliable HARQ operation. The channel quality indicator (CQI) may be an index that indicates downlink signal quality so that adaptive modulation and coding (AMC) may be performed, for example, to maximize the throughput of a given radio link. HARQ-ACK and/or CQI fields may be carried in the HS-DPCCH in an HSDPA cellular system. CQI may be used interchangeably throughout the disclosure with PCI, or both CQI and PCI.

Intra-NodeB implementations may include transmission points that are co-located. Feedback from a WTRU may be jointly transmitted and/or jointly encoded since the feedback is being transmitted to serving cells of the same NodeB. Inter-NodeB implementations may include two transmission points that are not co-located.

In Inter-NodeB implementations, a WTRU may transmit different feedback information (e.g., CQI information, HARQ-ACK/NACK) to serving cells that are not co-located at the same NodeB. The network may configure a WTRU to group the ACK/NACK and/or CQI/PCI messages according to destination, for example, to effectively send the related control feedbacks to a cell that desires to receive them. This may be used in an inter-NodeB deployment where NodeBs may be geographically separated.

For example, a frame structure with separate HS-DPCCH fields may be used. An HS-DPCCH field may be used to carry the control information of a particular group addressed to the same destination. When mapping the serving cells to the HS-DPCCH fields, the network may configure the WTRU to report the feedbacks for the cells in the same NodeB within the same HS-DPCCH field. This may be done, for example, so that the NodeB may decode the HS-DPCCH field of its interest and may ignore the others. The transmission quality may be controlled separately according to the corresponding radio conditions to each destination. Joint encoding of the feedback information across NodeBs may be avoided as it may create difficulty in separating the HS-DPCCH fields.

Implementations described herein may group feedback information for Inter-NodeB implementations (e.g., at least two serving cells that are at different locations). The feedback information may be grouped into separate fields within a single channel (e.g., HS-DPCCH). This grouping of the feedback information into separate fields may be based on time slots. The feedback information may be grouped based on destination. For example, ACK/NACK and CQI for one serving cell may be grouped together. Implementations may utilize different transmit power for the separate fields based on the destination of the field. For example, Tables 1-6 may illustrate examples of such concepts.

the cells served by the assistive NodeB and their associated CQI reports may be grouped under a 2nd group. The CQI information for each cell may be mapped to a HS-DPCCH field according to Table 1, where CQIn or PCI/CQIn, n=1, 2, 3, 4, may represent the CQI or PCI feedback information for Cn. A CQI or PCI/CQI report (e.g., either the 1st or the 2nd report) may be associated to a specific CQI report group and may be intended to address to the NodeB for the cells it is serving. The CQI or PCI/CQI reports prepared this way may be transmitted separately in different sub-frames, different time slots of HS-DPCCH, etc. In Table 1, the variable secondary_Cell_Active may indicate the number of active assisting secondary cells and HS-DPCCH slot format may indicate the slot formats related to the spread factor (e.g., 0: SF=256, 1: SF=128). The CQI or the PCI/CQI of the single active cell within the group may be transmitted.

TABLE 1

| | | | | | | | |
|---|---|---|---|---|---|---|---|
| Example Application of CQI Mapping Tables for 4 Cell MP Transmission | | | | | | | |
| Secondary cell enabled | MIMO configured in any cell | HS-DPCCH slot format | secondary_ Cell_Active | 1st CQI or PCI/CQI report (for 1st group) | | 2nd CQI or PCI/CQI report (for 2nd group) | |
| 3 | No | 1 | 3 | CQI0 | CQI1 | CQI2 | CQI3 |
| | | | 2 | CQI0 | CQI0 | CQI2 | CQI3 |
| | | | | CQI0 | CQI1 | CQIn Note | CQIn Note |
| | | | 1 | CQI0 | CQI0 | CQIn Note | CQIn Note |
| | | | | CQI0 | CQI1 | DTX | DTX |
| | | | 0 | CQI0 | CQI0 | DTX | DTX |
| | Yes | | 3 | PCI/CQI0 | PCI/CQI1 | PCI/CQI2 | PCI/CQI3 |
| | | | 2 | PCI/CQI0 | PCI/CQI0 | PCI/CQI2 | PCI/CQI3 |
| | | | | PCI/CQI0 | PCI/CQI1 | PCI/CQIn Note | PCI/CQIn Note |
| | | | 1 | PCI/CQI0 | PCI/CQI0 | PCI/CQIn Note | PCI/CQIn Note |
| | | | | PCI/CQI0 | PCI/CQI1 | DTX | DTX |
| | | | 0 | PCI/CQI0 | PCI/CQI0 | DTX | DTX |

For example, assuming four cells denoted by C0, C1, C2, C3 are used for multipoint transmission. C0 and C1 may belong to a first NodeB, and C2 and C3 may belong to a second NodeB. The feedback messages of C0 and C1 may be mapped to HS-DPCCH field 1. The feedback message of C2 and C3 may be mapped HS-DPCCH field 2.

For further example, PCI/CQI may be reported under grouping rules for 4 cell MP transmission. C0 and C1 may be the cells served by the primary NodeB and their associated CQI reports may be grouped in a 1st group. C2 and C3 may be CQI remapping/repeating may be restricted within its own group, for example, when cell deactivation occurs. Cross group remapping/repeating may not be allowed. For example, if both cells in a group are deactivated, the corresponding CQI field may be left DTXed, which may not allow the other group to take advantage of the unused slots.

For MP transmission configured with 3 cells, the CQI mapping may be performed as exemplified in Table 2. C0 and C1 may be grouped because they may belong to the same NodeB and C2 may stand alone in the $2^{nd}$ group.

TABLE 2

| | | | | | | | |
|---|---|---|---|---|---|---|---|
| Example Application of CQI Mapping Tables for 3 Cell MP Transmission | | | | | | | |
| Secondary cell enabled | MIMO configured in any cell | HS-DPCCH slot format | secondary_ Cell_Active | 1st CQI or PCI/CQI report (for 1st group) | | 2nd CQI or PCI/CQI report (for 2nd group) | |
| 2 | No | 1 | 2 | CQI0 | CQI1 | CQI2 | CQI2 |
| | | | 1 | CQI0 | CQI0 | CQI2 | CQI2 |
| | | | | CQI0 | CQI1 | DTX | DTX |
| | | | 0 | CQI0 | CQI0 | DTX | DTX |
| | Yes | | 2 | PCI/CQI0 | PCI/CQI1 | PCI/CQI2 | PCI/CQI2 |
| | | | 1 | PCI/CQI0 | PCI/CQI0 | PCI/CQI2 | PCI/CQI2 |

TABLE 2-continued

Example Application of CQI Mapping Tables for 3 Cell MP Transmission

| Secondary cell enabled | MIMO configured in any cell | HS-DPCCH slot format | secondary_Cell_Active | 1st CQI or PCI/CQI report (for 1st group) | | 2nd CQI or PCI/CQI report (for 2nd group) | |
|---|---|---|---|---|---|---|---|
| | | | | PCI/CQI0 | PCI/CQI1 | DTX | DTX |
| | | | 0 | PCI/CQI0 | PCI/CQI0 | DTX | DTX |

Table 3 illustrates an example of CQI mapping for 3 cell MP transmission.

TABLE 3

Example Application of CQI Mapping Tables For 3 Cell MP Transmission

| Secondary cell enabled | MIMO configured in any cell | HS-DPCCH slot format | secondary_Cell_Active | 1st CQI or PCI/CQI report (for 1st group) | | 2nd CQI or PCI/CQI report (for 2nd group) | |
|---|---|---|---|---|---|---|---|
| 2 | No | 1 | 2 | CQI0 | CQI0 | CQI1 | CQI2 |
| | | | 1 | CQI0 | CQI0 | CQIn Note | CQIn Note |
| | | | 0 | CQI0 | CQI0 | DTX | DTX |
| | Yes | | 2 | PCI/CQI0 | PCI/CQI0 | PCI/CQI2 | PCI/CQI2 |
| | | | 1 | PCI/CQI0 | PCI/CQI0 | PCI/CQIn Note | PCI/CQIn Note |
| | | | 0 | PCI/CQI0 | PCI/CQI0 | DTX | DTX |

For MP transmission configured with two cells, if the two cells are served by different NodeBs located at different sites (e.g., inter-NodeB deployment), the CQI mapping may be performed as exemplified by Table 4, where C0 may belong to a $1^{st}$ group and C1 may belong to a $2^{nd}$ group.

For an MP transmission configured with 2 cells, for inter NodeB or intra NodeB deployment, the CQI mapping may have the same format. The assistive NodeB may not know when the CQI1 may be deactivated. The corresponding entry (e.g., for secondary_Cell_Active=0 and non-MIMO case) may be modified so that the CQI coding format may not change. For example, CQI0 and CQI1 may be jointly encoded with the field of CQI1 being filled with a dummy value. The dummy value may be a value that may be set to 0, which may represent out of range. A modified table exemplifying an

TABLE 4

Example Application of CQI mapping Tables for 2 Cell MP Transmission, Inter NodeB Deployment

| Secondary cell enabled | MIMO configured in any cell | HS-DPCCH slot format | secondary_Cell_Active | 1st CQI or PCI/CQI report (for 1st group) | 2nd CQI or PCI/CQI report (for 2nd group) |
|---|---|---|---|---|---|
| 1 | No | 0 | 1 | CQI0 | CQI1 |
| | | | 0 | CQI0 | DTX |
| | Yes | | 1 | PCI/CQI0 | PCI/CQI1 |
| | | | 0 | PCI/CQI0 | DTX |

For an intra-NodeB deployment, the CQI mapping may return to a legacy configuration, for example, as exemplified by Table 5. The two CQI values may be jointly encoded.

TABLE 5

Example Application of CQI Mapping Tables for 2 Cell MP Transmission, Intra NodeB Deployment

| Secondary cell enabled | MIMO configured in any cell | HS-DPCCH slot format | secondary_Cell_Active | 1st CQI or PCI/CQI report (for 1st group) | 2nd CQI or PCI/CQI report (for 1st group) |
|---|---|---|---|---|---|
| 1 | No | 0 | 1 | CQI0&CQI1 Note | not appliable |
| | | | 0 | CQI0 | not appliable |
| | Yes | | 1 | PCI/CQI0 | PCI/CQI1 |
| | | | 0 | PCI/CQI0 | not appliable | example of such an embodiment is shown in Table 6. The two CQI values may be jointly encoded.

TABLE 6

Example of a Modified CQI Mapping Table for 2 Cell MP Transmission

| Secondary cell enabled | MIMO configured in any cell | HS-DPCCH slot format | secondary_Cell_Active | 1st CQI or PCI/CQI report (for 1st group) | 2nd CQI or PCI/CQI report (for 1st group) |
|---|---|---|---|---|---|
| 1 | No | 0 | 1 | CQI0&CQI1 Note | not appliable |
|   |   |   | 0 | CQI0&CQI1 Note | not appliable |
|   | Yes |   | 1 | PCI/CQI0 | PCI/CQI1 |
|   |   |   | 0 | PCI/CQI0 | not appliable |

Table 7 provides an example of CQI and PCI/CQI report mapping scenarios when a WTRU may be configured in multiflow mode. Two or more of the cell configuration scenarios may be combined into a single table. Cases which may not be practical due to network restriction may be removed. Table 7 provides an example of HS-DPCCH mapping for grouped CQI/PCI reports, where some fields for the deactivated cells may be filled with repeated CQI/PCI information of other cells to improve the reliability of CQI report.

Table 8 provides an example of CQI and PCI/CQI report mapping scenarios when a WTRU may be configured in multiflow mode. The mapping table of Table 8 illustrates an example of implementations where a deactivated CQI/filed may be DTXed. Table 7 and Table 8 may be jointly used to form a table, for example, to have a part of the deactivated CQI fields being DTXed.

TABLE 7

Example of CQI and PCI/CQI Report Mapping Scenarios when a WTRU may be Configured in Multiflow Mode

| Secondary cell enabled | MIMO configured in any cell | HS-DPCCH slot format | secondary_ Cell_Active | 1st CQI or PCI/CQI report (for 1st cell group) | | 2nd CQI or PCI/CQI report (for 2nd cell group) | |
|---|---|---|---|---|---|---|---|
| 1 | No | 0 | 1 | CQI0 | | CQI1 | |
|   |   |   |   | CQI0&CQI1 | | Not applicable | |
|   | Yes |   | 1 | PCI/CQI0 | | PCI/CQI1 | |
| 2 | No | 1 | 2 | CQI0 | CQI0 | CQI1 | CQI2 |
|   |   |   |   | CQI0 | CQI1 | CQI2 | CQI2 |
|   |   |   | 1 | CQI0 | CQI0 | CQI1 | CQI1 |
|   |   |   |   | CQI0 | CQI0 | CQI2 | CQI2 |
|   | Yes |   | 2 | PCI/CQI0 | PCI/CQI0 | PCI/CQI1 | PCI/CQI2 |
|   |   |   |   | PCI/CQI0 | PCI/CQI1 | PCI/CQI2 | PCI/CQI2 |
|   |   |   | 1 | PCI/CQI0 | PCI/CQI0 | PCI/CQI1 | PCI/CQI1 |
|   |   |   |   | PCI/CQI0 | PCI/CQI0 | PCI/CQI2 | PCI/CQI2 |
| 3 | No | 1 | 3 | CQI0 | CQI1 | CQI2 | CQI3 |
|   |   |   | 2 | CQI0 | CQI0 | CQI2 | CQI3 |
|   |   |   |   | CQI0 | CQI1 | CQI2 | CQI2 |
|   |   |   | 1 | CQI0 | CQI0 | CQI2 | CQI2 |
|   | Yes |   | 3 | PCI/CQI0 | PCI/CQI1 | PCI/CQI2 | PCI/CQI3 |
|   |   |   | 2 | PCI/CQI0 | PCI/CQI0 | PCI/CQI2 | PCI/CQI3 |
|   |   |   |   | PCI/CQI0 | PCI/CQI1 | PCI/CQI2 | PCI/CQI2 |
|   |   |   | 1 | PCI/CQI0 | PCI/CQI0 | PCI/CQI2 | PCI/CQI2 |

TABLE 8

Example of CQI and PCI/CQI Report Mapping Scenarios
when a WTRU may be Configured in Multiflow Mode

| Secondary cell enabled | MIMO configured in any cell | HS-DPCCH slot format | secondary_Cell_Active | 1st CQI or PCI/CQI report (for 1st cell group) | | 2nd CQI or PCI/CQI report (for 2nd cell group) | |
|---|---|---|---|---|---|---|---|
| 1 | No | 0 | 1 | CQI0 | | CQI1 | |
|   |     |   |   | CQI0&CQI1 | | Not applicable | |
|   | Yes |   | 1 | PCI/CQI0 | | PCI/CQI1 | |
| 2 | No | 1 | 2 | CQI0 | DTX | CQI1 | CQI2 |
|   |    |   |   | CQI0 | CQI1 | CQI2 | DTX |
|   |    |   | 1 | CQI0 | DTX | CQI1 | DTX |
|   |    |   |   | CQI0 | DTX | CQI2 | DTX |
|   | Yes |   | 2 | PCI/CQI0 | DTX | PCI/CQI1 | PCI/CQI2 |
|   |     |   |   | PCI/CQI0 | PCI/CQI1 | PCI/CQI2 | DTX |
|   |     |   | 1 | PCI/CQI0 | DTX | PCI/CQI1 | PCI/CQI1 |
|   |     |   |   | PCI/CQI0 | DTX | PCI/CQI2 | DTX |
| 3 | No | 1 | 3 | CQI0 | CQI1 | CQI2 | CQI3 |
|   |    |   | 2 | CQI0 | DTX | CQI2 | CQI3 |
|   |    |   |   | CQI0 | CQI1 | CQI2 | DTX |
|   |    |   | 1 | CQI0 | DTX | CQI2 | DTX |
|   | Yes |   | 3 | PCI/CQI0 | PCI/CQI1 | PCI/CQI2 | PCI/CQI3 |
|   |     |   | 2 | PCI/CQI0 | DTX | PCI/CQI2 | PCI/CQI3 |
|   |     |   |   | PCI/CQI0 | PCI/CQI1 | PCI/CQI2 | DTX |
|   |     |   | 1 | PCI/CQI0 | DTX | PCI/CQI2 | DTX |

As may be seen from Table 7 and Table 8, when two cells are configured, slot format 0 may not be consistent with other cell configurations. Slot format 1 may be used for this case, which may lead to Table 9 or Table 10 respectively. This may simplify the configuration.

TABLE 9

Example of CQI and PCI/CQI Report Mapping Scenarios
when a WTRU may be Configured in Multiflow Mode

| Secondary cell enabled | MIMO configured in any cell | HS-DPCCH slot format | secondary_Cell_Active | 1st CQI or PCI/CQI report (for 1st cell group) | | 2nd CQI or PCI/CQI report (for 2nd cell group) | |
|---|---|---|---|---|---|---|---|
| 2 | No | 1 | 2 | CQI0 | CQI0 | CQI1 | CQI1 |
|   |    |   |   | CQI0 | CQI1 | N/A | |
|   | Yes |   | 2 | PCI/CQI0 | PCI/CQI0 | PCI/CQI1 | PCI/CQI1 |
|   |     |   |   | PCI/CQI0 | PCI/CQI1 | N/A | |

TABLE 10

Example of CQI and PCI/CQI Report Mapping Scenarios
when a WTRU may be Configured in Multiflow Mode

| Secondary cell enabled | MIMO configured in any cell | HS-DPCCH slot format | secondary_Cell_Active | 1st CQI or PCI/CQI report (for 1st cell group) | | 2nd CQI or PCI/CQI report (for 2nd cell group) | |
|---|---|---|---|---|---|---|---|
| 2 | No | 1 | 2 | CQI0 | DTX | CQI1 | DTX |
|   |    |   |   | CQI0 | CQI1 | N/A | |
|   | Yes |   | 2 | PCI/CQI0 | DTX | PCI/CQI1 | DTX |
|   |     |   |   | PCI/CQI0 | PCI/CQI1 | N/A | |

An HS-DPCCH frame structure may have a dual channel format. There may be two HS-DPCCH channels that may be allocated for the purpose of transmitting uplink feedback information to the serving cells. The two HS-DPCCH channels may carry the HS-DPCCH fields described herein. It may be targeted to different NodeBs or serving cells and may be carried in two different channelization codes in the same uplink radio link transmission operating in a single carrier frequency.

Figure 4:
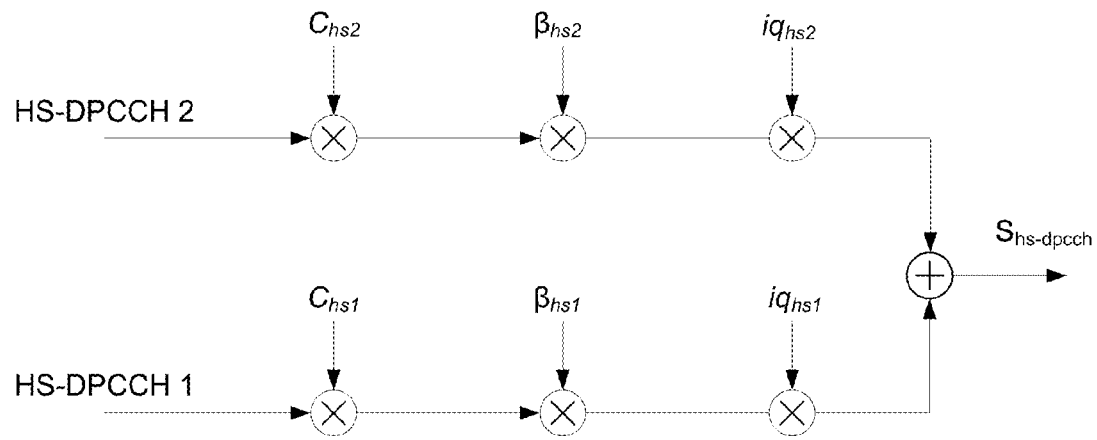
FIG. 4 is a diagram illustrating an example of multiplexing two HS-DPCCH channels.

FIG. 4 depicts an example of multiplexing two HS-DPCCH channels. As shown in FIG. 4, the two HS-DPCCH channels may be multiplexed into the uplink transmission in such a way that the two controls channels are represented by HS-DPCCH1 and HS-DPCCH2. HS-DPCCH1 and HS-DPCC2 may be spread by two different channelization codes denoted by $C_{hs1}$ and $C_{hs2}$. Before combining the two channels, HS-DPCCH1 and HS-DPCCH2 may be scaled by different power scaling factor $\beta_{hs1}$ and $\beta_{hs2}$ respectively, allowing for assigning different transmit power adjusted according to the radio channel conditions of each serving cell. Each of the control channels may be mapped to either I or Q branches as determined by selection of the constant $iq_{hs}$ applied at the last stage (e.g., $iq_{hs}=1$ for 1 branch and $iq_{hs}=j$ for Q branch).

To maintain the orthogonality between the HS-DPCCH channels, the chip or symbol boundary of the channels may be aligned to be within a defined allowance. For the sub-frame boundary, the two channels may be allowed to have independent timing design. This may, for example, provide the flexibility of transmitting uplink feedback of each cell separately at their own required timing.

Figure 5:
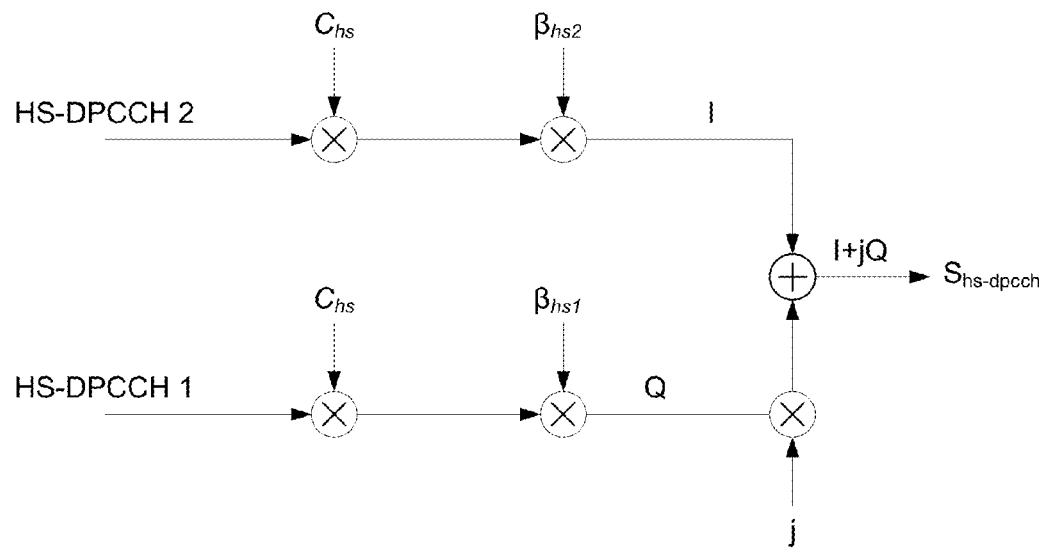
FIG. 5 is a diagram illustrating an example of multiplexing two HS-DPCCH channels into I/Q branches.

FIG. 5 depicts an example of multiplexing two HS-DPCCH channels into I/Q branches. As shown in FIG. 5, the two HS-DPCCH channels may use the same channelization code in an uplink of single frequency, but the HS-DPCCH channels may be multiplexed at different branches of the complex transmission, such as in-phase and quadrature-phase branches. This may be done, for example, to allow I/Q channels to be readily separable such that the symbol or chip boundary alignment may not be needed. As an example, the I and Q branches of the channelization code $C_{ch,256,33}$ may be used for uplink control channels when DCH channel may not be configured. The two HS-DPCCH channels may be carried in two uplink radio links operating in different carrier frequencies.

For multiple point transmission configured with two cells, HS-DPCCH physical channels may maintain the slot format 0 with SF=256, in which an ACK/NACK field may take a first slot and a CQI field may take a following two time slots. A feedback channel, which may be denoted by HS-DPCCH2, may be added to facilitate feedback support for the second cell. The ACK/NACK and/or CQI/PCI feedbacks for the two downlink data flows may be individually encoded. The ACK/NACK and CQI/PCI feedback information in response to the downlink from the first cell may be allocated to the first feedback channel HS-DPCCH1. The ACK/NACK and CQI/PCI feedback information for the second cell may be allocated to the second feedback channel HS-DPCCH2. There may be no requirement on the timing relation of the two feedback channels. The ACK/NACK timing may be tied to its own downlink sub-frame. Because the CQI reports may be allocated in the two time slots following the ACK/NACK field, the same timing relation may apply.

Figure 6:
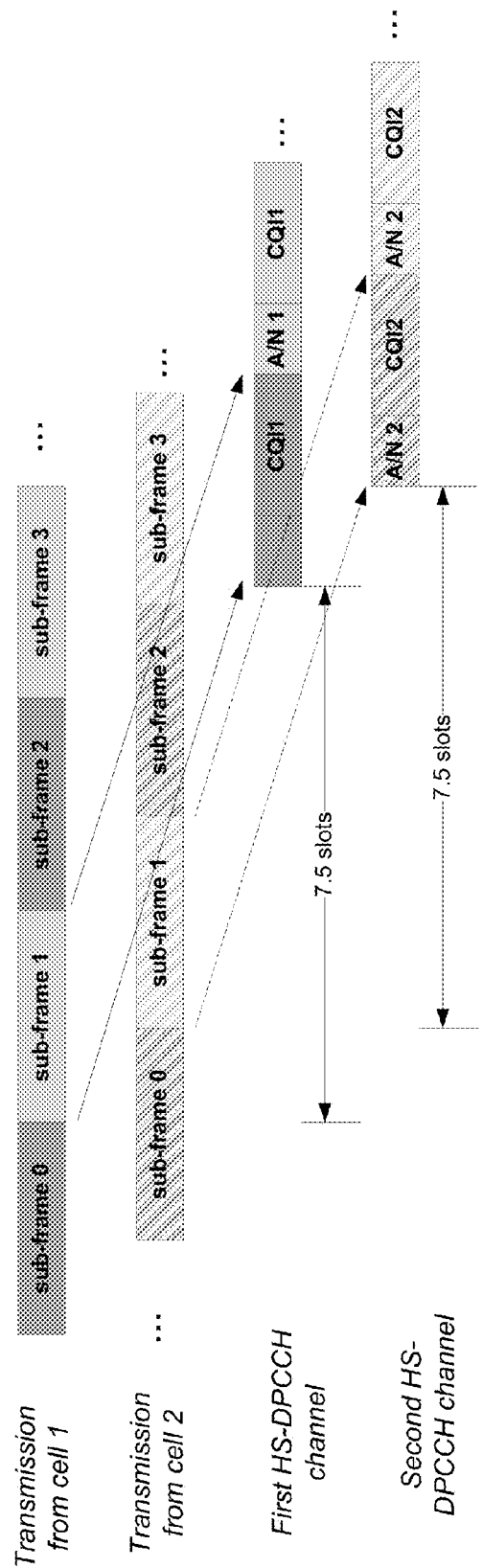
FIG. 6 is a diagram illustrating an example of dual channelization code HS-DPCCH with asynchronous HARQ-ACKs.

FIG. 6 depicts an example of dual channelization code HS-DPCCH with asynchronous HARQ-ACKs. As shown in FIG. 6, an asynchronous feedback configuration may be accomplished using a frame structure with dual HS-DPCCHs. ACK/NACK and CQI feedbacks may be allocated independently in the two feedback channels. This may allow each of them keep the time relation (e.g., 7.5 slots) to the associated downlink sub-frames.

Such implementations may provide the capability of dealing with misaligned frame structures and/or backward compatibility. When the SF-MF mode is activated or deactivated, the additional HS-DPCCH channel may be turned off. The spreading factors and/or other parameters may not be switched and/or changed.

The ACK/NACK may be independently encoded. This may allow the HS-DPCCH receiver at one cell from being provided with knowledge as to whether the other HS-DPCCH channel is in use, which may be typical for intra-site configurations. The detection performance for ACK/NACK decoding may provide advantages over jointly encoded ACK/NACK schemes that may have to make decision over a much larger codeword space due to lack of transmission status information from other cell.

For multipoint transmission involving up to 4 cells, the ACK/NACK feedback from two cells residing at same NodeB may be jointly encoded to form a composite ACK/NACK codeword and may be mapped to the HARQ-ACK field of HS-DPCCH1. The ACK/NACK feedback from the other two cells residing at another NodeB may be processed in the same way but assigned to the HARQ-ACK field of HS-DPCCH2. When a WTRU is not configured with MIMO mode, the CQI reports from the two serving cells of the same NodeB may be jointly encoded and mapped to CQI field of each of HS-DPCCH channels. When WTRU is configured for MIMO mode, the CQI reports from different serving cells are time multiplexed and mapped to the same control channel, for example, if the two cells belong to the same NodeB.

Figure 7:
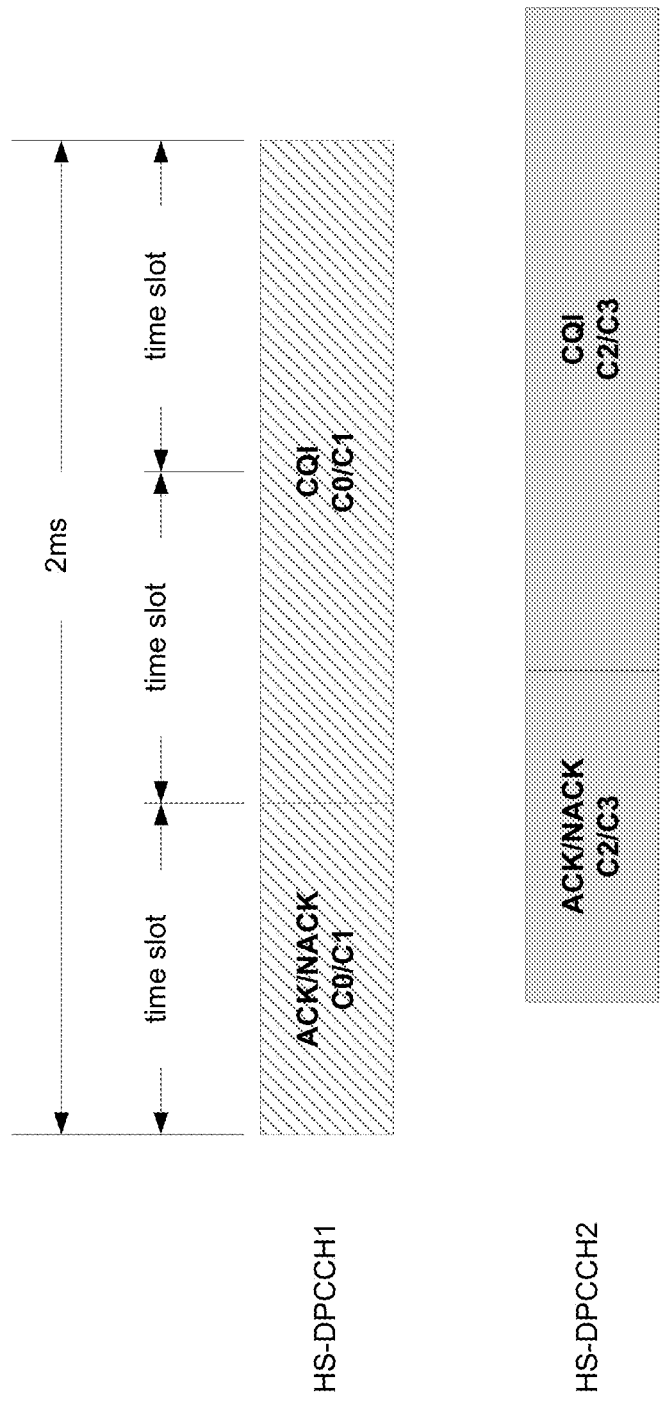
FIG. 7 is a diagram illustrating an example of HS-DPCCH design for multipoint transmission from four cells.

FIG. 7 depicts an example of an HS-DPCCH design for multipoint transmission from four cells. As shown in FIG. 7, C0 and C1 may represent two cells from NodeB 1 and C2 and C3 may represent two cells from NodeB 2. The HS-DPCCH channel design for a non-MIMO case may be illustrated in FIG. 7. The application of the HS-DPCCH channel for a non-MIMO case in a cellular system may be demonstrated in FIG. 8, where HS-DPCCH1 may be sent to NodeB 1 and HS-DPCCH2 to NodeB 2.

Figure 8:
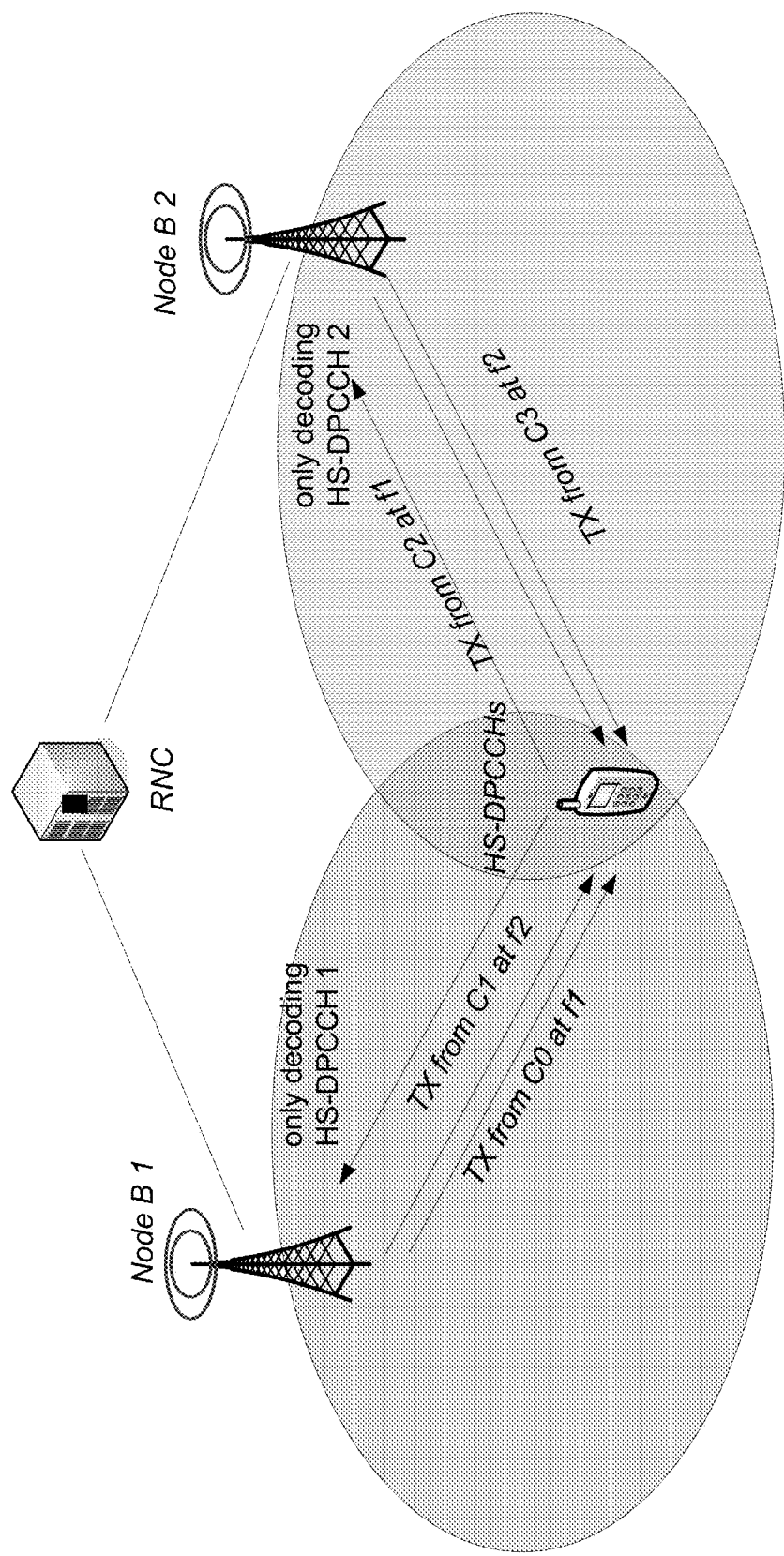
FIG. 8 is a diagram illustrating an example of multipoint transmission involving four cells.

FIG. 8 depicts an example of multipoint transmission involving four cells. 4 cells may be configured for multipoint transmission where 3 cells reside in a NodeB and 1 cell in another NodeB. The feedback information of the 3 cells in the same NodeB may be mapped to a first HS-DPCCH channel with the other cell being mapped to a second HS-DPCCH channel. In order to accommodate supporting 3 cells in one control channel, the frame format of the HS-DPCCH channel supporting 3 cells may use the dual field format of SF=128 (e.g., as defined in Release 10 for 4C-HSDPA). The other HS-DPCCH channel supporting 1 cell may take the single frame format of SF=256. The other HS-DPCCH channel supporting 1 cell may take the same frame structure as the first HS-DPCCH channel, for example, for consistency.

Figure 9:
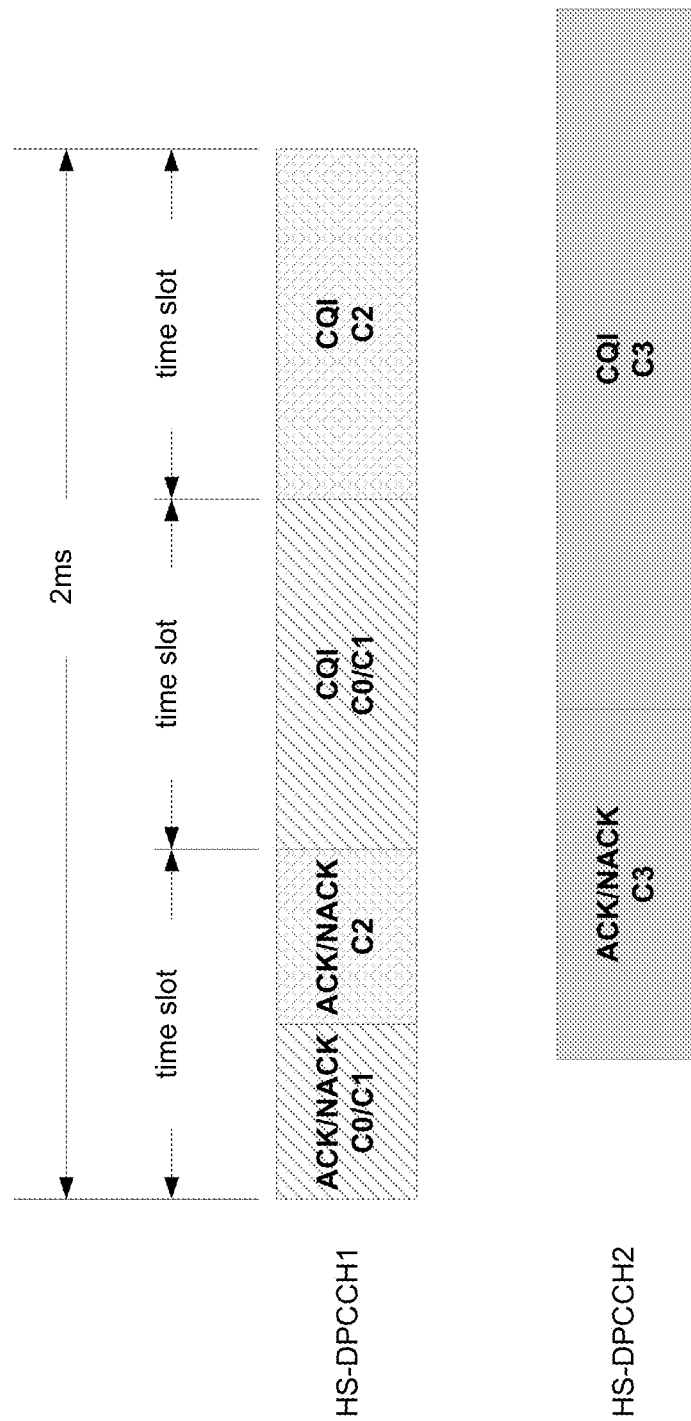
FIG. 9 is a diagram illustrating an example of HS-DPCCH mapping to cells when three cells belong to a NodeB.

FIG. 9 depicts an example of HS-DPCCH mapping to cells when three cells belong to a NodeB. For example, FIG. 9 illustrates an example of control channel mapping for C0, C1, C2 and C4. As shown, C0, C1, C2 may be 3 serving cells in NodeB1 and C4 may belong to NodeB2. HS-DPCCH1 may be intended to be sent to NodeB 1 and HS-DPCCH2 to NodeB 2.

HS-DPCCH power may be controlled for dual control channels. The WTRU may be provided with a power offset parameter (e.g., denoted by $\beta_{hs}$) to control the relative power of HS-DPCCH. The power offset parameter may be adjusted according to a predefined power offset table, for example, that may be monotonically increasing. The network may configure the WTRU with a base value that may indicate the initial entry of the table. When a power up (or down) is required, an increment (or decrement) over the entry into the table may be defined. If a second HS-DPCCH is introduced, its power may be controlled by the same mechanism.

The uplink feedback control messages may be sent by one or more HS-DPCCH channels by using different channelization codes or I/Q branches. This design may allow the control information for different cells or NodeBs to be allocated to different HS-DPCCHs. In case of inter-NodeB multipoint transmission, this configuration may provide a benefit by controlling the transmission parameters of each control channel respectively to ensure successful reception by the targeted cell or NodeB. Implementations relating to adjusting the power offset settings on a HS-DPCCH channel may be described herein.

Power control may be based on ILPC procedures. In a UMTS cellular system, uplink power control may help assure reliable uplink transmission. The uplink receiver at a base station may monitor the uplink signal quality and may generate slot-based TPC commands based on its SINR requirement. The TPC commands may be sent to the WTRU on per slot bases, for example, which may provide a fast and dynamic control of the WTRU transmit power. This power control mechanism may be referred to as ILPC (Inner Loop Power Control).

When a WTRU is in handover mode, the serving cells in the active set may send their own TPC commands to the WTRU. Multiple sets of TPCs may be jointly processed at the WTRU for deciding how the WTRU transmit power may be adjusted, for example, in order to achieve appropriate macro diversity gain.

Being related to SINR of the receiving NodeB, the TPC command set from a serving cell may be a useful indication of the relative uplink radio link quality of that cell. A statistic formed by the TPC commands from ILPC may be used as a criterion to control the power offset of a HS-DPCCH channel, which may be carrying the uplink control information for this serving cell.

The WTRU may use an average statistic of TPC commands it receives from the intended serving cell. For example, the WTRU may define a variable TPC_cmd, which may be related to the TPC commands. For example, if the TPC command received from the targeted cell is 0 in ith slot, TPC_cmd (i) for that may be set to −1. For example, if the TPC command received from the targeted cell is 1 in ith slot, TPC_cmd(i) for that may be set to 1.

Over a number of previous time slots (e.g., which may be denoted by N), an average may be performed on the defined variable:

$$TPC\_cmd\_average = \sum_{n=i-N+1}^{i} TPC\_cmd(n)$$

Where N may be pre-defined or configured by the network at RRC connection.

The variable TPC_cmd_average may be calculated by majority rule:

*TPC_cmd*_average=number of 1s among *N* received *TPC* commands

TPC_cmd_average may be further compared to a pre-defined or preconfigured threshold, for example, denoted by $T_u$. If TPC_cmd_average>$T_u$, the WTRU may decide that a power boost may be utilized on the HS-DPCCH transmitted for the targeted cell. A threshold, $T_d$, may be introduced to handle the cases when the transmit power for the HS-DPCCH may be adjusted down. If TPC_cmd_average<$T_d$, the WTRU may determine that a power reduction may be utilized for the secondary serving cell.

The decision on adjusting the transmit power of HS-DPCCH may be made from the TPC-based method described herein, or may be conditional upon the power grant status received from the network for uplink transmission. If the WTRU does not receive sufficient power grant from the network scheduler, then the HS-DPCCH power may not be allowed to boost up even though it is requested by the TPC-based method.

Adjusting the power offset for a HS-DPCCH channel may occur by moving up/down by one or a number of entries in the power offset table. Because the TPC commands may be received at WTRU on a slot to slot basis, the power offset adjustment may be made dynamic, which may be on a subframe basis. For example, an additional power offset value, denoted by $\Delta_{boost}$, may be configured by higher layers and added on top of $\Delta_{CQI}$, $\Delta_{NACK}$ or $\Delta_{ACK}$, when the CQI or HARQ-ACK fields may be intended to be carried on the HS-DPCCH. This additional power offset, which may be identified as power boost, may be applied on top of $\Delta_{CQI}$, $\Delta_{NACK}$o$\Delta_{ACK}$r when the multipoint transmission mode is enabled or configured.

Multiple level adjustments may be implemented, for example, to optimize the HS-DPCCH power offset setting. For example, multiple thresholds may be defined and compared to the TPC average statistics, which may lead to a different amount of power boost. For example, the power offset setting may be designed for power boost considering that the WTRU may behave to control the WTRU power in ILPC according to the strongest radio link among the cells in the active set. In Table 11, $\Delta_{boost}$ may be expressed in terms of the number of entries of moving up in the power offset table with reference to HS-DPCCH power offset settings (e.g., those specified in the 3GPP standard). Assuming approximate 2 dB increment in the power offset table, this example may offer a total of about 6 dB power boost.

TABLE 11

Example of Multiple Levels of Power Offset Settings for HS-DPCCH

| If TPC_CMD_average falls between | $\Delta_{boost}$ |
|---|---|
| [Tu0 Tu1] | 0 |
| [Tu1 Tu2] | +1 |
| [Tu2 Tu3] | +2 |
| [Tu3 Tu4] | +3 |

The power control algorithm may be modified so that a power boost may be placed on the entire uplink, for example, which may allow better reception in the serving cell of a weaker radio link. The concept may be realized by applying weight on the TPC commands received from the cells involved in the multipoint transmission when WTRU derives the combined TPC_cmd from TPC commands individually received from radio links in different radio link sets.

Examples of the weighted TPC_cmd may be provided herein. For example, the WTRU may, for each TPC command combining period, conduct a soft symbol decision $W_i$ on each of the power control commands $TPC_i$, where i=1, 2, ..., N, where N may be greater than 1 and may be the number of TPC commands from radio links of different radio link sets, that may be the result of a first phase of combination. The WTRU may derive a combined TPC command, TPC_cmd, as a function γ of the N soft symbol decisions $W_i$:

*TPC_cmd*=γ($\alpha_1 W_1, \alpha_2 W_2, \ldots \alpha_M W_M, W_{M+1} \ldots, W_N$),
where *TPC_cmd* can take the values 1 or −1.

where $\alpha_m$>1, m=1, 2, ..., M are the scaling factors applied to the soft symbol decisions respectively for the M serving cells in multipoint transmission and is configured by higher layers.

The function γ may fulfill one or more of the following criteria. If the N $TP_i$ commands are random and uncorrelated, with equal probability of being transmitted as "0" or "1", the probability that the output of γ may be equal to 1 may be greater than or equal to $1/(2^N)$, and the probability that the output of γ may be equal to −1 may be greater than or equal to 0.5. The output of γ may equal 1 if the TPC commands from the radio link sets, that may not be ignored, may be reliably "1". The output of γ may equal −1, if a TPC command from any of the radio link sets, that may not be ignored, may be reliably "0".

For example, for processing TPC commands, the value of TPC_cmd may be zero for the first 4 TPC command combining periods. After 5 TPC command combining periods have elapsed, the WTRU may determine the value of TPC_cmd for the fifth TPC command combining period in the following way. The WTRU may determine one temporary TPC command, $TPC\_temp_i$, for each of the N sets of 5 TPC commands as follows. For a serving cell involved in the multipoint transmission, if 5 hard decisions within a set are "1", then $TPC\_temp_i=\alpha$, if 5 hard decisions within a set are "0", then $TPC\_temp_i=-\alpha$, and otherwise, $TPC\_temp_i=0$, where $\alpha \geq 1$ may be configured by the higher layers and may be configured differently for each serving cell.

For other cells in the active set, the following implementation may apply. If 5 hard decisions within a set are "1", then $TPC\_temp_i=1$. If 5 hard decisions within a set are "0", then $TPC\_temp_i=-1$. Otherwise, $TPC\_temp_i=0$.

The WTRU may derive a combined TPC command for the fifth TPC command combining period, TPC_cmd, as a function $\gamma$ of the N temporary power control commands $TPC\_temp_i$. TPC_cmd($5^{th}$ TPC command combining period)=$\gamma$ ($TPC\_temp_1$, $TPC\_temp_2$, ..., $TPC\_temp_N$), where TPC_cmd($5^{th}$ TPC command combining period) may take the values 1, 0 or -1, and $\gamma$ may be given by the following definition: TPC_cmd may be set to -1 if any of $TPC\_temp_1$ to $TPC\_temp_N$ are equal to -1, otherwise TPC_cmd may be set to 1 if $$\frac{1}{N}\sum_{i=1}^{N} TPC\_temp_i > 0.5,$$

and otherwise, TPC_cmd may be set to 0.

Power control may be performed by introducing power control procedures. In a WCDMA cellular system, an ILPC power control procedure may operate on monitoring and controlling basic physical channels (e.g., DPCCH or DPDCH), for example, such that their transmission quality is established first. The power control for other uplink physically channels (e.g., E-DPDCH and HS-DPCCH) may be established by configuring a power offset in reference to the baseline transmit power of DPCCH. In this power control mechanism, the transmission quality of HS-DPCCH may not be individually monitored and it may not be directly taken into account during the process of controlling the WTRU uplink power.

In inter-NodeB multipoint transmission operating in the same frequency, the uplink data HS-PDSCH may be received by one of the serving cells, but HS-DPCCH may be addressed to more than two serving cells residing at different NodeBs. For the serving cell that receives the HS-DPCCH, it may not be necessary to raise the WTRU transmit power if it sees weak reception of the uplink control channel. It may be desirable to introduce a mechanism such that the HS-DPCCH channel may be individually power controlled, which may optimize WTRU power efficiency.

Open loop power control may be used for HS-DPCCH. A TPC command may be introduced for HS-DPCCH power control (e.g., a new TPC command). Introduced commands may be derived from the SIR of DPCCH that may indicate the relative uplink radio condition of the related serving cell or NodeB. Rather than just reporting the desired trend in controlling the WTRU transmit power (up or down), the SIR difference from the target may be used as a criterion in calculating the HS-DPCCH TPC command with finer granularity. This may be presented by multiple bits. In an example of generating the TPC, the larger the SIR is short from the target, the more transmit power boost over HS-DPCCH may be requested by the HS-DPCCH power control.

The HS-DPCCH TPC command may be calculated, for example, by using the SIR difference as input to find an entry in a look-up table, using a linear formula proportional to the SIR difference, etc.

The introduced TPC command may be generated periodically on a per TTI or per frame basis. The introduced TPC command may be transmitted to WTRU via L1 downlink control channel.

The introduced TPC command may be generated on an aperiodic basis upon request from WTRU or triggered by an event, for example, such as when the SIR difference changes by a specific threshold. When the network generates an aperiodic TPC command, it may send the command to the WTRU by an up/down command or index to a predefined table via, for example, a defined HS-SCCH order, a defined MAC control element, and/or a defined RRC message.

The WTRU may dynamically adjust the power offset for HS-DPCCH based on the HS-DPCCH specific TPC commands it receives.

The HS-DPCCH power control implementations described herein may be referred to as open loop HS-DPCCH power control, for example, the signal quality of HS-DPCCH may not be directly monitored.

Figure 10:
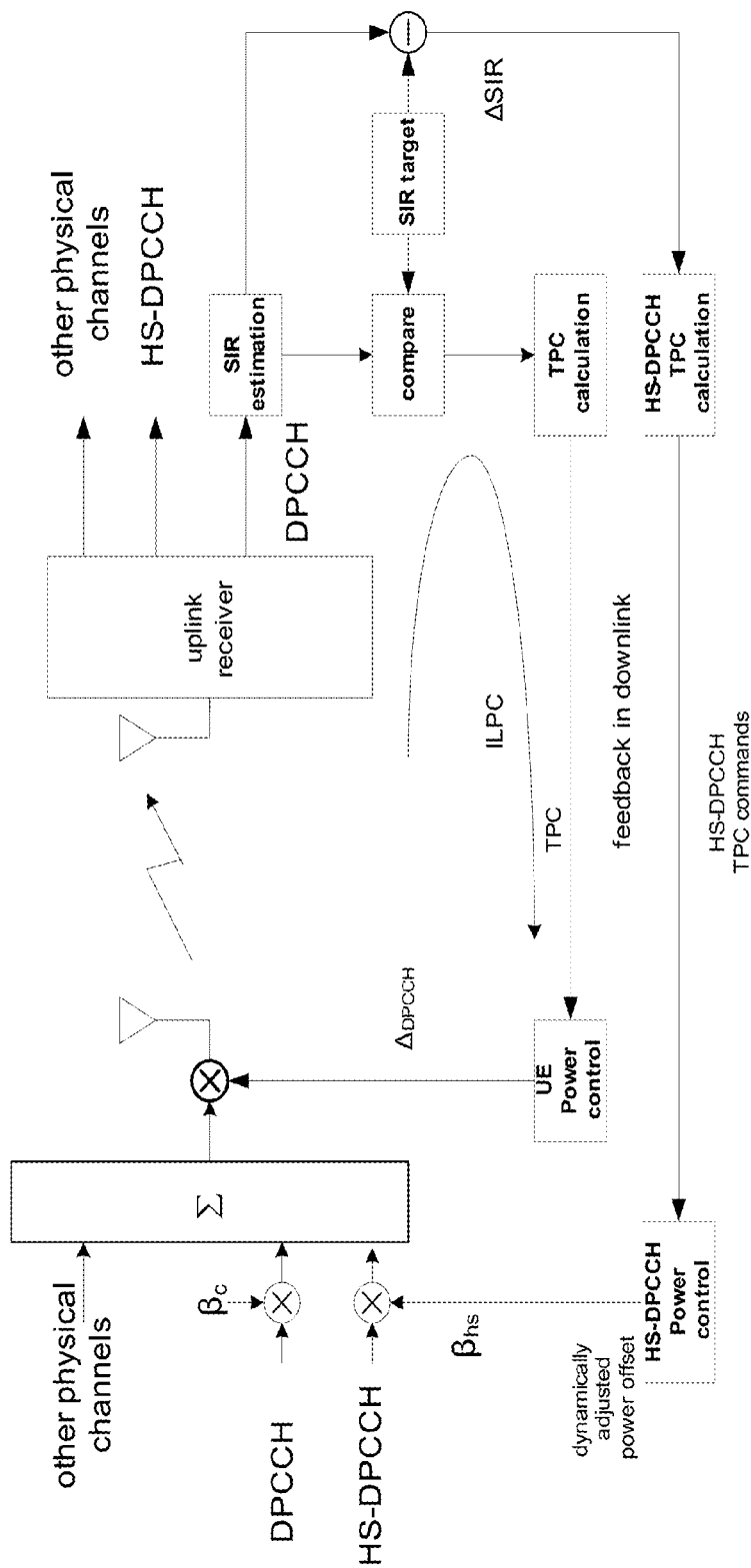
FIG. 10 is a diagram illustrating an example of open loop HS-DPCCH power control.

FIG. 10 depicts an example of an open loop HS-DPCCH power control. The HS-DPCCH may be power controlled via adjusting the gain factor $\beta_{hs}$ which may be a function of the dynamic power offset calculated by the introduced TPC command.

HS-DPCCH power control may be performed using closed loop power control for HS-DPCCH. The signal quality of HS-DPCCH may be monitored by estimating the associated SIR from the received signal, which may differ from open-loop power control for HS-DPCCH. The signal quality may be compared to a preconfigured SIR target and a 1 bit TPC command may be generated (e.g., a new command may be introduced). If the estimated SIR is higher than the target, TPC=1 and vice versa.

The introduced TPC command may be sent to WTRU via downlink physical control channel or higher layer. At the WTRU, the power offset applied on the HS-DPCCH may be dynamically or semi-dynamically adjusted according to up or down request indicated from the introduced TPC command. An example of a closed-loop HS-DPCCH power control procedure may be illustrated in FIG. 11.

Figure 11:
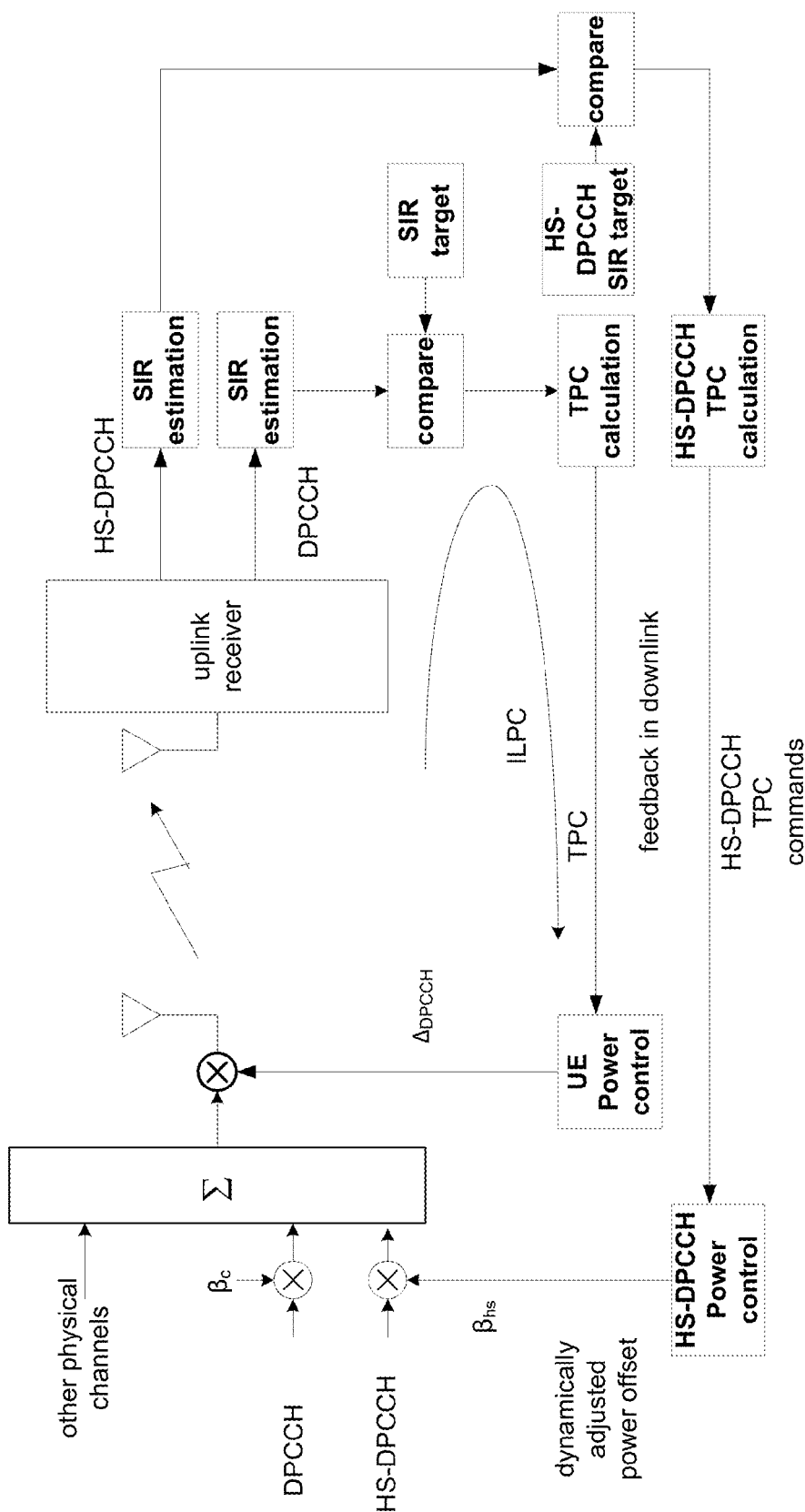
FIG. 11 is a diagram illustrating an example of closed-loop HS-DPCCH power control.

FIG. 11 depicts an example of a closed-loop HS-DPCCH power control. The introduced TPC command may an up/down command like ILPC, or with multiple bits to represent an index to a predefined power offset table, for example, for fast power adjustment.

When power control is based on monitoring HS-DPCCH, HS-DPCCH may not be available on each sub-frame as its transmission may depend on the downlink data traffic. When there is no HS-DPCCH sub-frame being transmitted, the HS-DPCCH power control loop may have to halt by freezing adjustment of the HS-DPCCH power offset, or may use other means to compensate.

TPC commands may be sent to a WTRU. For example, the introduced TPC commands may be transmitted to a WTRU in one or more of the following.

TPC commands may be transmitted by time sharing the same physical channel resources used by legacy TPCs, for example, which may be transmitted over downlink DPCCH or F-DPCH. The legacy TPCs and the introduced TPCs may be time multiplexed across different sub-frames of time-slots. A multiplexing pattern may be defined that specifies which time slots or sub-frames are used for sending the introduced TPC commands. For example, first sub-frame of a 10 ms radio frame may be used for the purpose of transmitting the introduced TPC commands. A formula may be defined that uses the connection frame number (CFN) and sub-frame index parameter (m) as input. Once certain condition are met, the introduced TPC commands may be transmitted.

TPC commands may be sent to a WTRU using higher layer signaling. For example, a MAC control message may be used to send the introduced TPC command in a semi-dynamic basis.

TPC commands may be sent to a WTRU using order-based L1 signaling to indicate insufficient HS-DPCCH transmit power. For example, an order may be defined in HS-DPCCH that may request the WTRU to boost or reduce its power offset applied on HS-DPCCH. The order may be defined to signal an index to a table, or the like.

Network support may be provided for HS-DPCCH power control. The TPC commands transmitted from different cells may be required to be sent to the WTRU, for example, on a frequent basis. This may be true when the cells within the active set support the same uplink frequency over which the HS-DPCCHs may be operating. Some multipoint transmission scenarios may occur. Some cells may be working on a different downlink frequency such that their TPC commands may be in response to a different radio uplink. An example of these scenarios is illustrated in FIG. 12.

Figure 12:
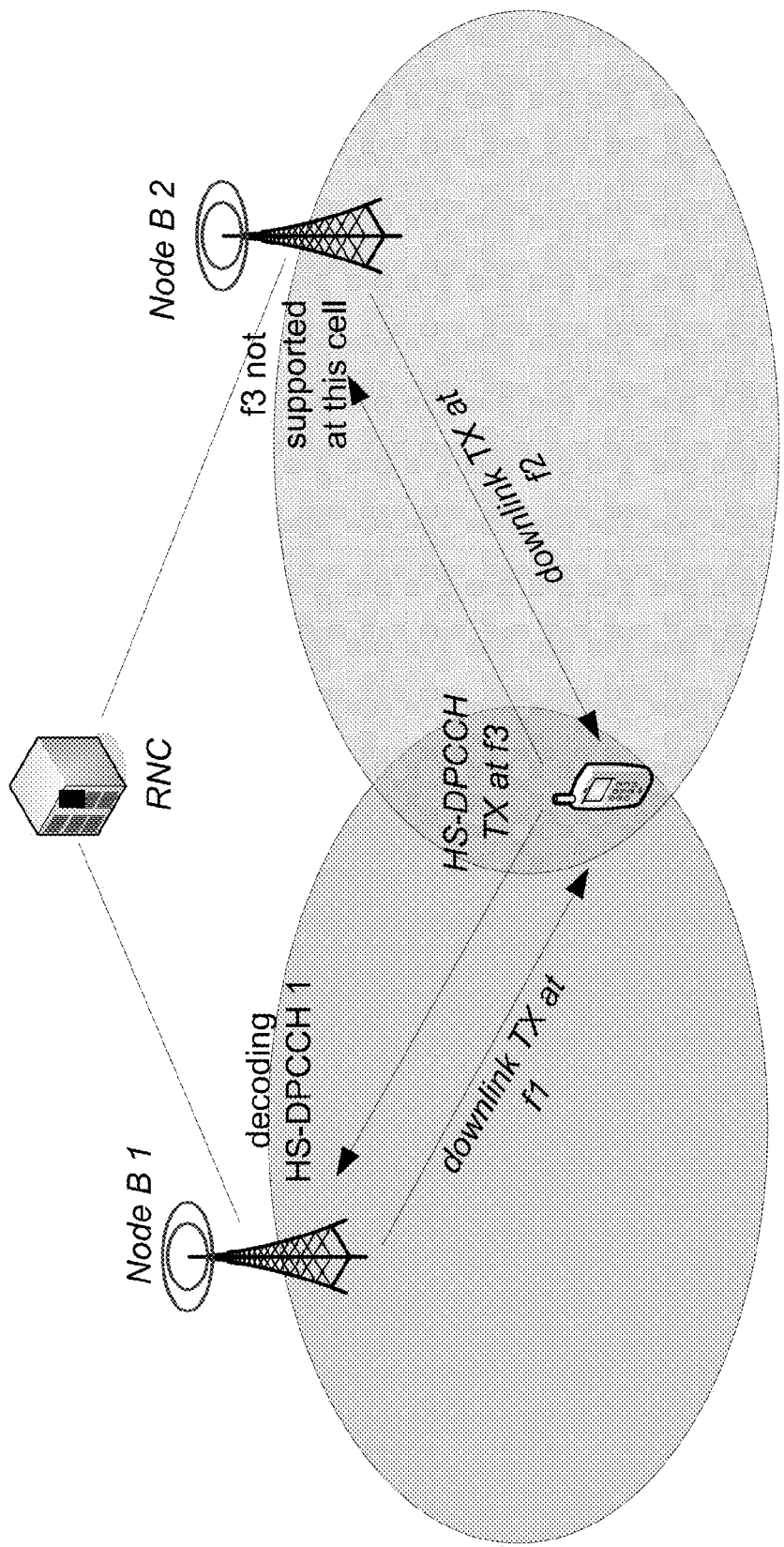
FIG. 12 is a diagram illustrating an example of multipoint transmission operating in different frequencies.

FIG. 12 depicts an example of multipoint transmission operating in different frequencies. If there exists another cell in the same NodeB that may be operating in the same frequency of HS-DPCCH, the network may configure this cell to receive the uplink feedback information for supporting the multipoint transmission. The downlink transmission of this cell, though, may be used to serve other WTRUs of its own cell without being involved with the multipoint transmission. This cell may not be within the active set for this WTRU. The network may configure this supporting cell to transmit TPC commands corresponding to the uplink where the HS-DPCCH may be carried. The WTRU may be configured by the network to process the TPC commands from this supporting cell that may not be in the active set.

In order for the WTRU to determine the cell from which the TPC command for the second HS-DPCCH is being received, the WTRU may be configured or may indicate which cell to monitor. The network may indicate the cell in the primary frequency that is in the WTRU's active set and that may correspond to the cell in the secondary frequency for which the WTRU is sending HS-DPCCH feedback.

Methods may be performed to reduce a cubic metric. When a second HS-DPCCH is introduced in the same uplink, whether it is allocated with a different channelization code or with a different I/Q branch, the overall Cubic Metric (CM) of WTRU transmit signal may be adversely impacted. Because the cubic metric may be deemed as a measure that may directly impact the WTRU power efficiency, implementations may include an HS-DPCCH design that minimizes the CM.

Reducing the CM may include one or more of the following. When different power offsets are applied to one or more HS-DPCCH channels, the control channel with the larger power may be mapped to the channelization code that has a smaller cubic metric. For example, the radio link to the secondary serving NodeB (or cell) may be considered weaker than what may be used to ensure the transmission quality, such that the HS-DPCCH intended for this NodeB may be assigned with a channelization code of smaller CM. In particular, $C_{ch,256,64}$ may be used for the HS-DPCCH for this NodeB, and $C_{ch,256,32}$ may be used for the HS-DPCCH of another NodeB that requires lower transmit power.

When different power offsets are applied to the HS-DPCHs, the one with the largest power may be mapped to a I/Q branch that has the smaller cubic metric. For example, the radio link to the secondary serving NodeB (or cell) that may utilize higher transmit power, for example, to ensure the transmission quality may be considered weaker. The HS-DPCCH intended for this NodeB may be assigned with a I/Q branch of the smaller CM. In particular, the Q branch of $C_{ch,256,33}$ may be used for the HS-DPCCH for this NodeB, and I branch of $C_{ch,256,33}$ may be used for the HS-DPCCH of another NodeB that requires lower transmit power.

When the power offsets are dynamically adjusted, HS-DPCCH channels may be allowed to get reassigned to different channelization codes or I/Q branches. Signaling may be designed to inform the NodeBs about the reassignment.

Though implementations described herein may be defined under the context of dual HS-DPCCH channel structure, the implementations described herein are applicable to the cases of single HS-DPCCH where the feedback messages intended to different NodeBs or serving cells can be separately treated as if they are in two different feedback channels. For example, the power offset values may be calculated differently by one or more of the power control implementations described herein.

An HS-DPCCH frame structure may be designed with a single channel format. The feedback information (e.g., a portion of the feedback information) may be made separable into different HS-DPCCH fields according to the addressed destinations (e.g., as described herein). The HS-DPCCH power control may be made HS-DPCCH field specific. For example, the HS-DPCCH power offset may be made per NodeB specific. Mapping HS-DPCCH fields to the same notation HS-DPCCH1 and HS-DPCCH2, implementations described herein may be applicable for the single HS-DPCCH frame structure. For example, the CQIs addressed to different NodeBs may be mapped to different HS-DPCCH fields. The power offsets for the CQI fields may be independently configured for different NodeBs. The power offset used for a NodeB may be changed (e.g., dynamically changed) according to one or more of the implementations described herein.

When the feedback information has to be jointly encoded (e.g., into a common HS-DPCCH field) for the cells across different NodeBs, such as but not limited to ACK/NACK information when two cells may be configured for multipoint transmission, a WTRU may use a power offset to ensure adequate reception at both cells. If the HS-DPCCH field that carries the joint feedback information changes (e.g., dynamic activation or deactivation of serving cells) to a single destination reporting in some time instance, a power offset that may be adequate for that destination may be used.

HARQ timing budget allocations may be disclosed. The uplink feedbacks serving the serving cells in multipoint transmission may be carried in a single HS-DPCCH physical control channel. The downlink transmission timing of the serving cells, or NodeBs, may not be aligned due to asynchronous nature of the UMTS system. In order to accommodate the timing needs of multiple cells, a single HS-DPCCH design implementation may have to result in tighter timing constraints over HARQ retransmissions, which may lead to a reduction of processing timing budget at WTRU and/or NodeB.

Figure 13:
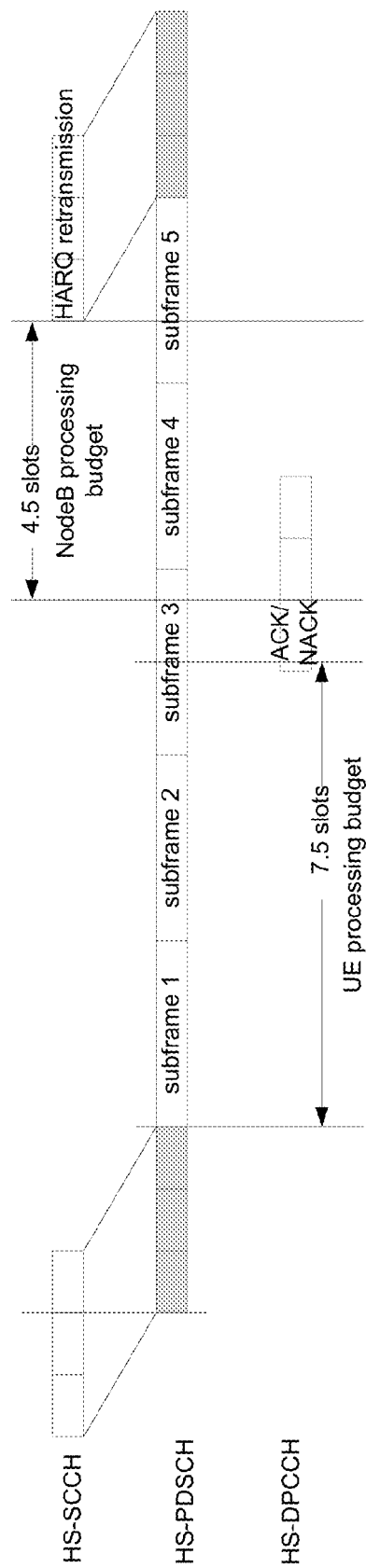
FIG. 13 is a diagram illustrating an example of timing relation for single point transmission.

FIG. 13 depicts an example of a timing relation for single point transmission. The HARQ timing illustrated in FIG. 13 utilizes a processing timing budget of 4.5 slots for NodeB and 7.5 slots for WTRU.

Figure 14:
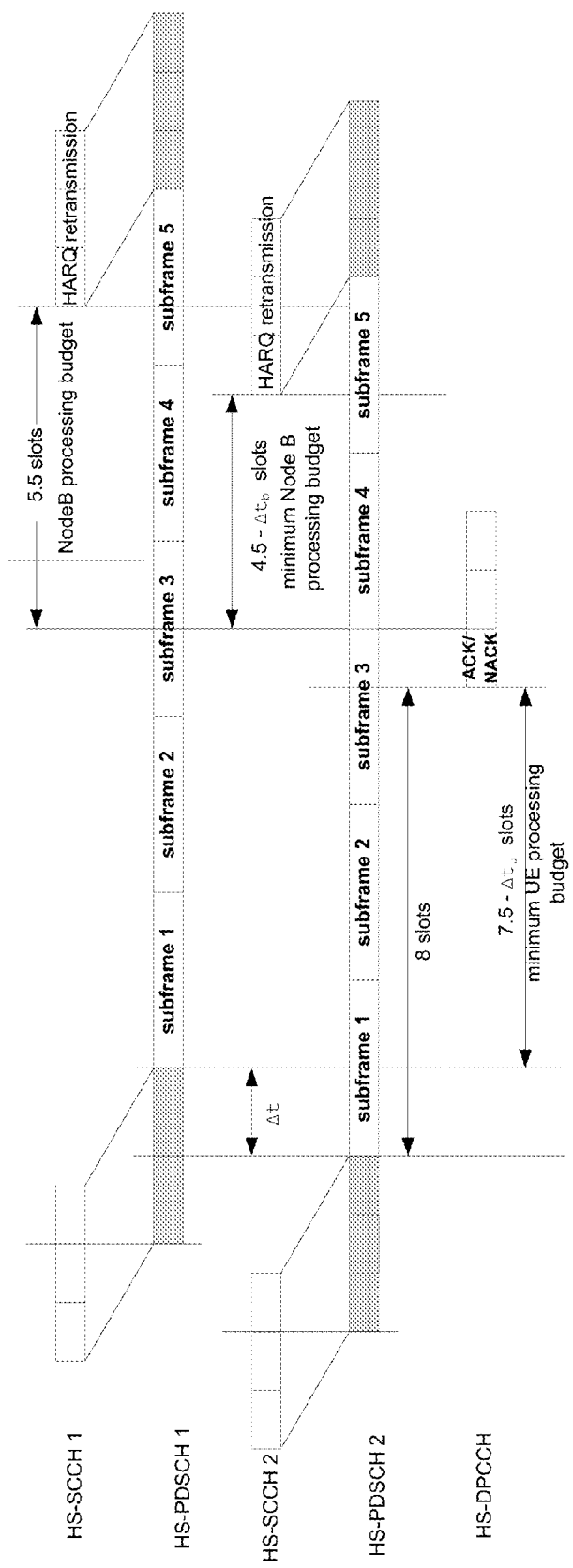
FIG. 14 is a diagram illustrating an example of timing relation for multipoint transmission.

FIG. 14 depicts an example of a timing relation for multipoint transmission. As shown in FIG. 14, a timing relation for a two cell configuration for multipoint transmission may not be time aligned. For example, since data on HS-PDSCH2 may arrive before data on HS-PDSCH1, the encoder may have more time to decode the information received on HS-PDSCH2 before having to respond to cell 2 on the DPCCH. Since data on HS-PDSCH1 arrives later, the encoder may not have enough time to decode the information received on HS-PDSCH1 prior to having to respond on the DPCCH. If there is not enough time for the decoder to decode the information received on the HS-PDSCH1 from the first cell, then the decoder may not have anything to feedback to cell 1 on the DPCCH.

Due to transmission timing offset (e.g., which may be denoted by $\Delta t$) between two HS-PDSCHs, the available HARQ processing budget for HS-PDSCH1 may be compressed at a WTRU by an amount of $\Delta t_u$, and at a NodeB the processing budget may be reduced for retransmission of HS-PDSCH2 by an amount of $\Delta t_b$.

To balance the processing timing budget between a WTRU and a NodeB, a proportional criterion may be used. For example, the criterion may be expressed by:

$$\frac{\Delta t_b}{4.5} = \frac{\Delta t_u}{7.5}$$

The criterion may ensure that the relative loss of timing budgets between the WTRU and the NodeB are substantially equal. This criterion may be utilized when a rate restriction is applied, for example, in an effort to cope with the loss of the processing time, such that the processing loads of the WTRU and the NodeB are substantially equally balanced.

With the constraint of $\Delta t_b + \Delta t_u = \Delta t$:

$$\Delta t_b = \frac{\Delta t}{1 + \frac{7.5}{4.5}} = 0.375 \Delta t \approx 0.4 \Delta t \text{ slots}$$

$$\Delta t_u = \frac{\Delta t}{1 + \frac{4.5}{7.5}} = 0.625 \Delta t \approx 0.6 \Delta t \text{ slots}$$

A WTRU may transmit the ACK/NACK in response to the HS-PDSCH according to one or more of the following.

Implementations may utilize dynamic adjustment of the transmission timing of HS-DPCCH according to the timing offset ($\Delta t$) between the two HS-PDSCHs received. A WTRU may transmit the corresponding HS-DPCCH $\Delta t_u$ slots after it receives the last HS-PDSCH sub-frame, where $\Delta t_u$ may be defined in the equation described above. When the timing offset is small, the processing timing budget may be returned to the WTRU and the NodeB.

Figure 15:
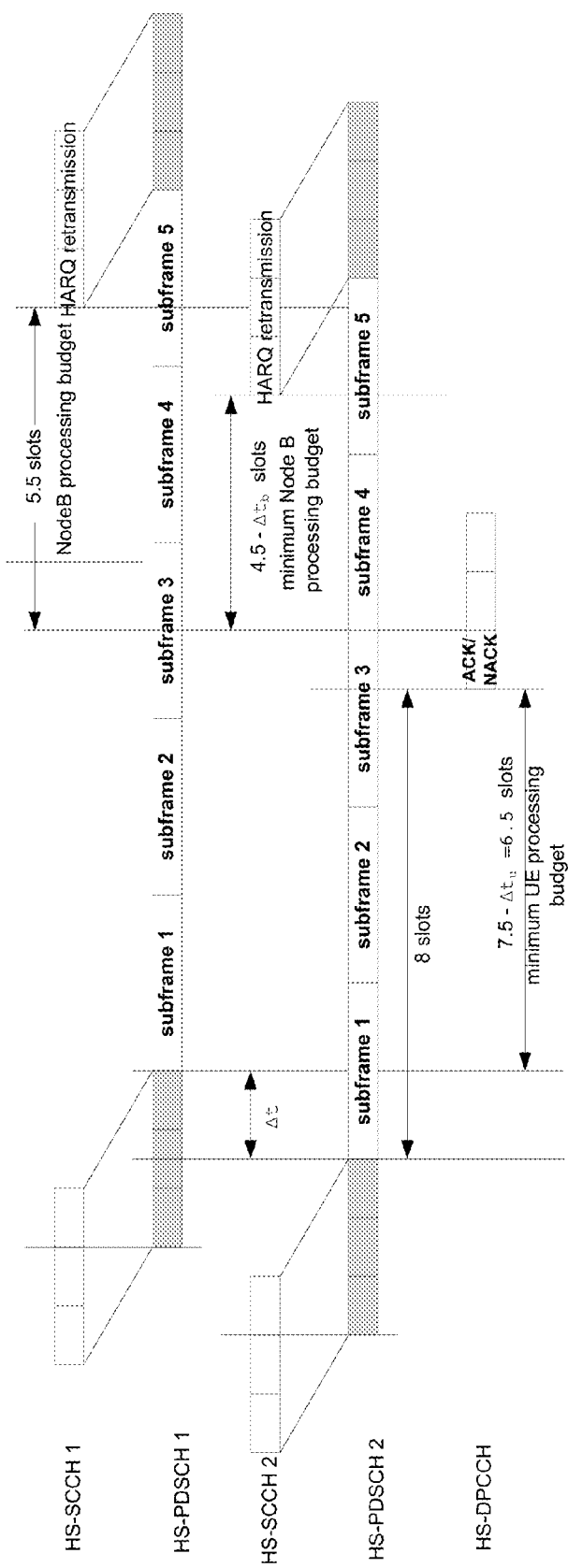
FIG. 15 is a diagram illustrating an example of multipoint transmission with fixed transmission timing.

The transmission timing of HS-DPCCH may be fixed in implementations described herein. For example, a timing offset of $\Delta t = 1.5$, $\Delta t_u = 0.625*1.5 = 0.9375 \approx 1$ slot may be assumed. The WTRU may transmit the corresponding HS-DPCCH ($7.5 - \Delta t_u = 7.5 - 1 = 6.5$) slots after it receives the last HS-PDSCH sub-frame. FIG. 15 depicts an example of multipoint transmission with fixed transmission timing. Given this compression timing design, a restriction of the peak downlink transmission rate may be applied. For example, this may allow $6.5/7.5 = 0.8667 \approx 0.85$ percent of maximum physical layer capacity being scheduled at the NodeB.

In implementations described herein, $T_b$ may denote the maximum processing time required at a NodeB to encode the highest downlink data. $T_u$ may denote the processing time required at a WTRU to decode the same rate. The compressing time allowances at both sides may be defined as:

$$\Delta t_b = \frac{\Delta t}{1 + \frac{T_u}{T_b}} \text{ slots}$$

$$\Delta t_u = \frac{\Delta t}{1 + \frac{T_b}{T_u}} = \text{slots}$$

where the values of $T_b$ and $T_u$ may be determined or preconfigured by hardware. Given this compression timing design, a restriction of the peak downlink transmission rate may be applied which may allow $$\frac{T_u - \Delta t_u}{T_u}$$

percent of maximum physical layer capacity being scheduled at the NodeB.

Although implementations described herein may be explained utilizing two HS-PDSCHs from two serving cells, the implementations described herein may be extended to cases where any plurality of HS-PDSCHs are received from any plurality of cells.

Cell deactivation may be restricted in implementations described herein. When multiple serving cells are configured to perform multipoint transmission to a WTRU, one or more of the serving cells may be deactivated (e.g., dynamically deactivated), for example, for WTRU power saving and/or network load balancing. In order to reduce the complexity of configuring the HS-DPCCH in multipoint transmission mode, restriction rules may be utilized when cell deactivation is performed.

The primary NodeB may be the main serving NodeB. The secondary NodeB may be a NodeB assisting the inter-NodeB multipoint transmission. The primary frequency may be the frequency pair (downlink and uplink) at which the HS-DPCCH may be transmitted. The secondary frequency may be a frequency pair (downlink and uplink) at which no HS-DPCCH may be transmitted. The primary serving cell may be the anchor cell that supports the HSPA uplink and downlink physically channels. It may be served by the primary NodeB and/or may operate in the primary frequency. The primary secondary serving cell may be the secondary cell served by a secondary NodeB who may be operating in the primary frequency capable of receiving HS-DPCCH.

The rules of restricting the cell deactivation may include one or more of the following: (1) Deactivation of a primary serving cell may not be allowed; (2) Independent deactivation of secondary serving cell(s) served by the primary Node may be allowed; (3) Deactivation of a primary serving cell and primary secondary serving cells may not be allowed; (4) Independent deactivation of the serving cells served by a secondary NodeB, except the primary secondary cell, may be allowed; (5) Deactivation of a primary secondary serving cell may be allowed if the other secondary serving cells served by the same secondary NodeB are not active; and (6) Secondary serving cells operating in the same frequency may be deactivated or activated substantially simultaneously by the same L1 order.

As an example of applying a combination of the above rules to multipoint transmission involving four cells in two NodeBs, Table 12 illustrates an example of allowed cell deactivation combinations, where A stands for active and D for deactive.

TABLE 12

Example of Allowed Deactivation Status

| Allowed Case number | Cells served by primary NodeB | | Cells served by secondary NodeB | |
|---|---|---|---|---|
| | Primary cell, f1 | Secondary serving cell, f2 | Primary secondary serving cell, f1 | Secondary serving cell, f2 |
| 1 | A | A | A | A |
| 2 | A | D | A | A |
| 3 | A | A | A | D |
| 4 | A | D | A | D |

Table 13 illustrates another example of allowed cell deactivation combinations, where A stands for active and D for deactive.

TABLE 13

Example of Allowed Deactivation Status

| Allowed Case number | Cells served by primary NodeB | | Cells served by secondary NodeB | |
|---|---|---|---|---|
| | Primary cell, f1 | Secondary serving cell, f2 | Primary secondary serving cell, f1 | Secondary serving cell, f2 |
| 1 | A | A | A | A |
| 2 | A | D | A | D |
| 3 | A | D | D | D |

Figure 16:
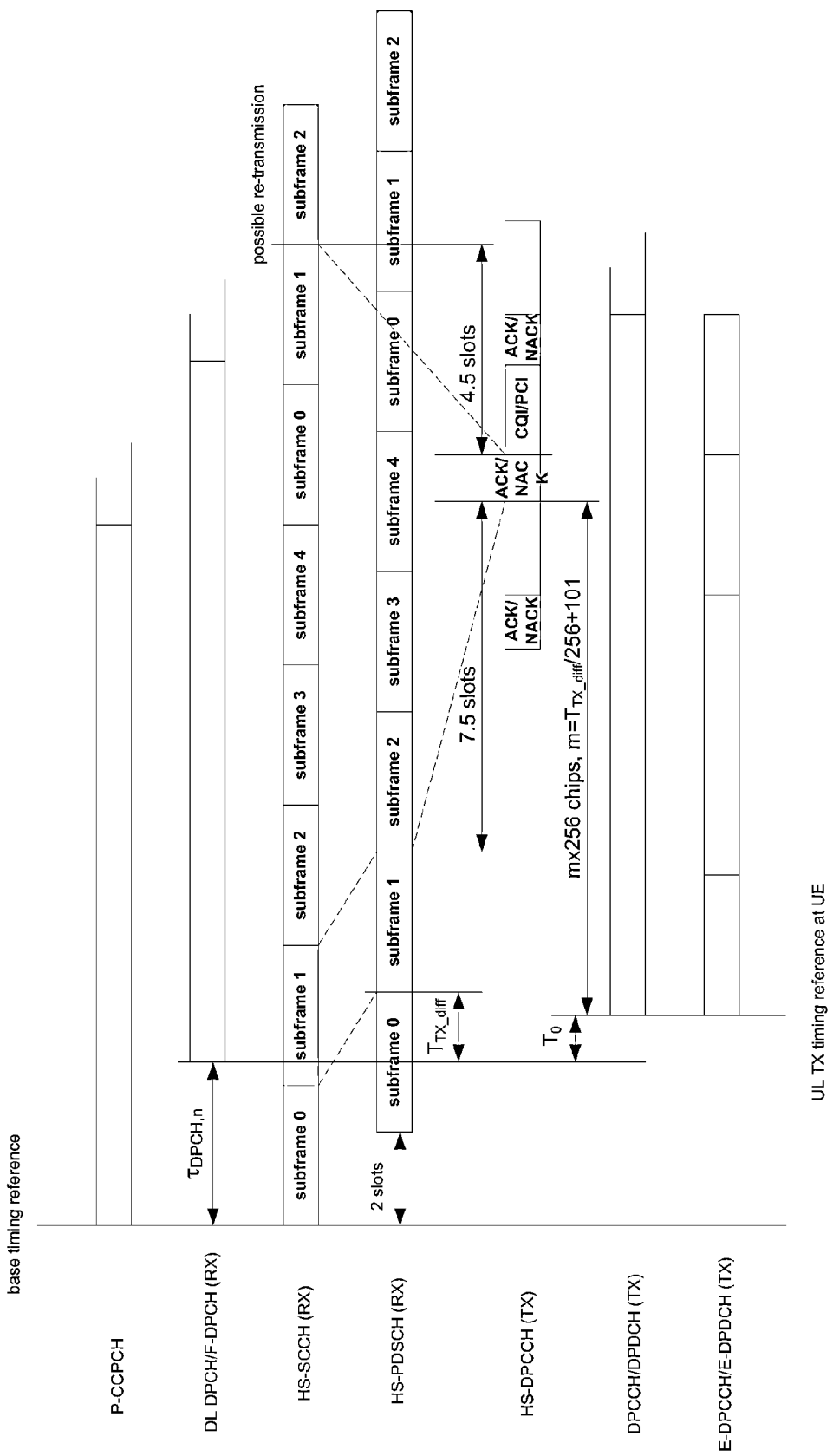
FIG. 16 is a diagram illustrating an example of a timing diagram specified at a user equipment.

Uplink transmission timing control when a single HS-DPCCH format is used may be disclosed. FIG. 16 depicts an example of a timing diagram specified at a WTRU. For example, FIG. 16 depicts an example of multipoint transmission with fixed transmission timing, where the frame timing of the P-CCPCH may serve as a base timing reference from which transmission timing of other physical channels may be derived, for example, directly or indirectly. The uplink and downlink may be related at the WTRU by tracking the reception of downlink DPCH or F-DPCH, which may be transmitted from the network with a cell-specific offset (e.g., $\tau_{DPCH,n}$) from the P-CCPCH. This offset may be signaled to the WTRU via RRC signaling at the initial radio link establishment. The timing reference for transmission of uplink (UL) physical channels may be derived with a delay of T0=1024 chips to the detected corresponding DPCH/F-DPCH frame boundary.

With the UL transmission timing reference being established at a WTRU, the UL physical channels may be transmitted as follows. An UL DPCCH/DPDCH frame transmission may start at the UL timing reference. The frame timing of E-DPCCH/E-DPDCHs may be aligned with the UL DPCCH. HS-DPCCH may be transmitted m×256 chips after the UL timing reference, where values of m may be derived by taking into account the offset parameter between a HS-DPSCH sub-frame and a DPCH/F-DPCH frame, for example:

$$m = T_{TX\_diff}/256 + 101$$

Regardless of how the m parameter is derived, the offset of HS-DPCCH to E-DPCCH/E-DPDCH may be a multiple of 256 chips, for example, to keep orthogonality of the physical channels. This may require $\tau_{DPCH,n}$ and $T_{TX\_diff}$ to be a multiple of 256 chips at RRC configuration/reconfiguration. The timing relation of HS-DPCCH and E-DPCCH/E-DPDCH may be kept constant at RRC configuration or reconfiguration. During a connection, if the WTRU's clock drifts away from the network timing, the WTRU may adjust (e.g., autonomously adjust) its DPDCH/DPCCH transmission time instant to follow the UL transmission timing reference. The transmission timing of HS-DPCCH may be adjusted by the same amount in order to keep a constant offset with the DPDCH/DPCCH.

The transmission timing of HS-DPCCH may be linked to the reception of HS-PDSCH. HS-DPCCH may be transmitted with reference to reception of the corresponding HS-PDSCH sub-frame, for example, approximately 7.5 slots after the reception (e.g., the complete reception) of the corresponding HS-PDSCH sub-frame. The NodeB may observe nearly constant timing relation between the transmitted HS-PDSCH sub-frame and the related HS-DPCCH (e.g., 7.5 slots plus the round trip delay).

If multiple carrier operation is configured, the transmission timing of secondary cells may not be involved in deciding the UL transmission timing. This may be feasible because it may be assumed that the secondary cells are aligned with the primary cell in timing.

With the introduction of multiflow transmission involving multiple cells, the transmission timing specification and constraints described herein may be modified, for example with inter-NodeB deployment.

Implementations may be described herein with relation to multipoint transmissions involving two serving cells (e.g., a primary and a secondary) or two NodeBs. The implementations described herein may be applied to cases of any plurality of serving cells and/or any plurality of NodeBs.

Two or more HS-PDSCH sub-frames may be paired. Due to the asynchronous nature of the UMTS network, one or more of the reference clocks at the multiple sites in an inter-NodeB deployment may drift apart from each other. As result, the HS-PDSCH sub-frames from the serving cells involved in MP transmission may not be aligned and their time relationship to each other may be time varying.

When a single HS-DPCCH channel structure is utilized, the ACK/NACK messages responding to different cells may be combined and jointly encoded into the same HARQ-ACK field. Rules of pairing the HS-PDSCH sub-frames from multiple cells may be specified for the purpose of reporting the acknowledgement of the data carried in these sub-frames.

Implementations for the HS-PDSCH sub-frame pairing may include, but are not limited to, a maximum overlap pairing rule and a fixed-relation pairing rule.

In a maximum overlap pairing rule, the sub-frames of two cells may be paired if their overlap portion may be no less than a specific number of slots (e.g., 1.5 slots). This pairing rule may ensure that paired sub-frames have maximum overlap (e.g., substantially maximum overlap). For example, the maximum offset of the paired sub-frames may be 1.5 slots, such that, for example:

$$|\Delta t| = |T_{HS-PDSCH,P} - T_{HS-PDSCH,S}| \leq 1.5 \text{ slots}$$

where $T_{HS-PDSCH,P}$ and $T_{HS-PDSCH,S}$ may denote the start timing of the sub-frames for the primary and secondary serving cells respectively. Although 1.5 slots is used as an example, implementations described herein may utilize a maximum overlap rule that includes a maximum offset other than 1.5 slots.

In a fixed-relation pairing rule, the sub-frames of the two or more cells may be paired if they are overlapped and the sub-frame from primary cell arrives first. This pairing rule may provide a fixed position relationship between the two or more cells. For example, the sub-frame offset may be between 0 and 3 slots, such as:

$$0 \leq \Delta t \leq 3 \text{ slots}$$

Figure 17:
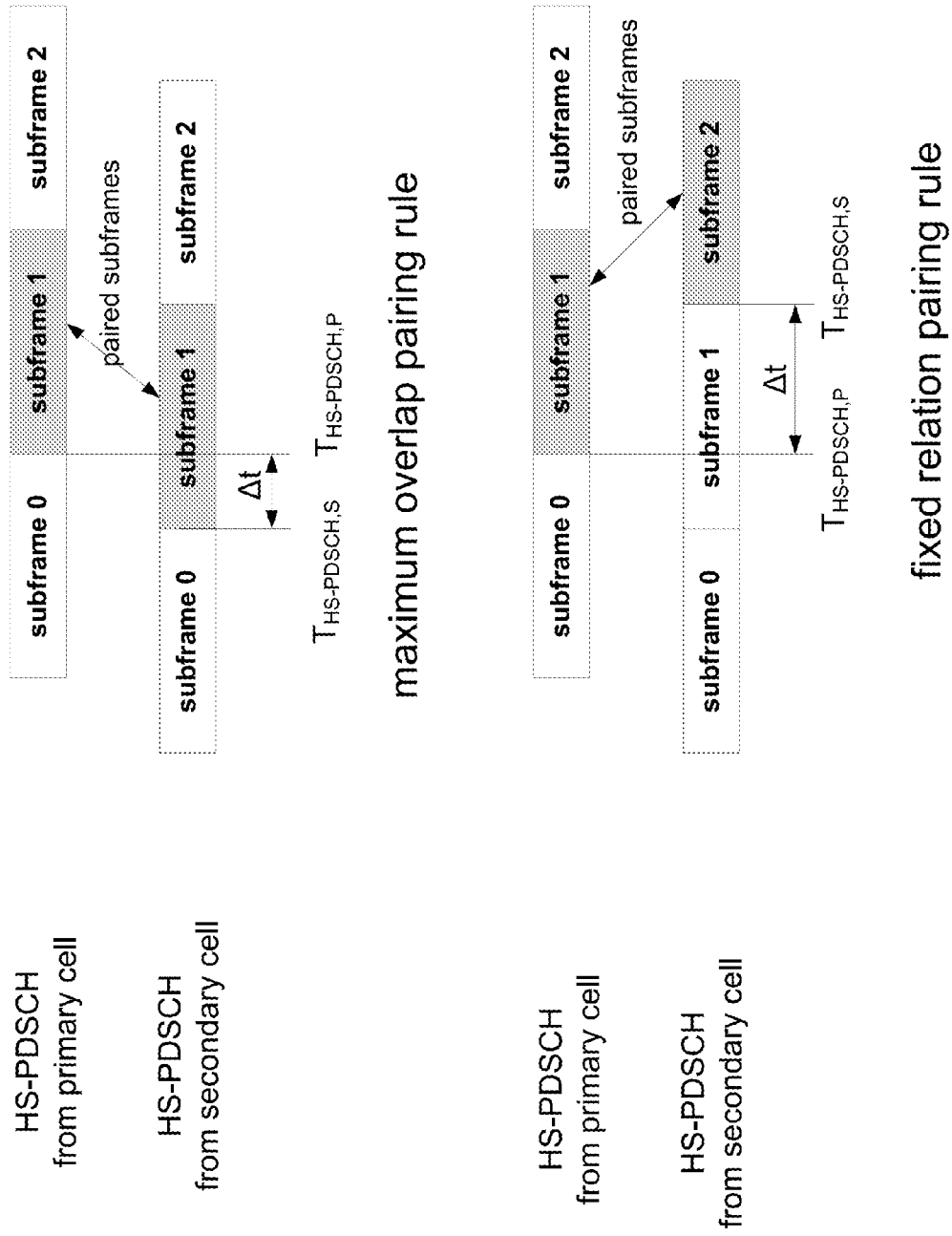
FIG. 17 is a diagram illustrating an example of a difference of two pairing rules.

An example of a difference between the two pairing rules may be illustrated in FIG. 17, for example, when the same HS-PDSCH arrival time is observed at a WTRU.

Implementations including various transmission timing designs for HS-DPCCH may be provided. The pairing rules described herein may result in different uplink transmission timing designs and/or WTRU behaviors.

HS-DPCCH transmission timing when a maximum overlap pairing scheme implementation is used may be provided. There may be one uplink reference timing, which may be derived from the downlink transmission from the primary serving cell. The HS-DPCCH may be transmitted with a constant time relationship with the uplink timing transmission reference.

An additional uplink transmission timing reference with regards to the downlink of the secondary cell may be used, for example, to deal with complexity that may be encountered in an inter-NodeB deployment due to misaligned downlink sub-frames for multipoint transmission.

The timing reference for the HS-DPCCH transmission may be made switchable between two or more (e.g., a plurality) of serving cells. The timing reference may depend on the relative position of the downlink HS-PDSCH sub-frames of the two or more serving cells. For example, a WTRU may switch (e.g., dynamically switch) the timing reference serving cell from one serving cell to another serving cell during communication with a network in an inter-NodeB deployment. Reception of a primary common control physical channel (P-CCPCH) of the timing reference cell may serve as a reference for the WTRU for the timing of transmission(s) of uplink data (e.g., feedback data) on the HS-DPCCH. If a WTRU changes which serving cell is being utilized as the timing reference cell, then the WTRU changes its reference (e.g., the reception of the P-CCPCH of the serving cell (e.g., another serving cell) that is denoted the timing reference cell) that may be used for the timing of transmission of uplink data (e.g., feedback data) on the HS-DPCCH. The transmission timing of the uplink dedicated physical control channel (DPCCH) (e.g., and other uplink physical channels, such as, but not limited to E-DPCCH and E-DPDCH) may not be changed when changing the timing reference for uplink HS-DPCCH transmission. For example, HS-DPCCH transmission timing may be as follows.

When $\Delta t \geq 0$, which may mean that the HS-DPCCH from the primary cell arrives first (e.g., before the HS-DPCCH from the secondary cell) in the paired sub-frames, the HS-DPCCH may be transmitted m×256 chips after the primary uplink transmission timing reference. The primary uplink transmission timing reference may be defined as a time point which is T0=1024 after the reception of the downlink from the primary serving cell. m may be calculated from the timing parameter provided at RRC connection:

$$m = T_{TX\_diff}/256 + 101$$

When $\Delta t < 0$, which may mean that the HS-DPCCH from the primary cell arrives later in the paired sub-frames, the HS-DPCCH may be transmitted m×256 chips after the secondary uplink transmission timing reference. The secondary uplink transmission timing reference may be defined as a time point which is $T_0 = 1024$ after the reception of the downlink from the secondary serving cell. m may be calculated from the timing parameter provided at RRC connection:

$$m = T_{TX\_diff}/256 + 101$$

Figure 18:
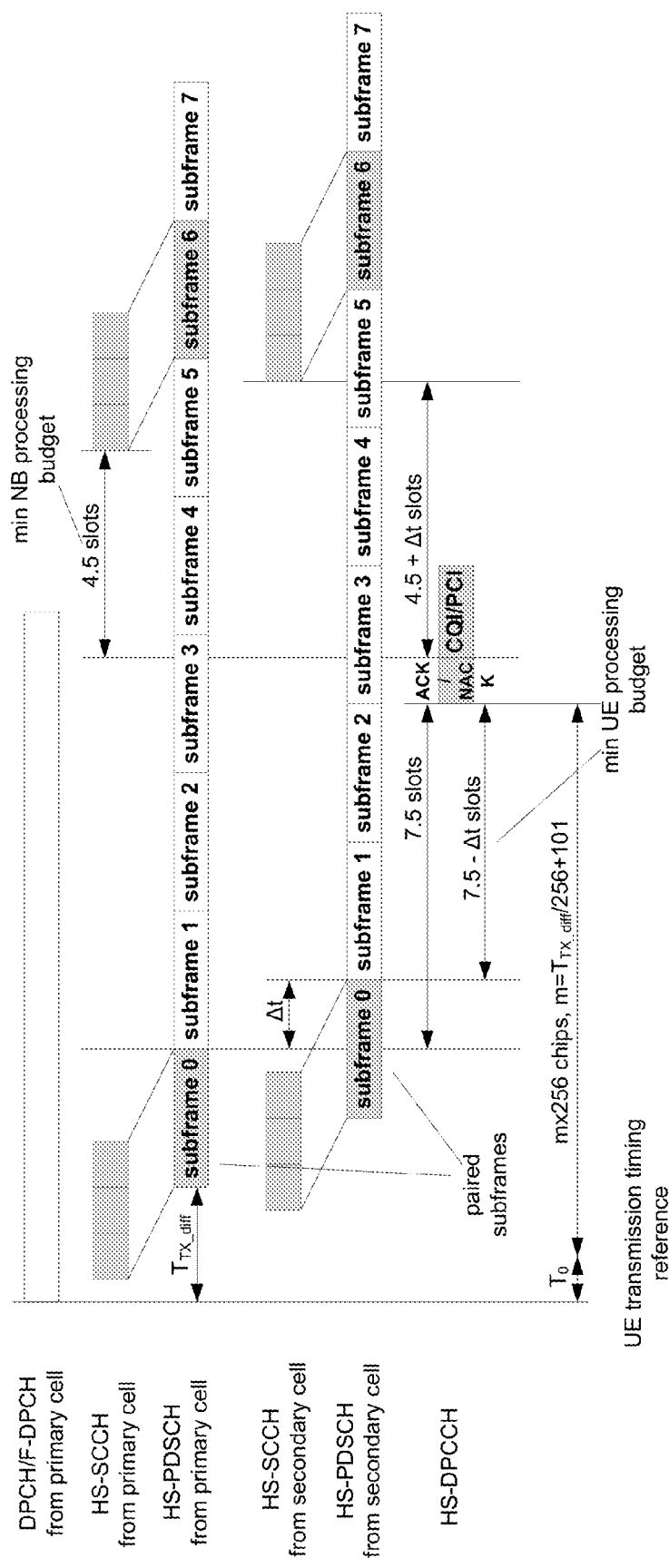
FIG. 18 is a diagram illustrating an example of HS-DPCCH transmission when primary HS-PDSCH subframe may be ahead.
Figure 19:
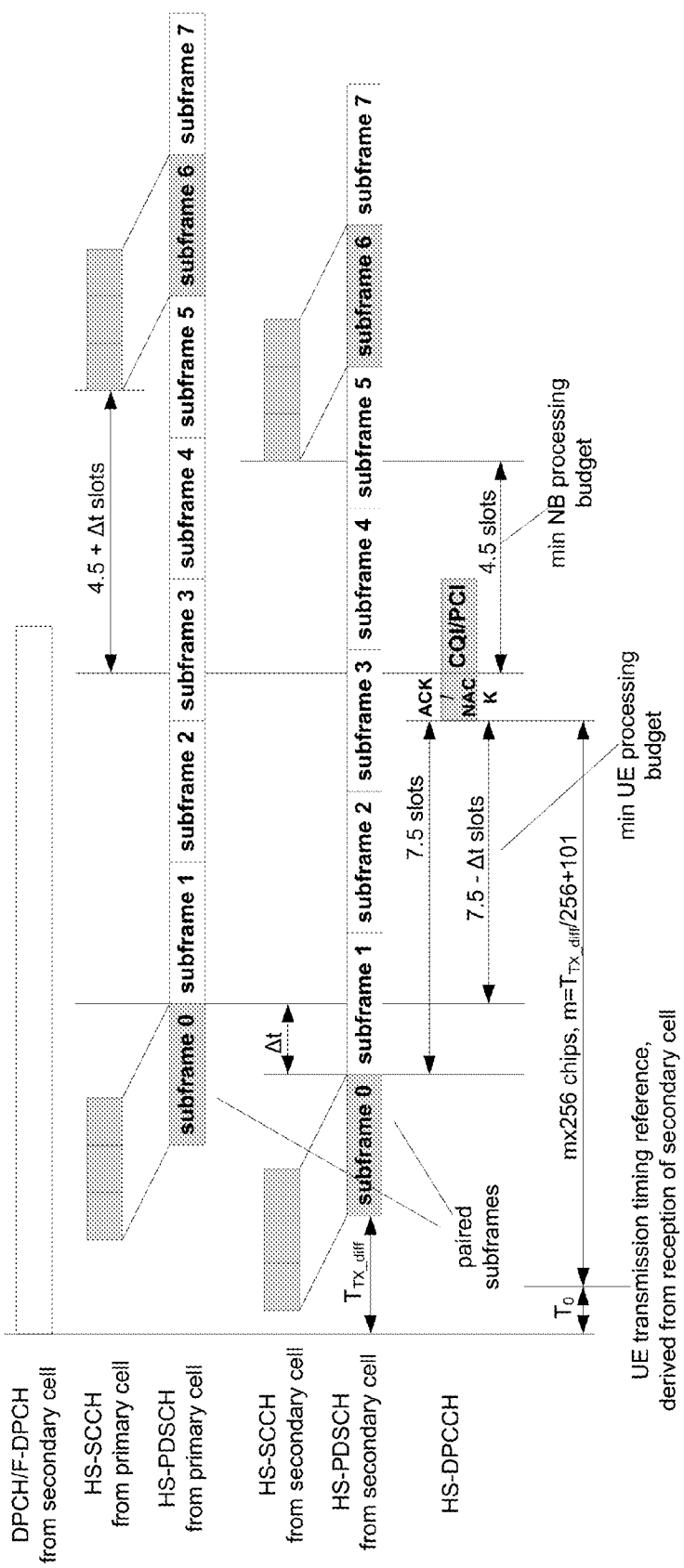
FIG. 19 is a diagram illustrating an example of HS-DPCCH transmission when primary HS-PDSCH subframe may be behind.

FIG. 18 depicts an example of HS-DPCCH transmission when primary HS-PDSCH sub-frame may be ahead. FIG. 19 depicts an example of HS-DPCCH transmission when primary HS-PDSCH sub-frame may be behind.

In the examples of FIG. 18 and FIG. 19, the maximum amount of WTRU budget reduction may not exceed 1.5 slots since $|\Delta t| \leq 1.5'$. The HARQ processing budget at either the primary or secondary serving cells may not be reduced. The HARQ processing budget may be maintained greater than or equal to 4.5 slots. This may provide a minimized impact to the network.

For inter-NB deployment, the network of two cells may drift way from each other, which may cause the HS-PDSCH timing offset of the two cells to vary over time. If this occurs, the WTRU may switch (e.g., dynamically switch) its HS-DPCCH transmission timing reference according to the timing relation between two cells.

For example, first uplink data (e.g., feedback data) may be transmitted by a wireless transmit/receive unit (WTRU) on a high speed dedicated physical control channel (HS-DPCCH) to a first serving cell (e.g., or a first set of serving cells) and a second serving cell (e.g., or a second set of serving cells), where the first serving cell may be used as a timing reference cell for the uplink transmission. The first serving cell may be associated with a first NodeB and the second serving cell may be associated with a second NodeB. An inter-NodeB implementation may be utilized.

First downlink data may be received from the first serving cell and second downlink data may be received from the second serving cell. The first downlink data and/or the second downlink data may be received on a HS-PDSCH. A subframe of the first downlink data may be offset from a subframe of the second downlink data. The second downlink data may be received prior to the first downlink data. A subframe of the first downlink data may be paired with a subframe of the second downlink data such that there may be a substantially maximized overlap between the subframe of the first downlink data and the subframe of the second downlink data.

A timing reference for uplink transmission may be changed from the first serving cell to the second serving cell, such that the second serving cell may be used as the timing reference cell for future uplink transmission on the HS-DPCCH. Reception of a primary common control physical channel (P-CCPCH) of the timing reference cell may serve as a reference for the WTRU for the timing of transmission(s) of uplink data on the HS-DPCCH. The transmission timing of the dedicated physical control channel (DPCCH) (e.g., and all other uplink physical channels except the HS-DPCCH) may not be changed when changing the timing reference for uplink transmission. Prior to changing the timing reference, a paired subframe of the second serving cell may be received prior to a paired subframe of the first serving cell.

Second uplink data (e.g., feedback data) may be transmitted by the WTRU on the HS-DPCCH to the first serving cell and the second serving cell using the second serving cell as the timing reference cell. The first uplink data (e.g., feedback data) and the second uplink data (e.g., feedback data) may include one or more of a HARQ-ACK, a HARQ-NACK, or CQI data. The first uplink data (e.g., feedback data) may include the feedback information for the first serving cell, for example, which may be associated with a primary NodeB. The second uplink data (e.g., feedback data) may include the feedback information of the second serving cell, for example, which may be associated with a secondary (e.g., assisting) NodeB. The feedback data for the first serving cell and the feedback data for the second serving cell may be allocated into separate fields of the HS-DPCCH based on destination (e.g., NodeB). The first uplink data (e.g., feedback data) and the second uplink data (e.g., feedback data) may include first serving cell data and second serving cell data. The first uplink data (e.g., feedback data) and the second uplink data (e.g., feedback data) may be allocated into separate fields of the HS-DPCCH based on the destination of the data. The separate fields may have different transmit power and/or power offset. The transmission timing for the uplink dedicated physical control channel (DPCCH) may not be changed.

Implementations defining HS-DPCCH transmission timing may be realized. For example, a time unit may be converted from a slot to a chip (e.g., 1 slot=2560 chips).

Uplink/downlink timing at a WTRU may be provided. At the WTRU, the uplink DPCCH/DPDCH frame transmission may takes place approximately $T_0$ chips after the reception of the first detected path (e.g., in time) of the corresponding downlink DPCCH/DPDCH or F-DPCH frame. $T_0$ may be a constant (e.g., 1024 chips). The first detected path (e.g., in time) may be defined by relevant tests. Additional information about the uplink/downlink timing relation and meaning of $T_0$ may be provided.

When multipoint transmission configured, the uplink DPCCH/DPDCH frame transmission may take place approximately $T_0$ chips after the reception of the first detected path (e.g., in time) of the reference downlink DPCCH/DPDCH or F-DPCH frame. The cell transmitting the reference downlink DPCCH/DPDCH or F-DPCH frame may be provided by higher layers and/or may be defined as a reference cell.

Figure 20:
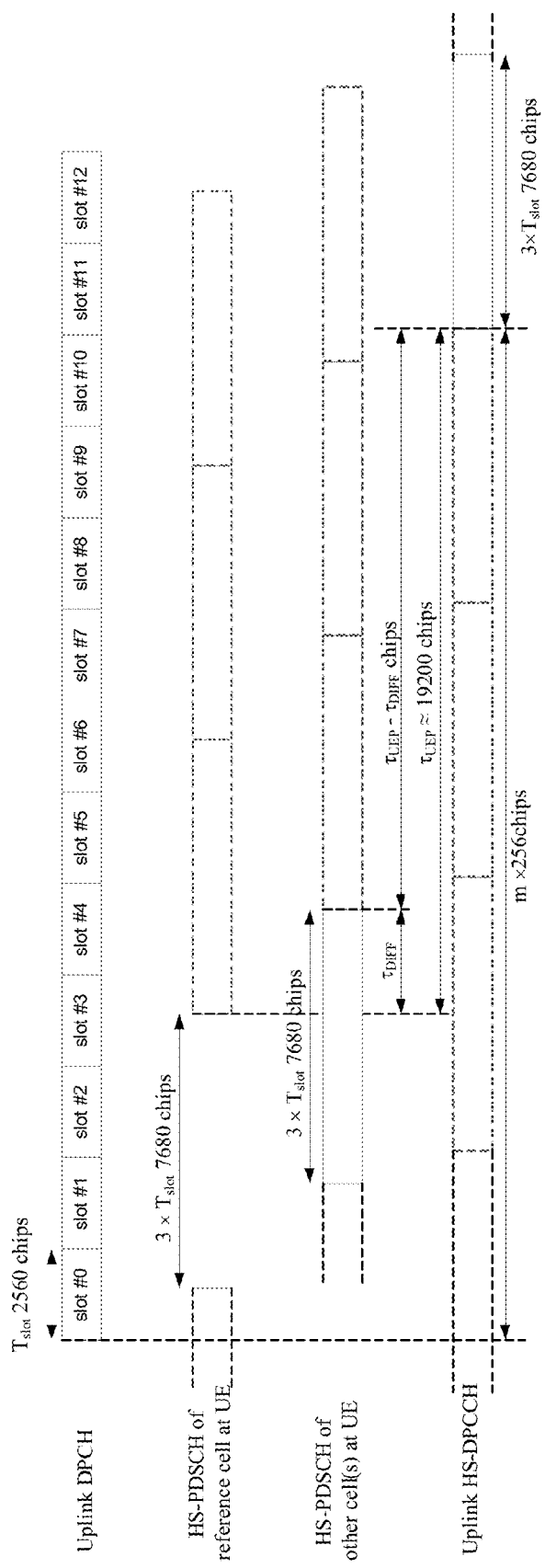
FIG. 20 is a diagram illustrating an example of a timing offset between the uplink DPCH, the HS-PDSCHs, and the HS-DPCCH at the WTRU when the WTRU may be configured with multiflow.

Uplink DPCCH/HS-DPCCH/HS-PDSCH timing at a WTRU when multipoint transmission may be configured may be provided. FIG. 20 is a diagram illustrating an example of a timing offset between the uplink DPCH, the HS-PDSCHs, and the HS-DPCCH at the WTRU when the WTRU may be configured with multipoint transmission mode. The uplink DPCH, the HS-PDSCH of the reference cell, and uplink HS-DPCCH may follow the same rules as defined for the non-multipoint transmission case. The timing relationship between the HS-PDSCH of one or more of the other cells and the HS-DPCCH may be derived from its HS-PDSCH frame timing difference $t_{DIFF}$ with respect to the reference cell, for example, where $-\Delta\tau \le t_{DIFF} \le 3840 + \Delta\tau$ chips with $\Delta\tau$ being a predefined or preconfigured tolerance value.

In an exemplary implementation for the HS-DPCCH transmission timing design, the primary uplink timing reference may be used (e.g., always used). The value of m, which may define the time offset between the HS-DPCCH and the uplink timing reference, may be made adjustable depending on the sub-frame offset of HS-PDSCHs between the two cells. For example, the HS-DPCCH transmission timing may be specified as follows.

When $\Delta t \ge 0$, which may mean that the HS-DPCCH from the primary cell arrives first in the paired sub-frames, the HS-DPCCH may be transmitted m×256 chips after the primary uplink transmission timing reference. m may be calculated from the timing parameter provided at the RRC connection, for example:

$$m = T_{TX\_diff}/256 + 101$$

When $\Delta t < 0$, which may mean that the HS-DPCCH from the primary cell arrives later in the paired sub-frames, the HS-DPCCH may be transmitted m×256 chips after the same primary uplink transmission timing reference. m may be calculated with an adjustment depending on the amount of the sub-frame offset of the paired HS-DPSCH sub-frames. For example, m may be calculated as:

$$m = T_{TX\_diff}/256 + 101 + \Delta m$$
$$\Delta m = -|\Delta t|/256$$

where $\Delta t$ may be expressed in term of number of chips.

Figure 21:
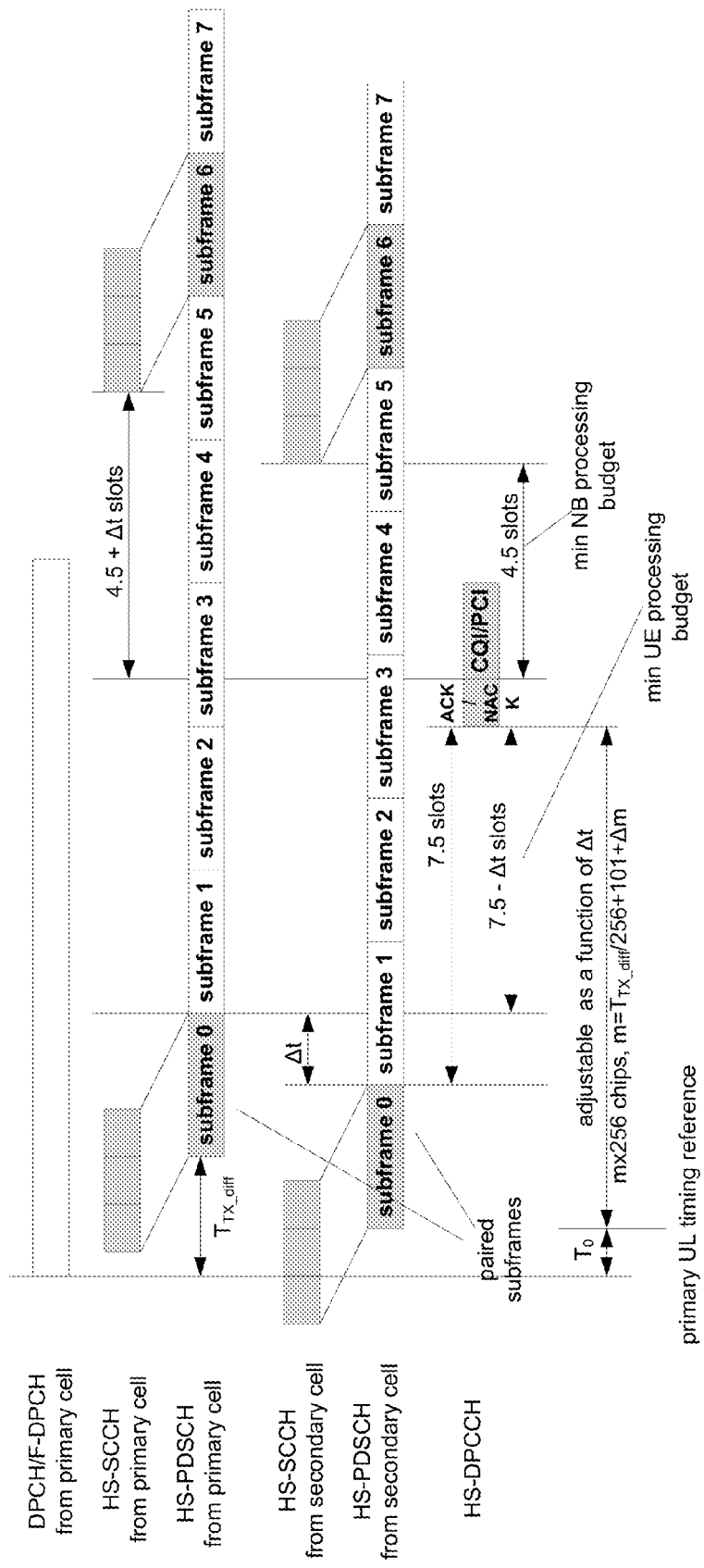
FIG. 21 is a diagram illustrating an example of uplink (UL) transmission (TX) timing design with adjustable values of m.

To keep code orthoganality, the HS-DPCCH may have to be in alignment with the 256-chip boundary of the other uplink channels. HS-DPCCH may be synchronized at chip level with UL DPCCH where a pilot signal may be included. A timing structure may be used such that the HS-DPCCH is synchronized in chip and symbol level to the primary timing reference of other uplink channels, with adjustment being made according to the downlink of the secondary cell if necessary. As such, the timing adjustment values may be quantized by:

$$m = T_{TX\_diff}/256 + 101 + \Delta m$$
$$\Delta m = \begin{cases} 0 & \Delta t \ge 0 \\ -\lceil |\Delta t|/256 \rceil & \Delta t < 0 \end{cases}$$

where $\lceil x \rceil$ may represent a ceiling function of x. Note that value of m may be adjusted if the HS-PDSCH sub-frame of the secondary cell comes first, for example, as illustrated in FIG. 21.

The maximum amount of WTRU budget reduction may not exceed 1.5 slots since $|\Delta t| \le 1.5$ and the HARQ processing budget at either the primary or secondary serving cells may not be reduced.

Fixed-relation pairing scheme implementations may be used for HS-DPCCH transmission timing. For example, the primary timing reference may be used (e.g., solely used) and the m value may be kept constant, as illustrated in FIG. 22.

Figure 22:
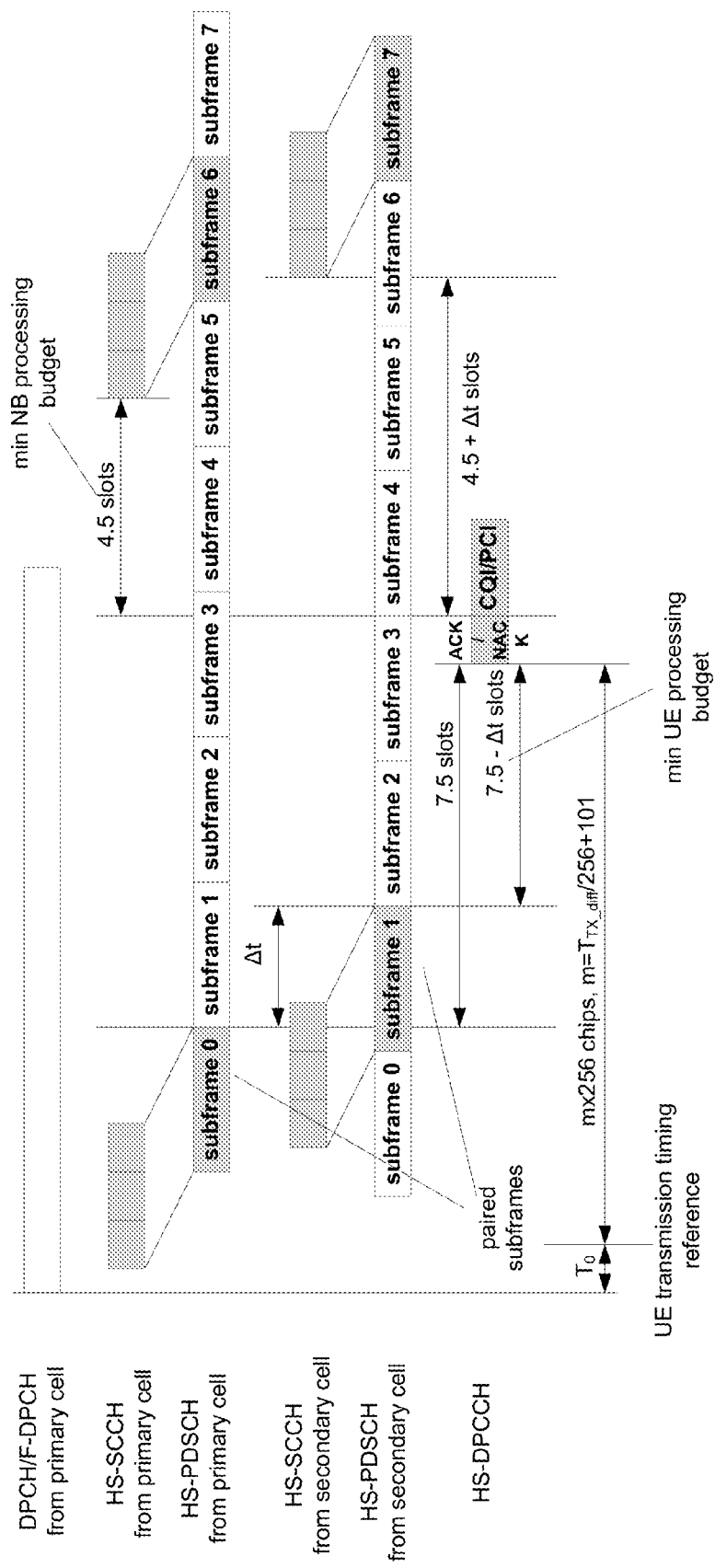
FIG. 22 is a diagram illustrating an example of a HS-DPCCH transmission timing configuration.

As shown in the example of FIG. 22, the pressing budget at the NodeB, either at a primary or a secondary serving cell, may not be reduced. The time reduction at the WTRU may be increased, for example, as compared to the transmission timing implementations described herein. Since $\Delta t \ge 3$ slots for some examples of the fixed-relation pairing rule, the maximum timing reduction at the WTRU may be found to be 3 slots.

While this may suffer from a larger processing time reduction at the WTRU, implementations described herein may present some advantages when considering implementation simplicity and the impact to other procedures. This may be because the transmission timing related to the primary cell, which may be the anchor cell for the MP transmission, may be maintained unchanged.

The m value may be made variable if the time offset of the paired frame exceeds a certain range, for example:

$$m = T_{TX\_diff}/256 + 101 + \Delta m$$
$$\Delta m = \begin{cases} 0 & \Delta t \le 3480 \text{ chips (1.5 slots)} \\ -\lceil (\Delta t - 3840)/256 \rceil & \Delta t > 3480 \text{ chips (1.5 slots)} \end{cases}$$

Figure 23:
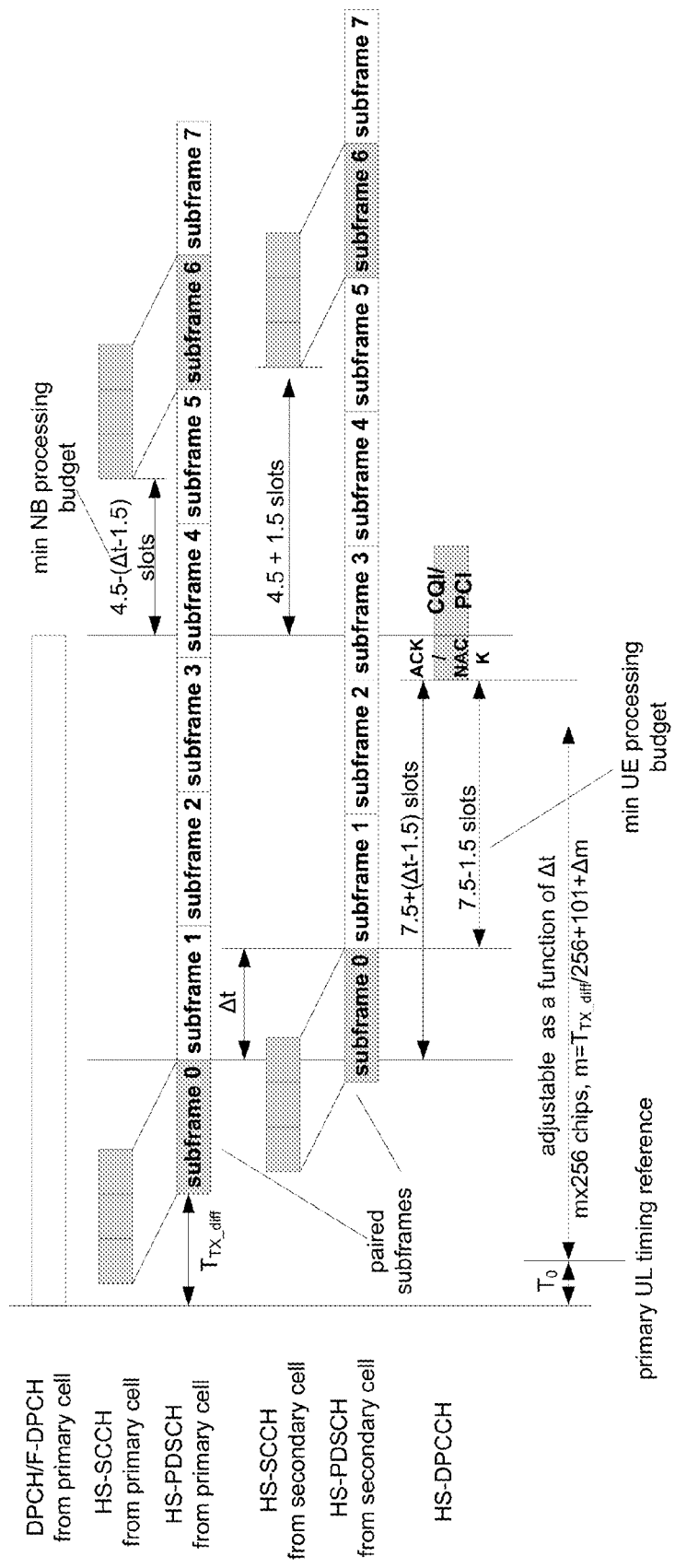
FIG. 23 is a diagram illustrating an example of HS-DPCCH transmission timing configuration.

The processing time reduction at the WTRU may be made no more than 1.5 slots. The up to 1.5 slot processing time reduction may be seen at the primary serving cell, as illustrated in FIG. 23.

Implementations of transmission timing design for other uplink physical channels may be provided. For HS-DPCCH transmission, the secondary timing reference that may be tracking the downlink of the secondary severing cell may be switched. The HS-DPCCH may maintain (e.g., always maintain) a fixed timing relationship with other uplink physical channels, such as but not limited to DPCCH/DPDCH and E-DPCCH/E-DPDCH. The dedicated physical control channel (DPCCH) may not be changed when changing the timing reference for uplink transmission. If the WTRU's clock drifts from the network's clock, then a timing adjustment procedure may be performed to compensate the drift. As the transmission timing of two or more of the uplink channels may be linked together, the same amount of timing adjustment may be applied to each channel during the timing adjustment procedure.

The physical channels, for example DPCCH/DPDCH and E-DPCCH/E-DPDCH, may be aligned in their frame boundary and transmitted according to the same timing reference as HS-DPCCH. The timing reference may be switched between different cells depending on the time offset of the paired HS-PDSCH sub-frames received from the two cells. For example, a maximum overlap pairing rule may be applied. For a maximum overlap pairing rule, the uplink transmission timing reference may be defined as follows:

$$ULTX \text{ timing reference} = \begin{cases} \text{primary timing reference} & \text{if } \Delta t \geq 0 \\ \text{secondary timing refrence} & \text{if } \Delta t < 0 \end{cases}$$

Figure 24:
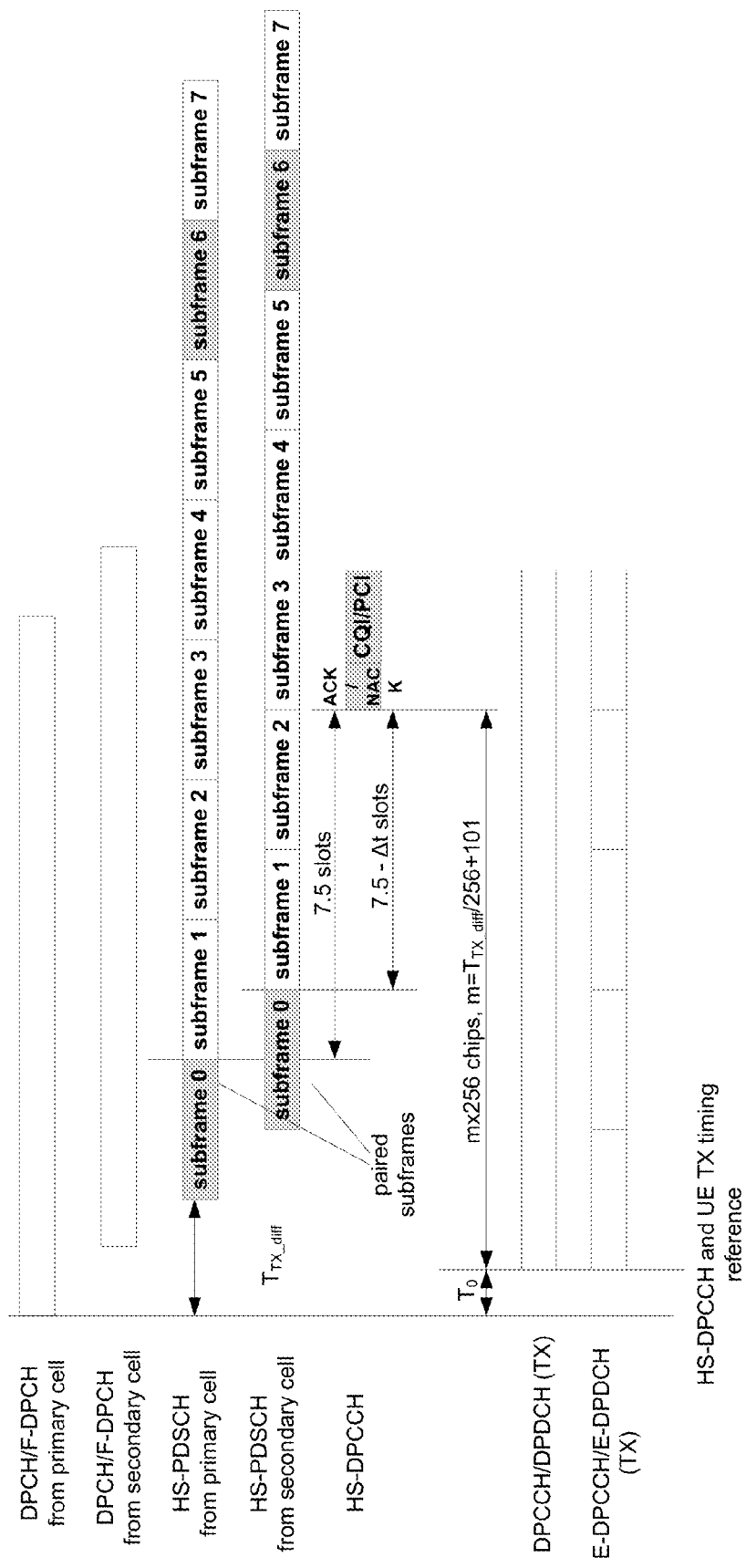
FIG. 24 is a diagram illustrating an example of UL DPCCH/DPDCH and E-DPCCH/E-DPDCH transmission when $\Delta t \geq 0$.
Figure 25:
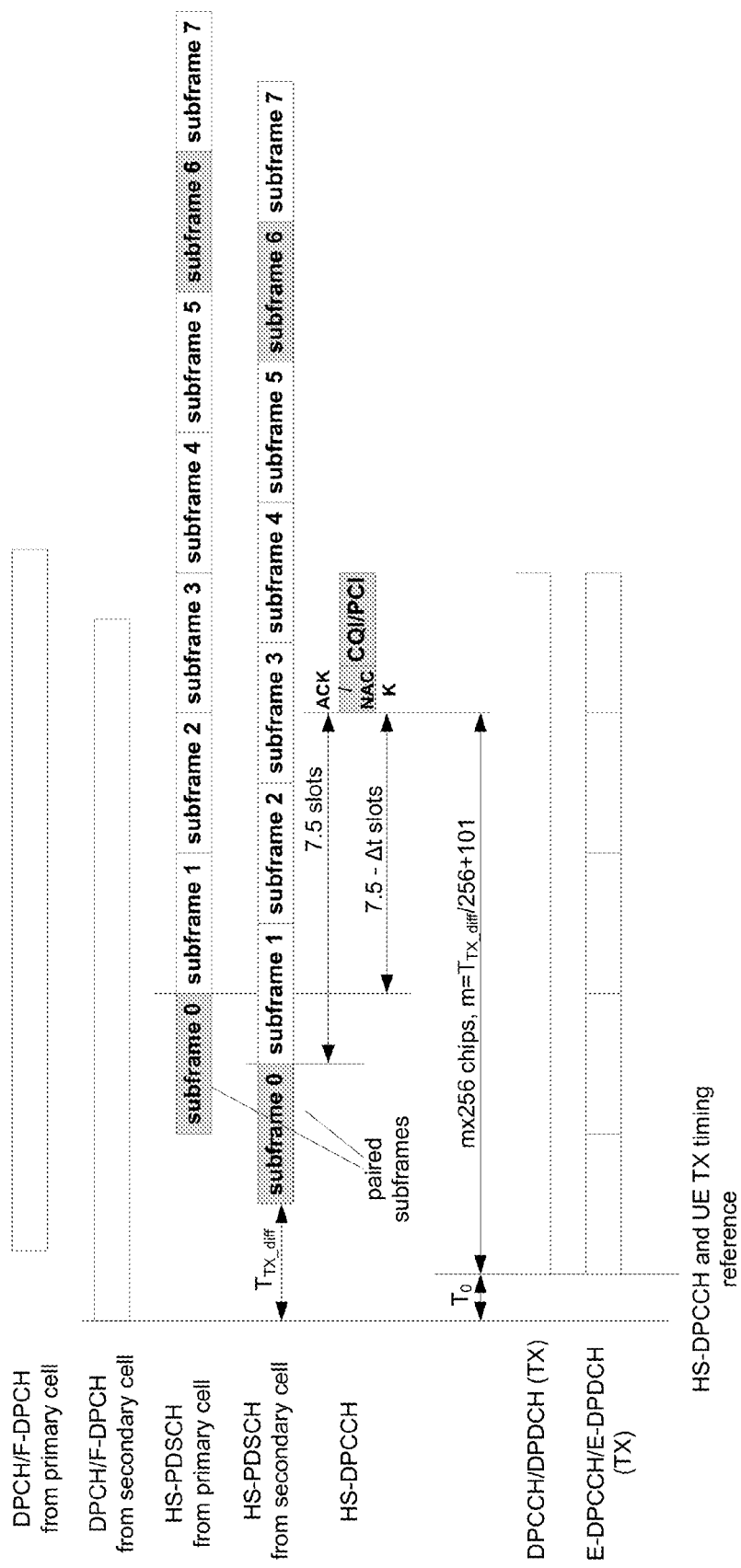
FIG. 25 is a diagram illustrating an example of UL DPCCH/DPDCH and E-DPCCH/E-DPDCH transmission when $\Delta t < 0$.

FIG. 24 (UL DPCCH/DPDCH and E-DPCCH/E-DPDCH transmission when $\Delta t \geq 0$) and FIG. 25 (DPCCH/DPDCH and E-DPCCH/E-DPDCH transmission when $\Delta t < 0$) illustrate examples of scenarios of HS-PDSCH sub-frame offset.

The timing relationship of the uplink channels may be maintained unchanged such that it may have a minimal impact on the existing physical layer processing functions at either the UL transmitter at the WTRU or at the receiver at the Node.

Figure 26:
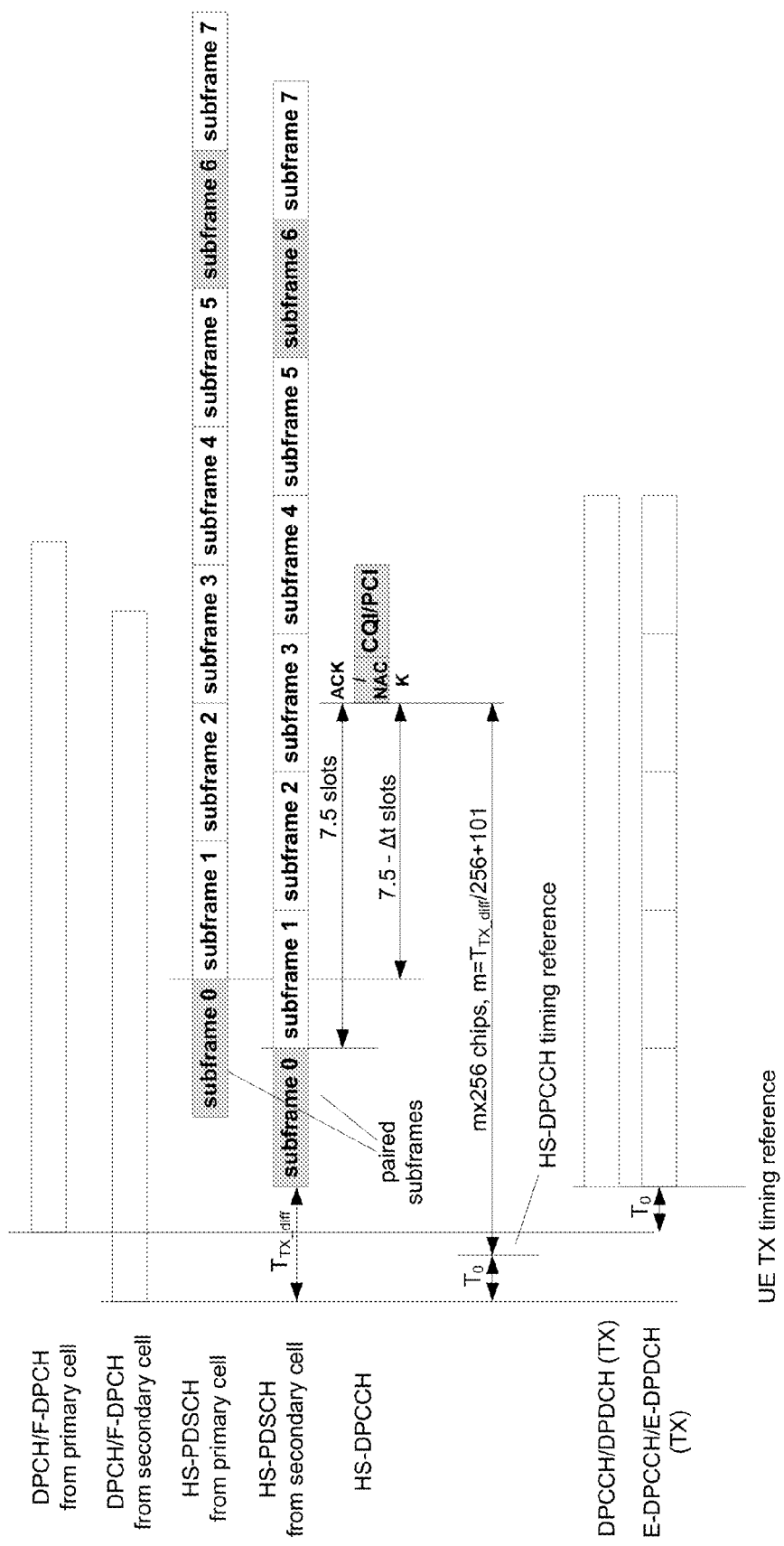
FIG. 26 is a diagram illustrating an example of dual UL TX timing reference.

HS-DPCCH may be decoupled with other physical channels in transmission timing. DPCCH/DPDCH and E-DPCCH/E-DPDCH may be transmitted according to the primary timing reference. HS-DPCCH may switch its timing reference to the secondary cell when directed and/or necessary. This may result in a dual timing reference WTRU implementation. An example of a dual uplink transmission timing reference implementation is exemplified in FIG. 26.

To keep code orthoganality, the HS-DPCCH may not be independent in its transmission timing since it may have to be in symbol alignment with the other uplink channels. For appropriate decoding performance, the HS-DPCCH may be synchronized at chip level with UL DPCCH where a pilot signal is included. A timing structure may be implemented such that the HS-DPCCH is synchronized in chip and symbol level to the general timing reference of other uplink channels and in the same time, substantially tracking the drift of the downlink from the secondary cell, for example, if necessary.

Figure 27:
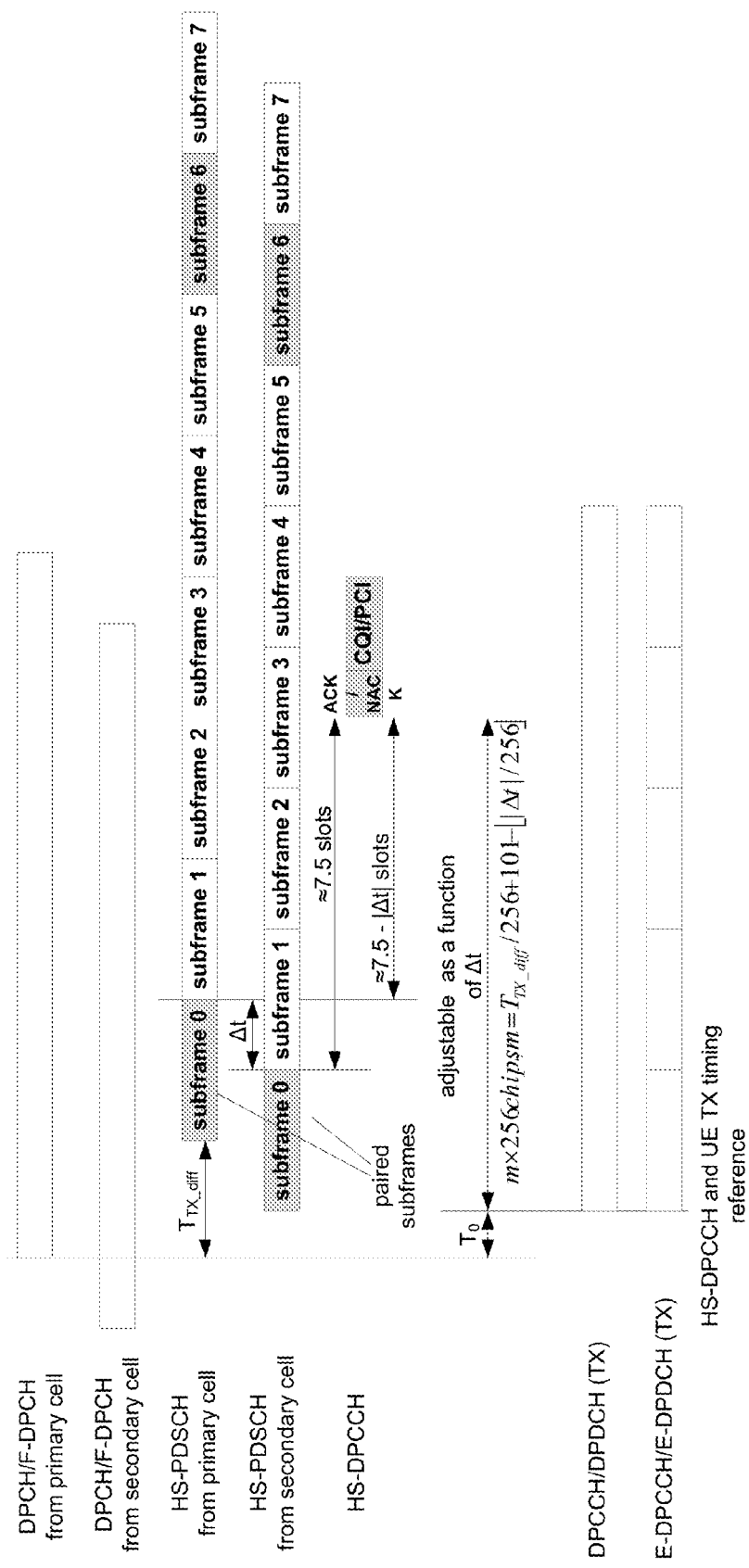
FIG. 27 is a diagram illustrating an example of uplink transmission timing design with adjustable values of m.

Implementations may provide for one or a combination of the following: The uplink physical channels (e.g., all uplink physical channels) may be transmitted with reference to the primary timing reference that may be derived from the reception of downlink DPCCH frame plus a constant time offset, for example, $T_0=1024$ chips. DPCCH/DPDCH and E-DPCCH/E-DPDCH may be aligned with the primary timing reference. HS-DPCCH may be transmitted m×256 chips after the primary reference timing. The value of m may be adjustable to track the timing drift of the downlink of the secondary cell, for example, if necessary. The amount of the adjustment of m may be calculated from the observed timing offset of the paired HS-PDSCH sub-frames, which may be quantized to make a 256-chip symbol boundary alignment with other uplink channels. m may be calculated by the following:

$$m = T_{TX\_diff}/256 + 101 + \Delta m$$

$$\Delta m = \begin{cases} 0 & \Delta t \geq 0 \\ -\lceil |\Delta t|/256 \rceil & \Delta t < 0 \end{cases}$$

where $\Delta t$ may be expressed in term of a number of chips and $\lceil x \rceil$ may perform the quantization by the ceiling function of x. An exemplary timing diagram may be shown in FIG. 27 (Uplink transmission timing design with adjustable values of m) when $\Delta t < 0$.

Implementations of synchronization may be provided for when transmission timing changes. With use of a maximum pair rule, the values of m used to control the HS-DPCCH transmission may be subject to change from time to time when the network clock drifts. Whenever this occurs, the network may have difficulty to identify the shifted sub-frame boundary of HS-DPCCH without being informed about the changes. As the drift becomes too large, the sub-frames may have to be re-paired, for example, in order to manage timing alignment and control the timing compression within the range. To synchronize any updates in HS-DPCCH transmission timing or changes in sub-frame pairing between a WTRU and the NodeB(s), implementations of signaling to inform the network may be introduced.

Figure 28:
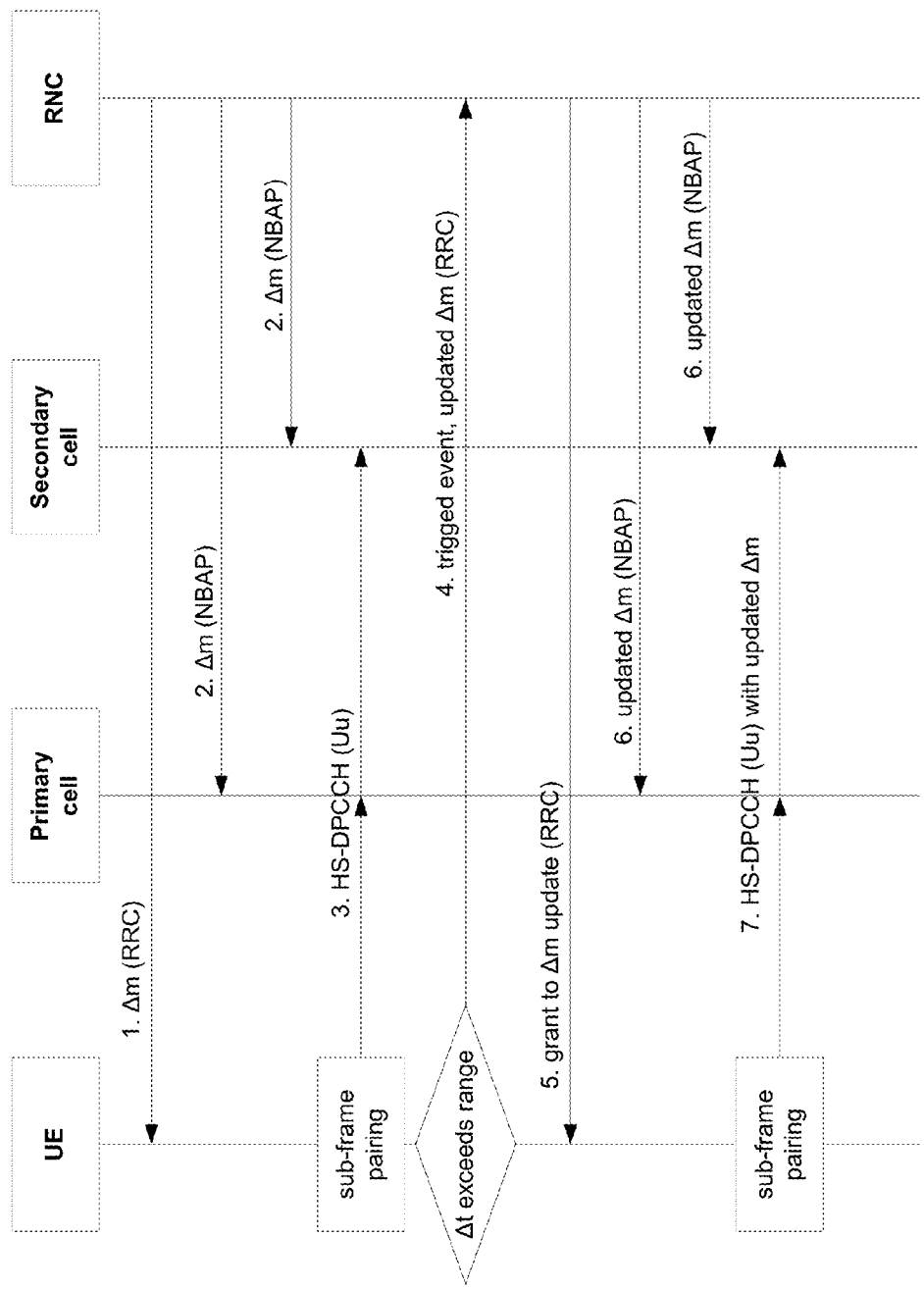
FIG. 28 is a diagram illustrating an example of RRC/NBAP messages that may be used in synchronization.

Implementations of informing the network by RRC/NBAP messages may be provided. FIG. 28 depicts exemplary RRC/NBAP messages that may be used in synchronization. An RRC signaling implementation may be used to report a change of m values to be applied.

The RNC may inform the WTRU via RRC signaling about the transmission timing of HS-DPCCH, which may be defined as adjusted amount of m values relative to the default setting (e.g., $\Delta m$ in the equation described herein). The RNC may inform the primary and the secondary serving cells about the HS-DPCCH timing information through NBAP. The WTRU may transmit HS-DPCCH according to a maximum overlap pairing rule or another pairing rule, at the specified timing. If the HS-PDSCH sub-frame offset monitored at the WTRU varies and the variation exceeds an amount that may require an HS-DPCCH transmission timing update, an event may be triggered and reported with the suggested $\Delta m$ value update. The RNC may grant the HS-DPCCH timing update request to the WTRU via RRC signaling. The RRC may inform the primary and the secondary serving cells about the updated $\Delta m$ value. Upon receiving the grant, the WTRU may use the updated HS-DPCCH transmission timing.

Figure 29:
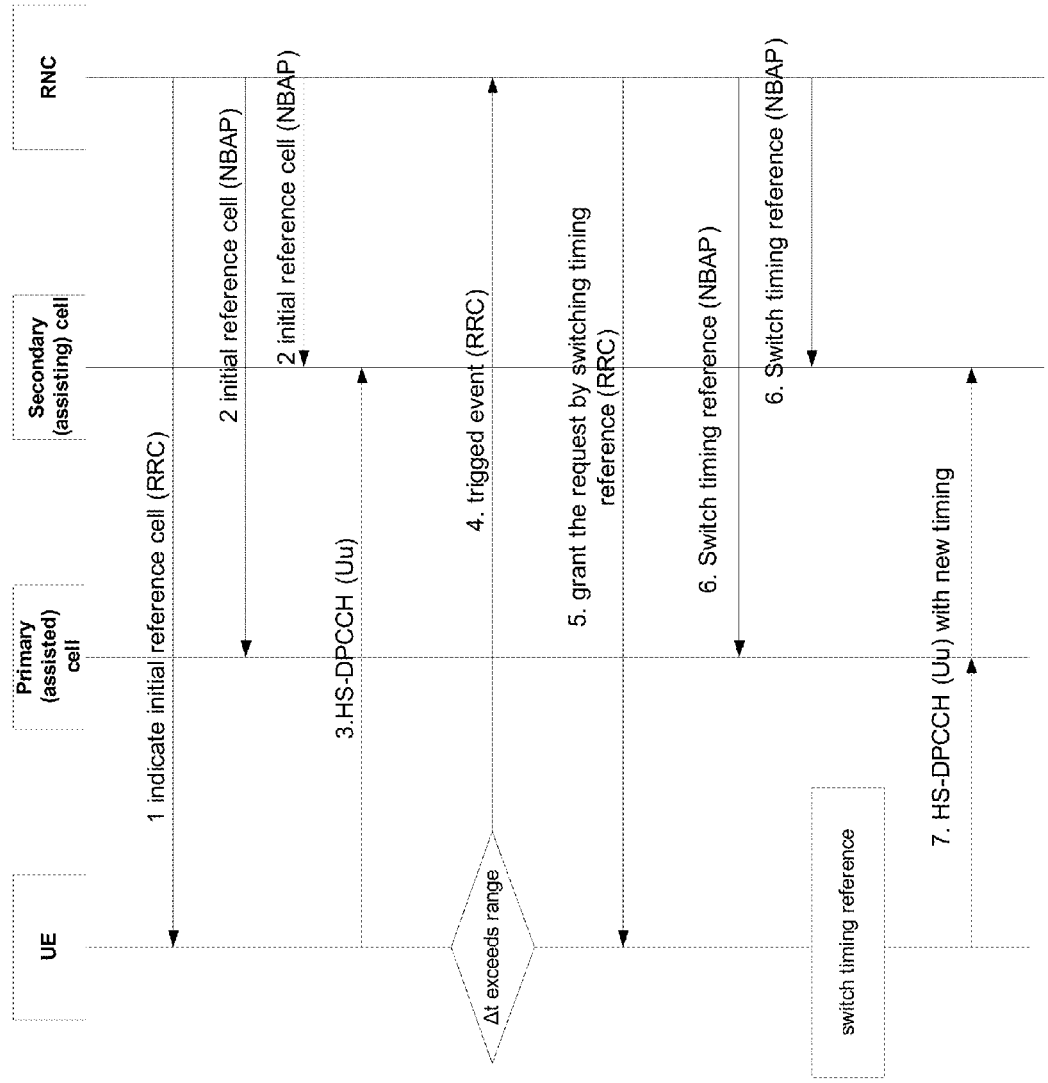
FIG. 29 is a diagram illustrating an example of RRC/NBAP messages that may be used for changes to reference timing.

FIG. 29 is a diagram illustrating an example of RRC/NBAP messages that may be used for changes to reference timing. Implementations for synchronizing the timing change may be extended to a switchable timing reference case, for example, as described herein. As the pairing relation changes due to the network drift, the reference cell may be switched.

Implementations for synchronizing the timing change may include one or more of the following. The RNC may inform the WTRU via RRC signaling about the transmission timing of HS-DPCCH by indicating which cell is selected as the reference cell. The RNC may inform the primary (e.g., the assisted serving cell) and the secondary (e.g., the assisting serving cell) serving cells about the HS-DPCCH timing information through NBAP. The WTRU may transmit HS-DPCCH according to the downlink timing of the reference cell, for example, as described with reference to FIG. 18 and FIG. 19. If the HS-PDSCH sub-frame offset monitored at the WTRU varies and the variation exceeds an amount that requires HS-DPCCH transmission timing update, an event may be triggered and reported to request the timing change. For example, a measurement event 1x may be specified when the timing difference between the originally paired downlink subframe exceeds 1.5 slots. The RNC may grant the HS-DPCCH timing update request to the WTRU via RRC signaling by indicating switch of the reference cell. The RRC may inform the primary (e.g., the assisted serving cell) and secondary (e.g., the assisting cell serving cell) serving cells about the change of the reference cell. Upon receiving the grant, the WTRU may use the updated HS-DPCCH transmission timing reference.

In flows 5, 6, and 7 of FIG. 29, a timing instance may be defined in the RRC/NBAP signaling to synchronize the timing change between the WTRU and the NodeB. This timing instance may be defined by a timer offset or a specific frame number to indicate when the switch of timing may occur.

At an initial configuration of the multipoint transmission, the WTRU may be required to take measurement of the frame offset of P-CCPCHs of the two cells and may report it to an RNC via RRC signaling. The measurement may be used at the RNC to calculate the initial timing adjustment for HS-DPCCH transmission. The WTRU may trigger an event at an initial MP configuration and may report a suggested $\Delta m$ to the RNC via RRC. A grant to the suggested $\Delta m$ may be performed. For example, message 1 in FIG. 28 may be replaced by a grant to the suggested $\Delta m$, which may be similar to message 5 in FIG. 28.

The WTRU may autonomously update its HS-DPCCH transmission timing without reception of the acknowledgement from the network (e.g., message 5 of FIG. 28 may be omitted). An additional timing parameter indicating when an update may be performed and/or a frame number indicating at which sub-frame an update may occur may be included (e.g., it may be included at message flow 4 of FIG. 28). It may provide a preparation time for the network to react.

In a scenario where the network clock drift may be relative large, a timing adjustment event may get triggered too frequently and may cause heavy RRC/NBAP overhead. The reported $\Delta m$ may be quantized with larger granularity, for example, to reduce signaling overhead. For example, it may be calculated by:

$$\Delta m = \begin{cases} 0 & \Delta t \geq 0 \\ -\min\left(k\left\lceil\frac{|\Delta t|}{k \times 256}\right\rceil, 15\right) & \Delta t < 0 \end{cases}$$

where k may be an integer introduced to control the granularity of the quantization and $0 \leq k \leq 15$. If k=15, then there may be two values $\Delta m=0$ and 15 to be reported, which may corresponds to 0 and 1.5 slots of timing adjustment. A tradeoff may be that the timing compression at the WTRU may be larger than necessary due to the quantization.

In case the WTRU fails to receive the acknowledgement to the $\Delta m$ update request from the RNC (e.g., as specified at message flow 5 of FIG. 28), it may initiate a timer. The value of the time may be pre-defined or configured by the network. At the expiration of the timer, the WTRU may elect to stop acknowledgement of downlink transmission from the secondary serving cell or may continuously send the DTX codeword in the corresponding HARQ-field by using the same adjustment value $\Delta m$ without concerning the reception timing of the downlink from secondary cell.

L1 signaling may be provided. Higher layer signaling implementations provided herein may introduce additional RRC/NBAP signaling overhead and the WTRU and NodeBs may have to coordinate the synchronizing of transmission timing changes.

Figure 30:
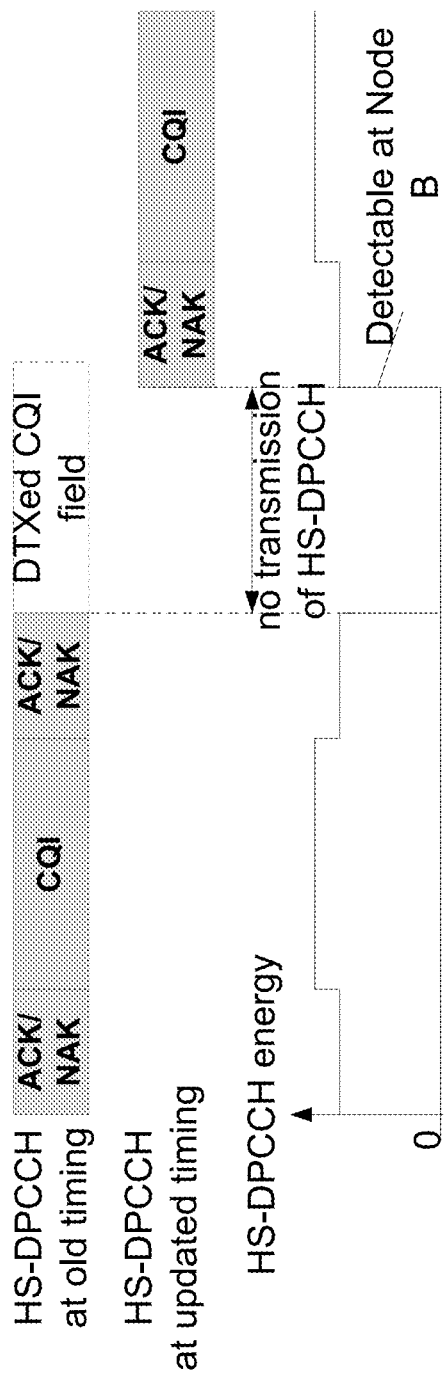
FIG. 30 is a diagram illustrating an example of an indication of a change of HS-DPCCH transmission timing by DTX-ing CQI field.

Identifiable marks in L1 signals in the uplink may be facilitated such that a receiver at the NodeB may detect (e.g., autonomously detect) the timing change without addition signaling. The CQI field in the previous sub-frame may be DTXed (discontinued transmission) such that a raising edge of the next sub-frame, which may have a different transmission timing, may be detected by the NodeB receiver at each cell. The NodeB receiver may apply an energy detection function to detect the actual arrival time of the next HS-DPCCH sub-frame and may perform decoding accordingly. Since the HS-DPCCH timing change may not exceed 1.5 slots if a maximum overlap pair rule is used at the WTRU, the ACK/NACK may be transmitted in the previous HS-DPCCH sub-frame. An example of this procedure may be shown in FIG. 30 (Indicate the change of HS-DPCCH transmission timing by DTXing CQI field), where the HS-DPCCH sub-frame of the updated timing may be transmitted in an earlier time.

The CQI fields of a number of consecutive sub-frames followed may also be DTXed, for example, which may improve the detection of the sub-frame boundary at a NodeB. The number of HS-DPCCH sub-frames with the DTXed CQI field may be constant, configured by the network at the RRC connection, or be determined at the WTRU.

Figure 31:
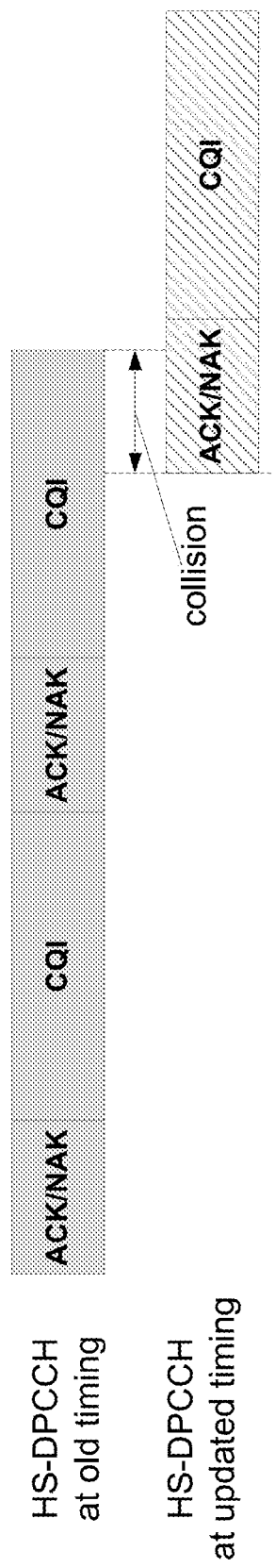
FIG. 31 is a diagram illustrating an example of a potential HS-DPCCH collision when a change may occur to the transmission timing.

Implementations for handling HS-DPCCH sub-frame collision may be provided. When the HS-DPCCH transmission timing is moved around, for example, due to the network drift or the HS-PDSCH sub-frame pairing relation being changed, the HS-DPCCH of an updated transmission timing may potentially collide with a previously transmitted sub-frame. For example, as shown in FIG. 31 (Potential HS-DPCCH collision when change the transmission timing).

Figure 32:
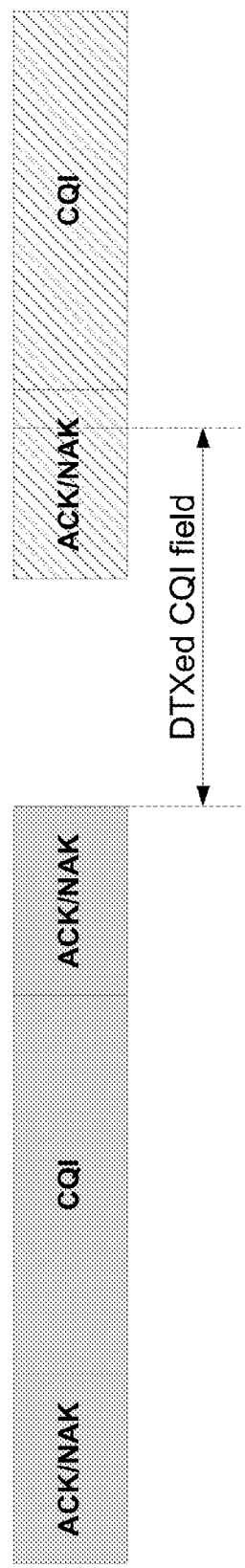
FIG. 32 is a diagram illustrating an example of an example of resolving collision by DTXed CQI field.

With use of a maximum overlap pairing rule, the amount of timing adjustment for HS-DPCCH may not exceed 1.5 slots. Collision may be addressed by DTX of the CQI field of the previous sub-frame with its ACK/NACK still being transmitted, for example, as illustrated in FIG. 32 (Implementations for resolving collision by DTXed CQI field).

The HS-PDSCH sub-frames associated with the HS-DPCCH of the previous sub-frame may not be allowed to transmit at both serving cells.

If a fixed-relation pairing rule is used, collision may be addressed by DTX of the HS-DPSCH transmission prior to the update of the HS-DPCCH timing if collision occurs, as the amount of adjustment may be 3 slots, which may squeeze out the previous HS-DPCCH sub-frame.

In a case where the CQI reports of the two cells may be encoded independently and may be time multiplexed across sub-frames, updates of the HS-DPCCH transmission timing or change of HS-DPCCH sub-frame pairing may cause skipping or adding of HS-DPCCH sub-frames that may result in an error for a NodeB to identify its own sub-frames for CQI reception. Each time the $\Delta m$ updates, the CQI transmission may be re-synchronized with the updated values of m. In the equations described herein that may be used as the criterion to decide which cell may be selected for CQI reporting in a given HS-DPCCH sub-frame, the updated CFN (e.g., if it varies due the network clock drift) and the adjusted value of m may be used as inputs.

Figure 33:
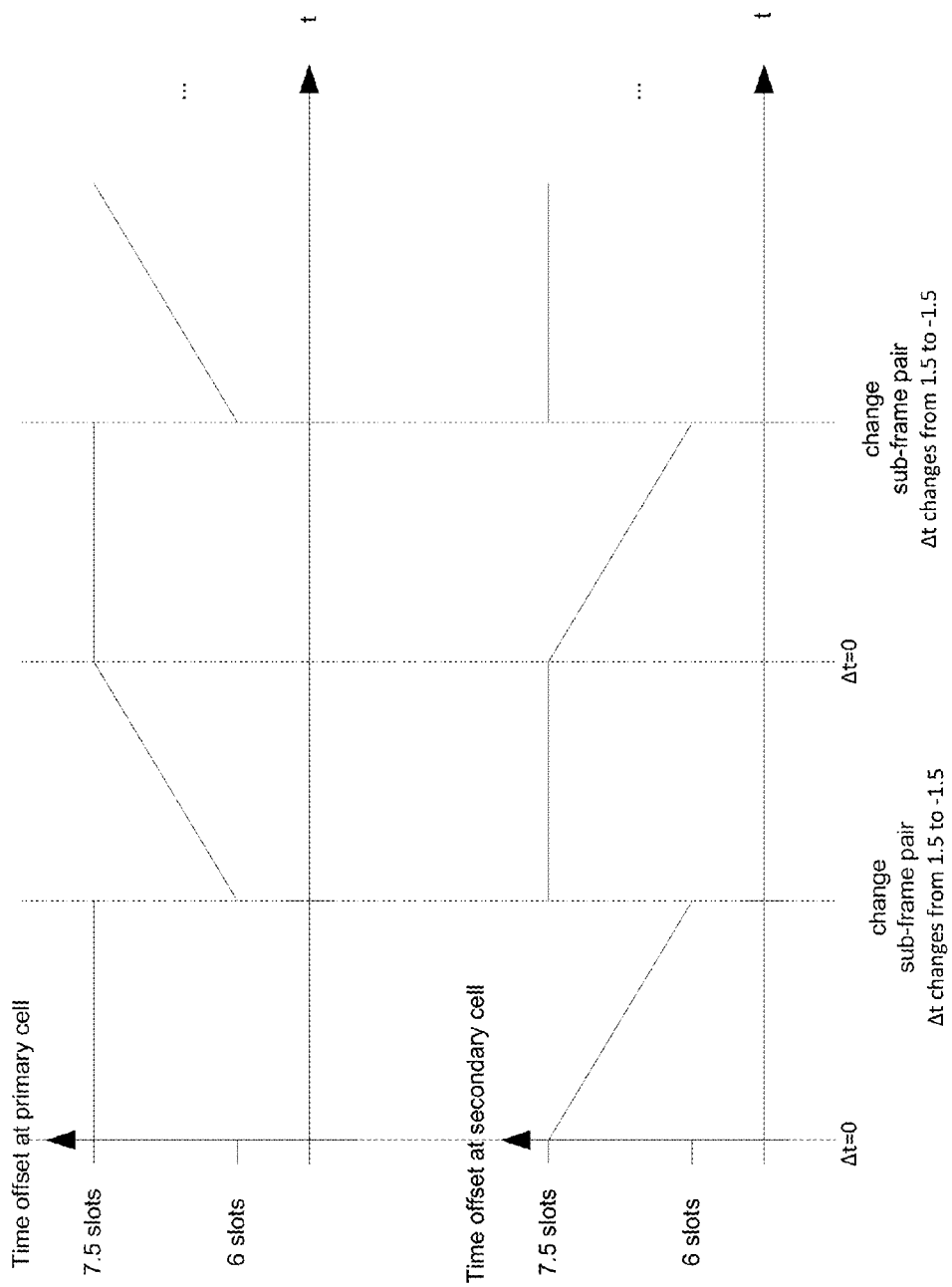
FIG. 33 is a diagram illustrating an example of a time offset between HS-PDSCH and HS-DPCCH that may be observed at two cells.

Synchronizing of the sub-frame pairing may be disclosed herein. Upon receiving a sub-frame of HS-DPCCH, the NodeB of a cell may pair the received ACK/NACK message to a downlink HS-PDSCH sub-frame that has been transmitted. Being informed of the HS-DPCCH transmission timing, a cell may have sufficient information to derive the relation of the downlink HS-PDSCH sub-frame it has transmitted and the ACK/NACK message in the received HS-DPCCH. As a result of a maximum overlap pairing rule and the controlled HS-DPCCH transmission timing, the time offset observed at a cell between the HS-PDSCH sub-frame and its corresponding HS-DPCCH may be within the range of 6 to 7.5 slots, for example, as illustrated in an example in FIG. 33 (time offset between HS-PDSCH and HS-DPCCH observed at two cells).

As such, an HS-PDSCH sub-frame may be paired to its HS-DPCCH at the network, for example, as follows. A HS-DPCCH may be paired to a sub-frame of HS-PDSCH for ACK/NACK feedback if it is received approximately 6 to 7.5 slots after this HS-PDSCH sub-frame. For example, as may be seen from the example of FIG. 33, when a sub-frame pair relation updates, a jump (or drop) of the HS-DPCCH transmission timing relative to HS-PDSCH (e.g., 1.5 slots) may be observed. This information may be used, for example, to assure the sub-frame pairing performed autonomously at the network is correct.

Figure 34:
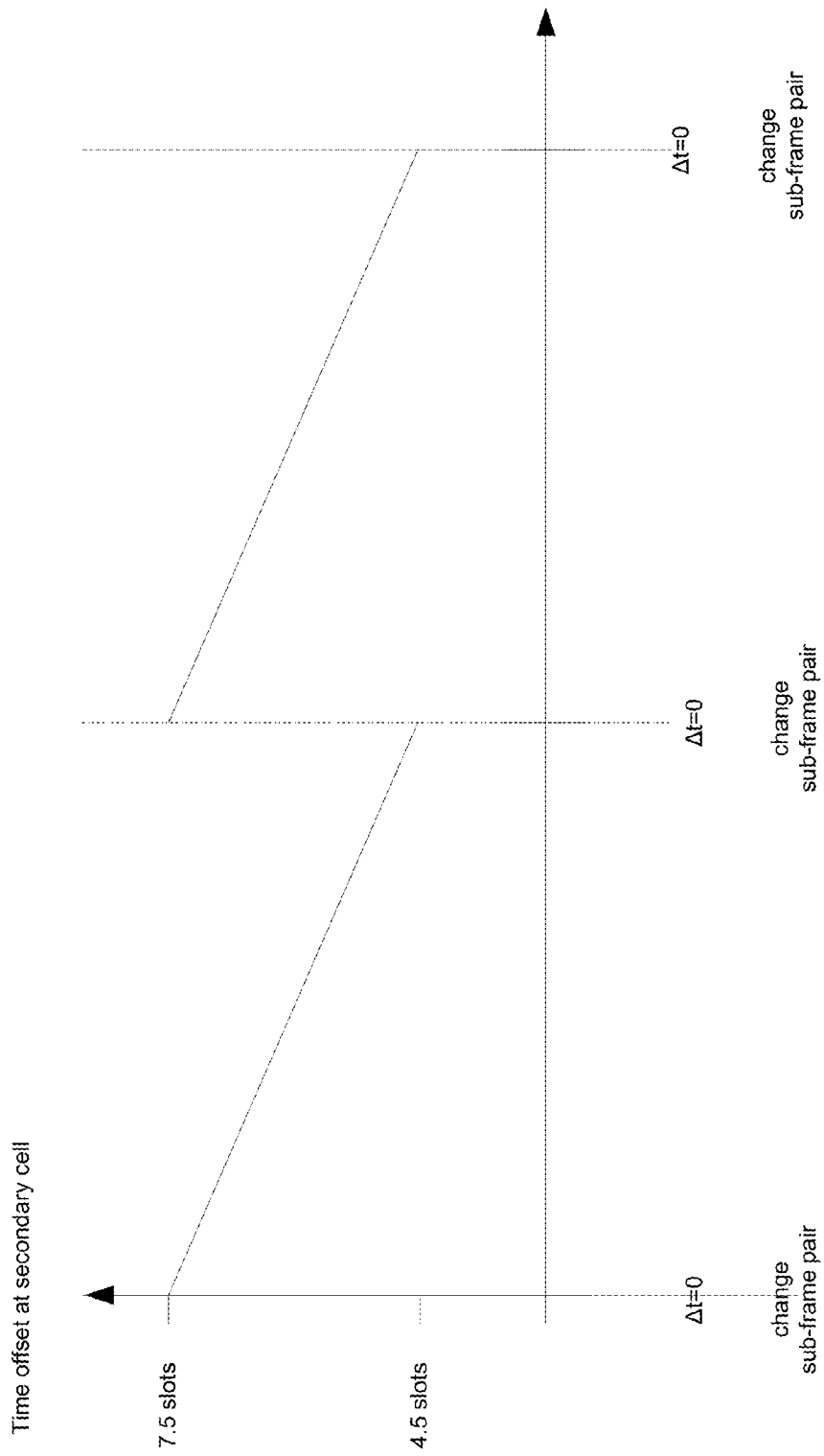
FIG. 34 is a diagram illustrating an example of a time offset between HS-PDSCH and HS-DPCCH that may be for a fixed-relation pairing rule.

For a fixed-relation pairing rule, HS-DPCCH transmission timing may not be updated dynamically as it may have a fixed relation to UL DPCCH. The time offset between the HS-PDSCH and HS-DPCCH observed at the secondary serving cell may be variable when the network clock drifts, for example, as illustrated in FIG. 34. The secondary cell may determine a sub-frame paring change if it occurs. A primary serving cell may not be able to detect the sub-frame pairing change from the HS-DPCCH timing as it may have a nearly constant time offset with respect to HS-PDSCH sub-frame. In this case, an RRC signaling procedure informing the pairing change to the network may be used.

Procedures of timing control upon MP configuration or activation/deactivation may be provided. In HSDPA multiflow transmission configured with multiple cells, a secondary cell that may be used to assist the downlink transmission may be dynamically activated or deactivated. The activation/deactivation decision may be made by the cell or by the RNC. As the HS-DPCCH transmission timing may be adjusted depending on the downlink timing offset of the cells, the activation status of a secondary cell may present impact on the HS-DPCCH timing control.

Figure 35:
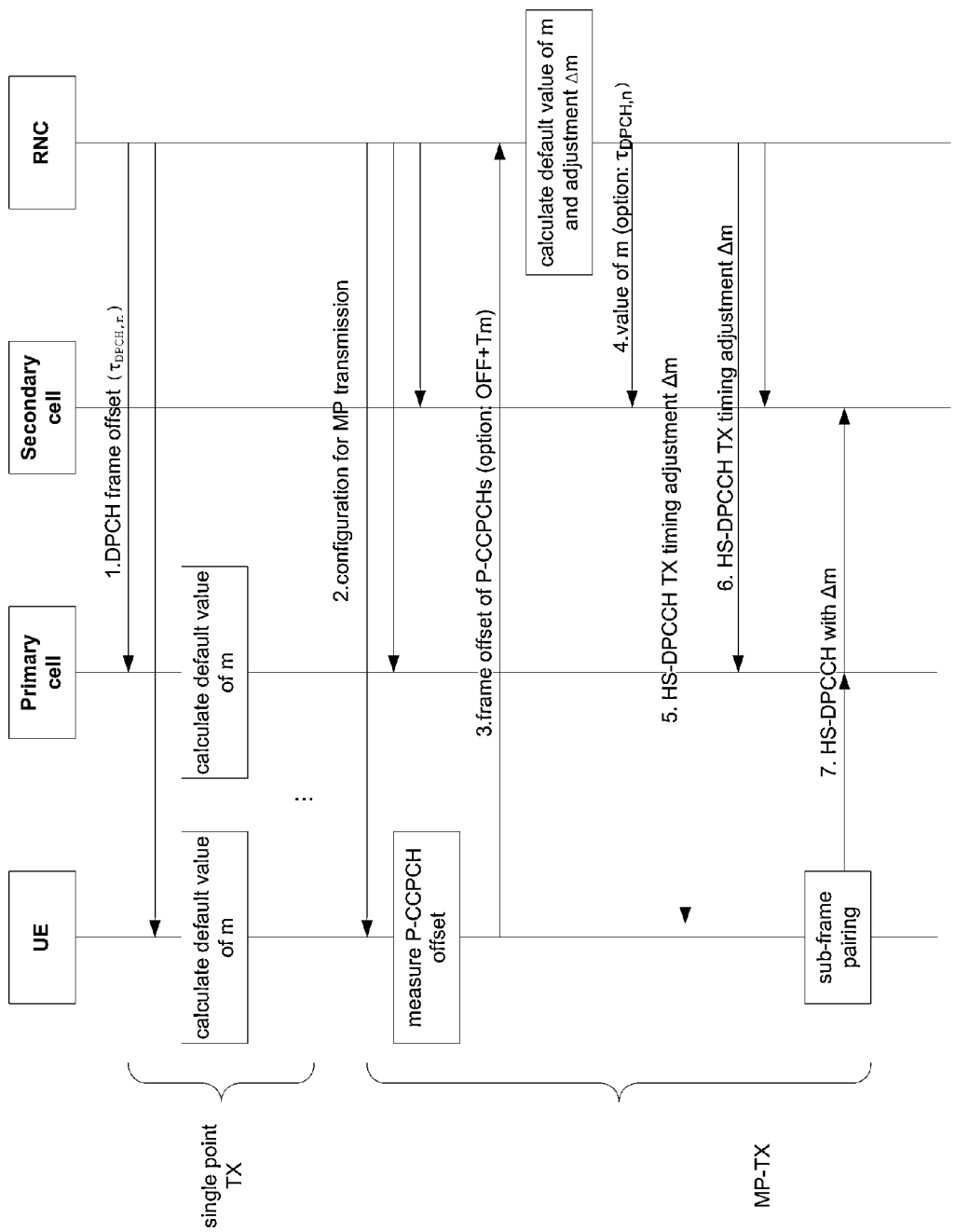
FIG. 35 is a diagram illustrating an example of a HS-DPCCH timing control procedure that may occur at initial MP configuration.

FIG. 35 depicts an example of an HS-DPCCH timing control procedure that may occur at initial MP configuration. At initial configuration for the multipoint transmission, the following signaling procedure for the HS-DPCCH timing control may be used, which may be entirely or partially applied in any combination or order.

At initial radio link establishment, the DPCH frame offset ($\tau_{DPCH,n}$), which may define when DPCH is transmitted in reference with to P-CCPCH, may be signaled to the WTRU as an RRC parameter. At the same time, the same parameter may be signaled to the NodeB of the primary serving cell (e.g., directly or indirectly) via other parameters. Upon configured with this parameter, both the WTRU and the NodeB of the primary serving cell may derive a set of default values of m, which may define the HS-DPCCH transmission timing in relation to the UL DPCH. For example, $\tau_{DPCH,n}$ may be expressed in terms of chips and the first value of m may be determined by:

$$T_{TX\_diff} = \begin{cases} 5120 + 7680 - \text{mod}(\tau_{DPCH,n}, 7680) & \text{if } \text{mod}(\tau_{DPCH,n}, 7680) \geq 5120 \\ 5120 - \text{mod}(\tau_{DPCH,n}, 7680) & \text{if } \text{mod}(\tau_{DPCH,n}, 7680) < 5120 \end{cases}$$

$$m = T_{TX\_diff}/256 + 101$$

The values of m in the set for other HS-PDSCH sub-frames within the radio frame may be derived by offset of the first value of m by multiples of 7680 chips.

If the network decides to configure multipoint transmission, a MP configuration message may be signaled to the WTRU from the RNC via RRC signaling and/or to one or more NodeBs of the involved serving cells via NBAP.

A WTRU may take a measurement on the frame offset of the P-CCPCHs of the two cells and may signal it to the RNC via an RRC message. The frame offset between the P-CCPCH of the secondary cell and DPCH or F-DPCH received from the primary cell may be measured at the WTRU and signaled to the RNC via an RRC message. This offset may be denoted as Tm.

From the information provided by the WTRU, the RNC may calculate a default value of m for the HS-DPCCH transmission and its adjustment Δm. The value of m may be signaled to the NodeB of the secondary cell. The DPCH frame offset $\tau_{DPCH,n}$ may be signaled from which the default value may be derived at the NodeB of the secondary cell.

The HS-DPCCH transmission timing adjustment Δm may be signaled from the RNC to the WTRU via RRC.

The HS-DPCCH transmission timing adjustment Δm may be signaled separately from the RNC to the NodeB of a serving cell via NBAP.

The WTRU may start transmission of HS-DPCCH at the timing specified by the adjusted value of m.

Figure 36:
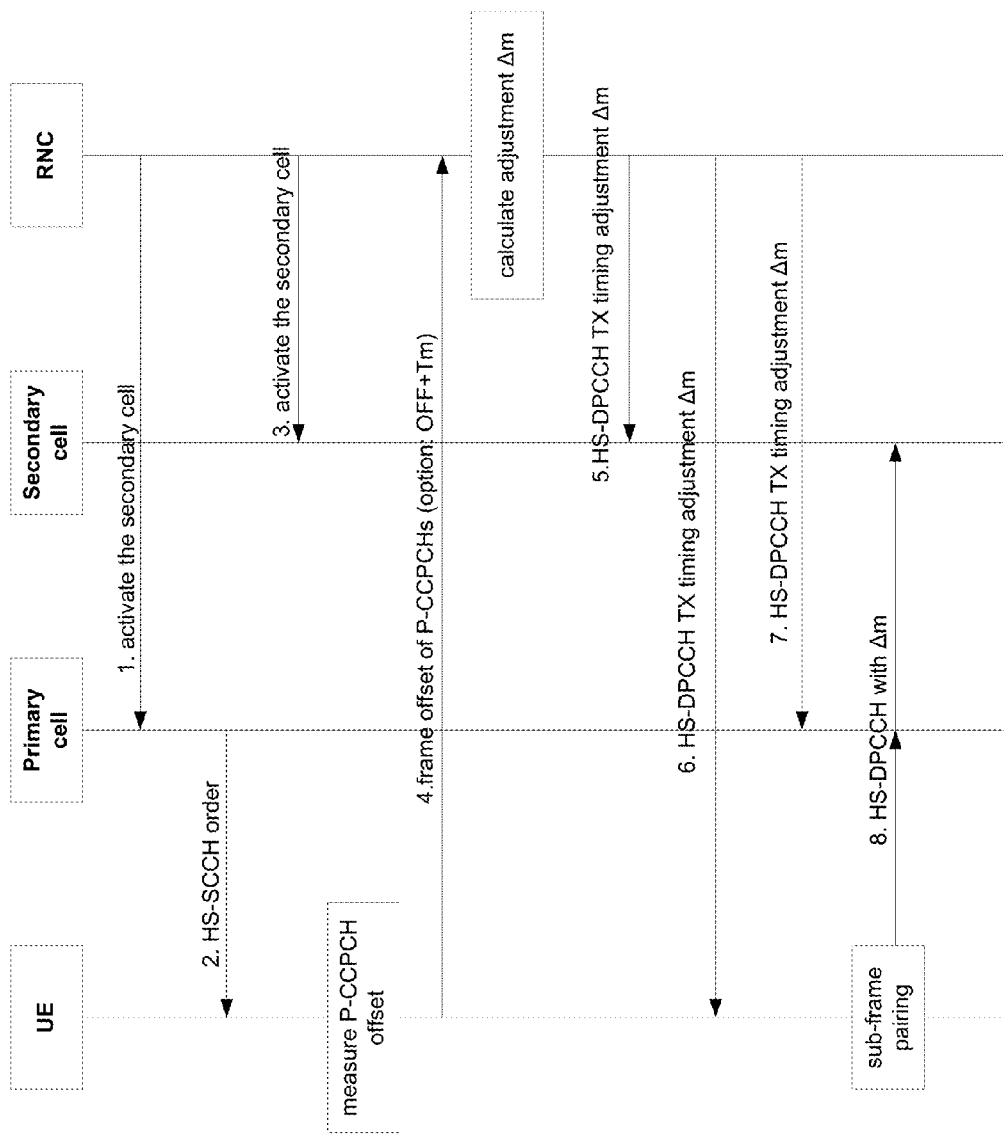
FIG. 36 is a diagram illustrating an example of a HS-DPCCH timing control procedure that may occur at cell activation.

FIG. 36 depicts exemplary HS-DPCCH timing control that may occur at cell activation. When an inactive serving cell is activated by the RNC, the following signaling for the HS-DPCCH timing control may be used, which may be entirely or partially applied in any combination or order.

The RNC may initiate the activation of a secondary serving cell by informing the NodeB of the primary serving cell via NBAP. Upon receiving the cell activation message, the NodeB of primary serving cell may send an HS-SCCH order to activate the secondary serving cell. The RNC may send the cell activation message to the NodeB of the primary serving cell via NBAP. Upon receiving the HS-SCCH order, the WTRU may take measurement of the frame offset of the P-CCPCHs of the two cells and signal the frame offset to the RNC via an RRC message. The frame offset between the P-CCPCH of the secondary cell and DPCH or F-DPCH received from the primary cell may be measured at the WTRU and signaled to the RNC via an RRC message. This offset may be denoted as Tm. From the information provided by the WTRU, the RNC may calculate the HS-DPCCH transmission timing adjustment Δm, which may be signaled to the NodeB of the secondary cell via NBAP. The HS-DPCCH transmission timing adjustment Δm may be signaled from the RNC to a WTRU via RRC. The HS-DPCCH transmission timing adjustment Δm may be signaled separately from the RNC to the NodeB of the primary serving cell via NBAP. The WTRU may start transmission of HS-DPCCH at the timing specified utilizing the adjusted value of m.

If the NodeB of the primary serving cell initiates the cell activation, one or more of the following may be performed. The NodeB of the primary serving cell may initiate the activation by sending a request to the RNC via NBAP. The RNC may acknowledge the request by sending a grant message back to the NodeB of the primary serving cell. The RNC may send a cell activation message to the NodeB of the secondary serving cell. Upon receiving the cell activation message, the NodeB of primary serving cell may send an HS-SCCH order to activate the secondary serving cell.

If the NodeB of the secondary serving cell initiates the cell activation, then one or more of the following may be performed. The NodeB of the secondary serving cell may initiate the activation by sending a request to the RNC via NBAP. The RNC may acknowledge the request by sending a grant message back to the NodeB of the secondary serving cell. The RNC may send a cell activation message to the NodeB of the primary serving cell. Upon receiving the cell activation message, the NodeB of primary serving cell may send an HS-SCCH order to activate the secondary serving cell.

Figure 37:
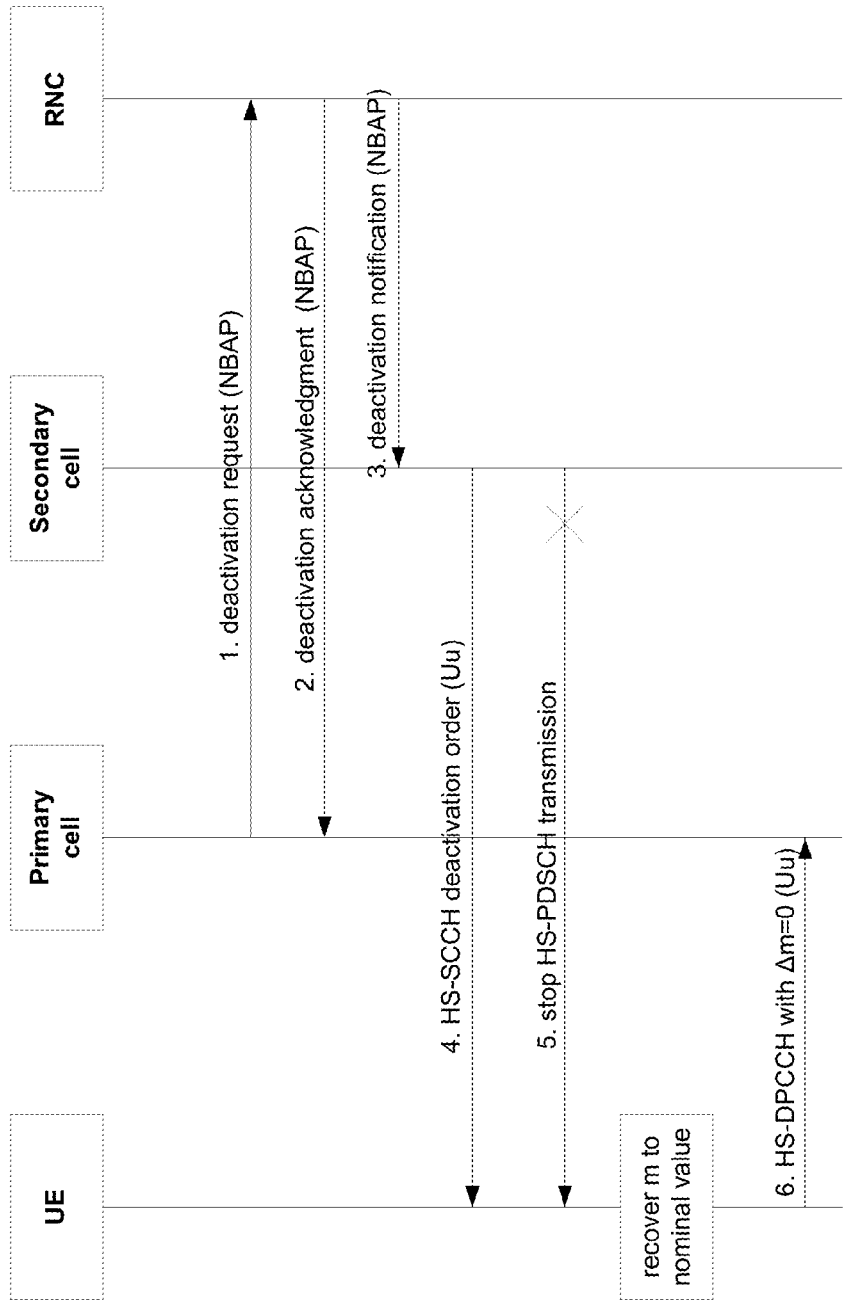
FIG. 37 is a diagram illustrating an example of a HS-DPCCH timing control procedure that may occur when the primary cell initiates the deactivation.

FIG. 37 depicts an example of an HS-DPCCH timing control procedure that may occur when the primary cell initiates the deactivation. When the primary serving cell decides to initiate the deactivation of the secondary cell, the primary serving cell may use the following procedures, which may be used entirely or partially in any combination or order. The primary serving cell may send an NBAP message to the RNC to request deactivation of the secondary serving cell. Upon reception of the deactivation request, the RNC may send an acknowledgement back to the primary serving cell. The RNC may send a NBAP message to the secondary serving cell to notify the deactivation. The secondary cell may send an HS-SCCH deactivation order to the WTRU and/or the primary serving cell. This order may be sent by the primary serving cell. At a specified sub-frame, the secondary cell may stop transmission of the HS-PDSCH data. At a specified subframe, the WTRU may resume the default HS-DPCCH transmission timing (e.g., with $\Delta m=0$).

If the RNC decides to initiate the deactivation, the RNC may send a notification message to the primary serving cell. Upon receiving the HS-SCCH order, HS-DPCCH may resume its default transmission timing without adjustment.

If the secondary serving cell decides to initiate the deactivation of the secondary cell, one or more of the following may be performed. The secondary serving cell may send an NBAP message to the RNC to request deactivation of the secondary serving cell. Upon reception of the deactivation request, the RNC may send an acknowledgement back to the secondary serving cell. The RNC may send an NBAP message to the primary serving cell to notify the deactivation.

Figure 38:
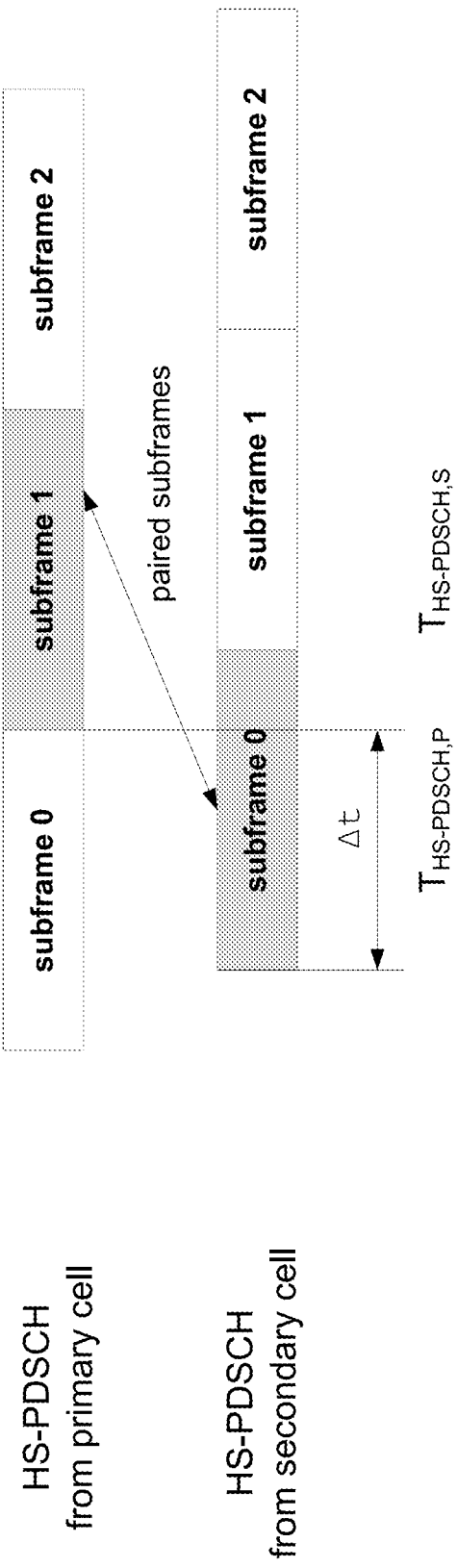
FIG. 38 is a diagram illustrating an example of a subframe pairing if secondary cell may be allowed to have more HARQ processes.

Uplink transmission timing control implementations may be provided when additional HARQ processes are allowed in the secondary cell scheduling. In the timing analysis given above, 6 HARQ processes may be implied. Using an additional number of HARQ processes may impact the peak downlink rate or require more buffer memory at the WTRU and/or the NodeB. The secondary cell may be allowed to schedule its downlink HARQ retransmission with one more additional HARQ process, giving the WTRU and the NodeB more processing time in preparing the HARQ retransmission. Because more processing time may be allowed under this operation mode, a subframe pairing rule may be redesigned for HS-DPCCH transmission. For example, the sub-frames of two cells may be paired if they overlap and the subframe from secondary cell is lagging behind. FIG. 38 may illustrate an example of such a pairing rule.

FIG. 38 depicts an example of a subframe pairing that may be utilized if a secondary cell may be allowed to have more HARQ processes. As shown in FIG. 38, the timing difference of the paired subframes may be a value between 0 and 3 slots. The HARQ feedback information associated with the paired downlink subframes may be combined and/or may be transmitted in the same HS-DPCCH.

Figure 39:
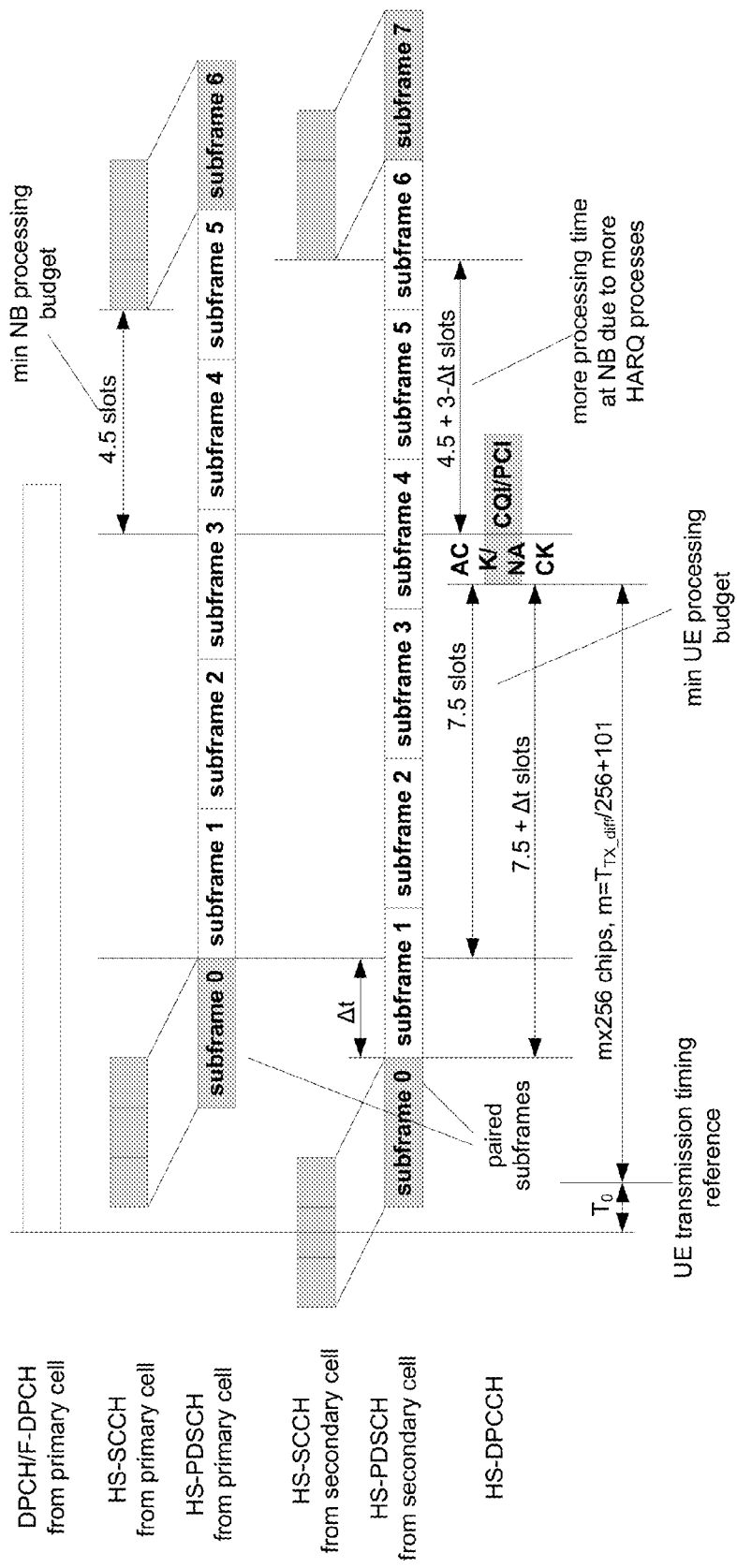
FIG. 39 is a diagram illustrating an example of a HS-DPCCH transmission timing that may be for 7 HARQ processes in a secondary cell.

FIG. 39 depicts an example of an HS-DPCCH transmission timing that may be utilized for 7 HARQ processes in a secondary cell. As shown in FIG. 39, a WTRU processing budget in preparing the corresponding HS-DPCCH for the primary cell may be not impacted (e.g., may be set to approximately 7.5 slots). For a secondary serving cell, the ACK/NACK message for the corresponding paired subframe may be transmitted in the ACK/NACK field of the same HS-DPCCH. Though a WTRU may not impose any processing budget compression for both cells, the HARQ retransmission at a secondary serving cell may not run into a timing budget issue because of its longer timing allowance of 7 HARQ processes. At the primary serving cell, its processing budget may have 4.5 slots (e.g., by design).

Figure 40:
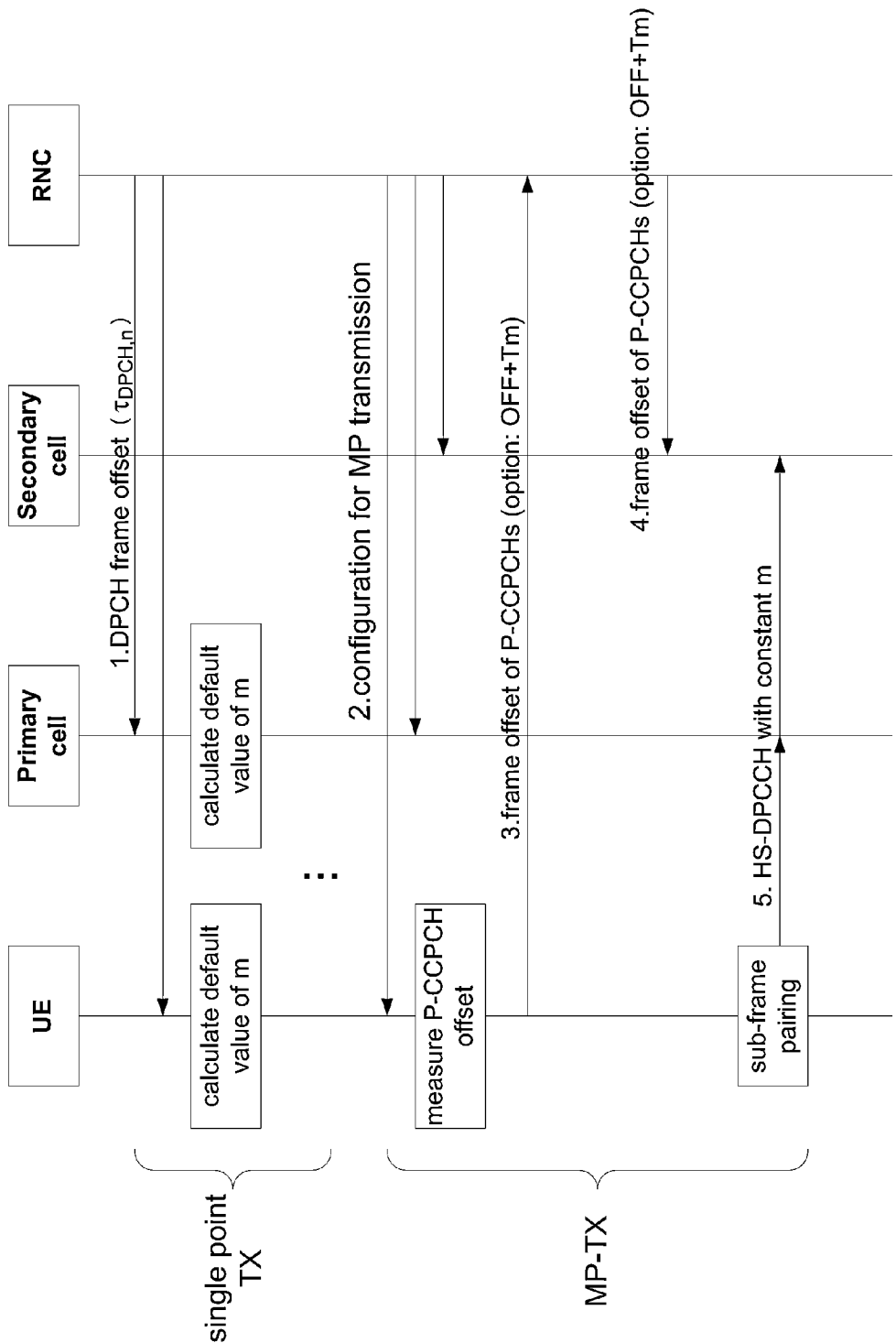
FIG. 40 is a diagram illustrating an example of a procedure that may inform a secondary cell of the transmission timing offset at initial configuration

RRC/NBAP support of HS-DPCCH transmission timing may be provided. FIG. 40 depicts an example to inform a secondary cell of the transmission timing offset at initial configuration. For inter-NodeB deployment, the downlink timing relation of the two cells may not be constant, and the NodeB of secondary cell may experience timing uncertainty in receiving the HS-DPCCH because it may be transmitted with reference to the timing of the primary cell. Informing the secondary NodeB of the timing offset between the downlinks of the two cells may be performed, for example, as follows. A WTRU may take measurement of the frame offset of the P-CCPCHs of the two cells and signal such to the RNC via a RRC message. The frame offset between the P-CCPCH of the secondary cell and DPCH or F-DPCH received from the primary cell may be measured at the WTRU and signaled to the RNC via a RRC message. This offset may be denoted as Tm. The RNC may pass this information to the NodeB of the secondary serving cell, or convert it to the subframe offset by a modulo 3 operation and then may pass it to the NodeB of the secondary serving cell. An example of the above procedure may be illustrated as 3 and 4 of FIG. 40 when multiple point (MP) transmission may be initially configured.

FIG. 40 depicts an example to inform a secondary cell of the transmission timing offset upon activation of the secondary cell. When the secondary cell is activated for MP transmission, the NodeB of the secondary cell may be informed about the offset information, for example, as in 4 and 5 of FIG. 41.

Figure 41:
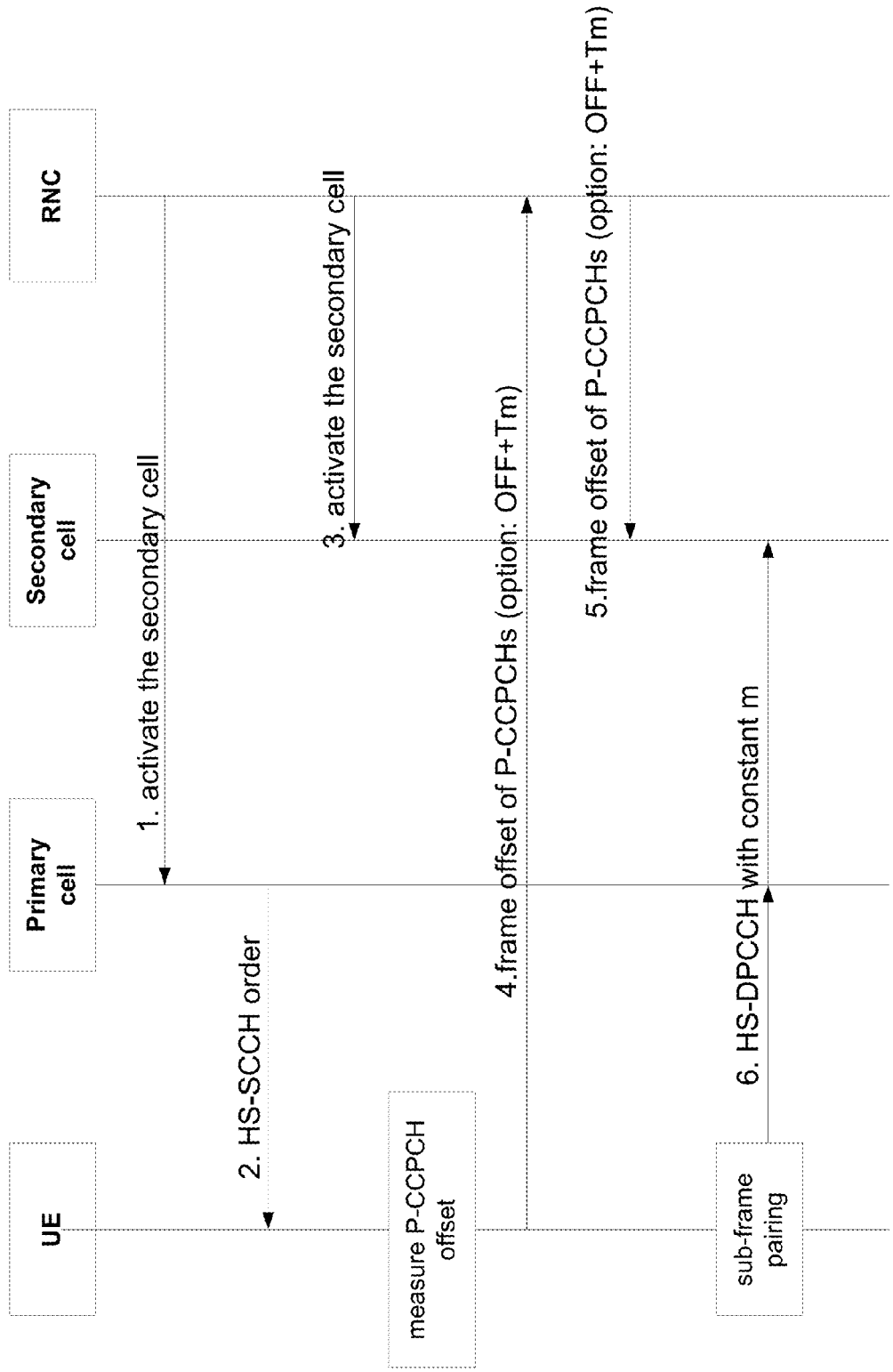
FIG. 41 is a diagram illustrating an example of a procedure that may inform a secondary cell of the transmission timing offset upon activation of secondary cell.

The order of the flows in FIG. 40 and FIG. 41 may be different depending on the implementation and availability of information. For example, measurement of P-CCPCH offset may occur first.

Figure 42:
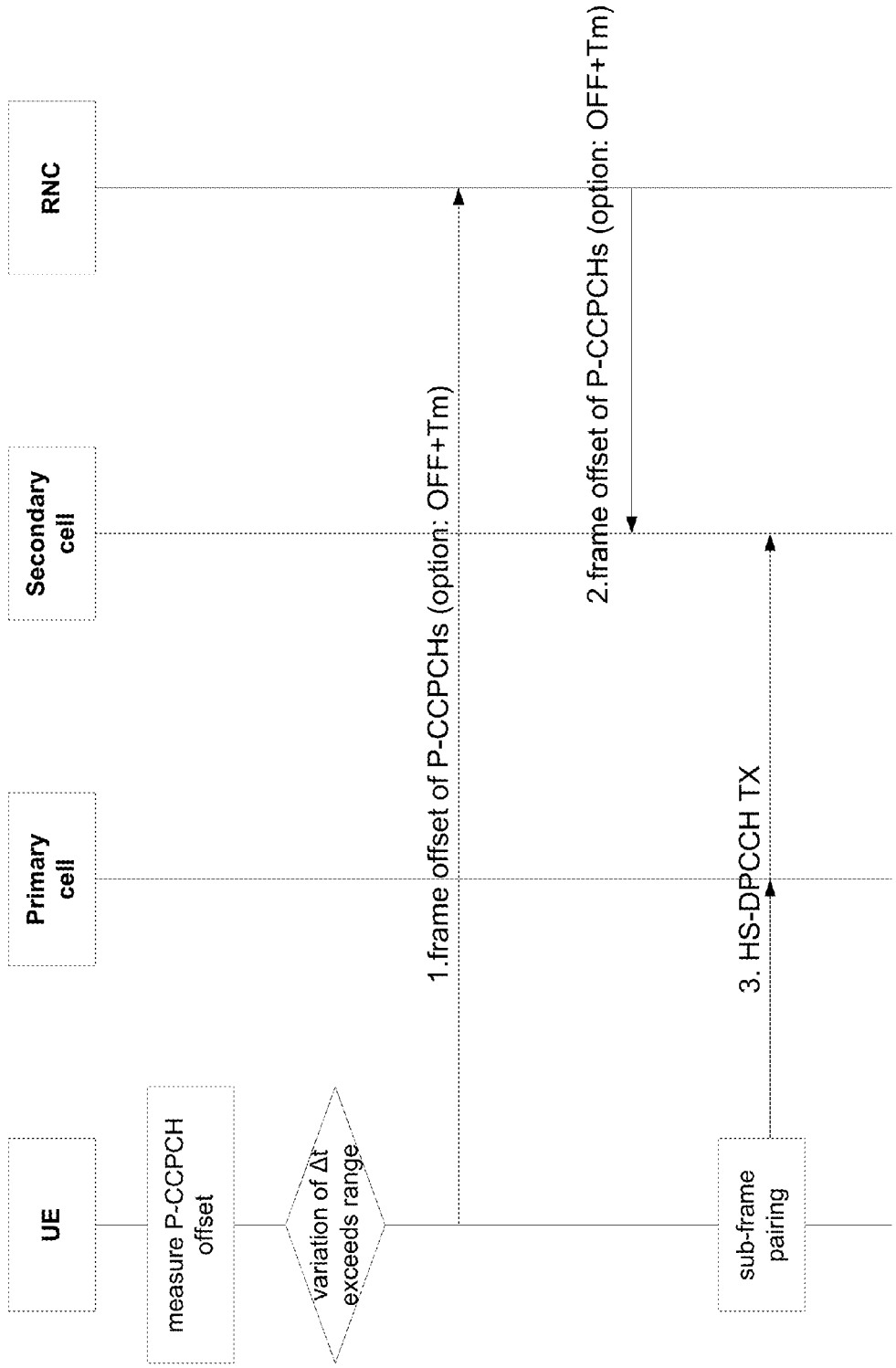
FIG. 42 is a diagram illustrating an example of a procedure that may inform a secondary cell of the transmission timing offset when frame offset varies.

FIG. 42 depicts an example to inform a secondary cell of the transmission timing offset when the frame offset varies. Due to the variation of the timing relation of the two cells, for example, caused by the network clock drift for the inter-NodeB deployment, the frame timing offset may be reported to the NodeB of the secondary cell from time to time for reliable HS-DPCCH decoding demodulation, for example, whenever the timing variation may exceed a certain threshold/range (e.g., a symbol duration). This may be realized in the example shown in FIG. 42, where a WTRU may perform regular measurement of P-CCHCH timing offset between the downlinks of two cells. An RRC message to the RNC may be triggered whenever the variation range may be detected as exceeding a threshold.

If the frame offset variation exceeds the duration of a subframe (e.g., 3 time slots), the subframe pairing may be changed. Otherwise the two subframes may drift away without any overlap. This change of subframe pairing may have to be synchronized between the WTRU and the NodeBs of the MP cells. A pairing change when the WTRU switches the subframe pair may be reported.

Figure 43:
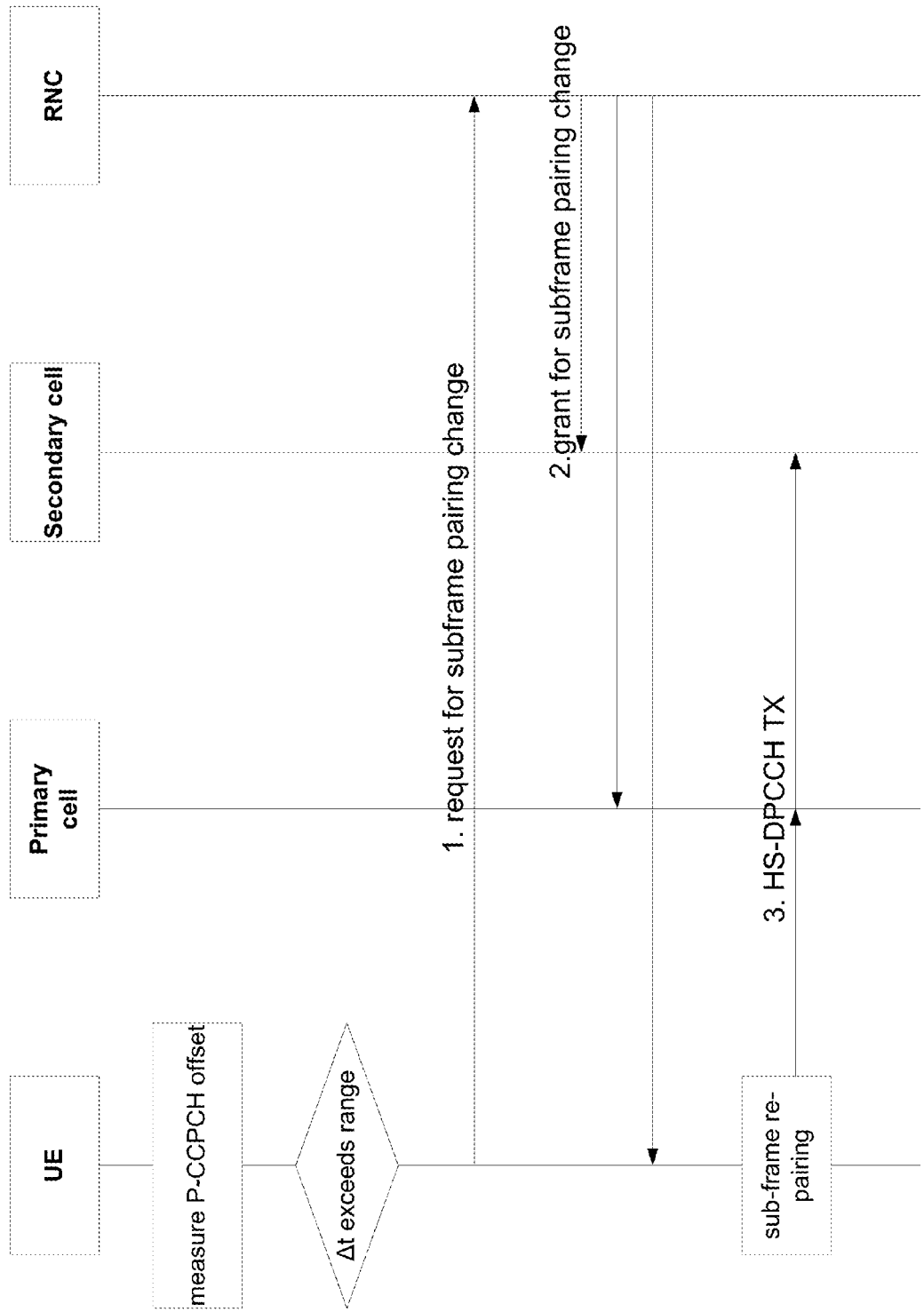
FIG. 43 is a diagram illustrating an example of a grant based procedure that may report a change of subframe pairing.

FIG. 43 depicts grant based reporting of a change of subframe pairing. As shown in FIG. 43, a grant based procedure may be used, where a request for change of subframe pair may be triggered when a WTRU senses the offset of the two paired subframe exceeds a limit (e.g., 3 slots). This request may be sent via RRC to the RNC that may acknowledge the request by sending a grant to the WTRU and/or to the NodeBs of the MP cells. Upon receiving the acknowledgement, the WTRU may take action to switch the subframe pair according to a pairing rule at a specific timing, which may be a subframe number included in the grant command. The WTRU may start a switch of the subframe timing, for example, immediately, with a fixed interval after receiving the RRC grant, etc.

Figure 44:
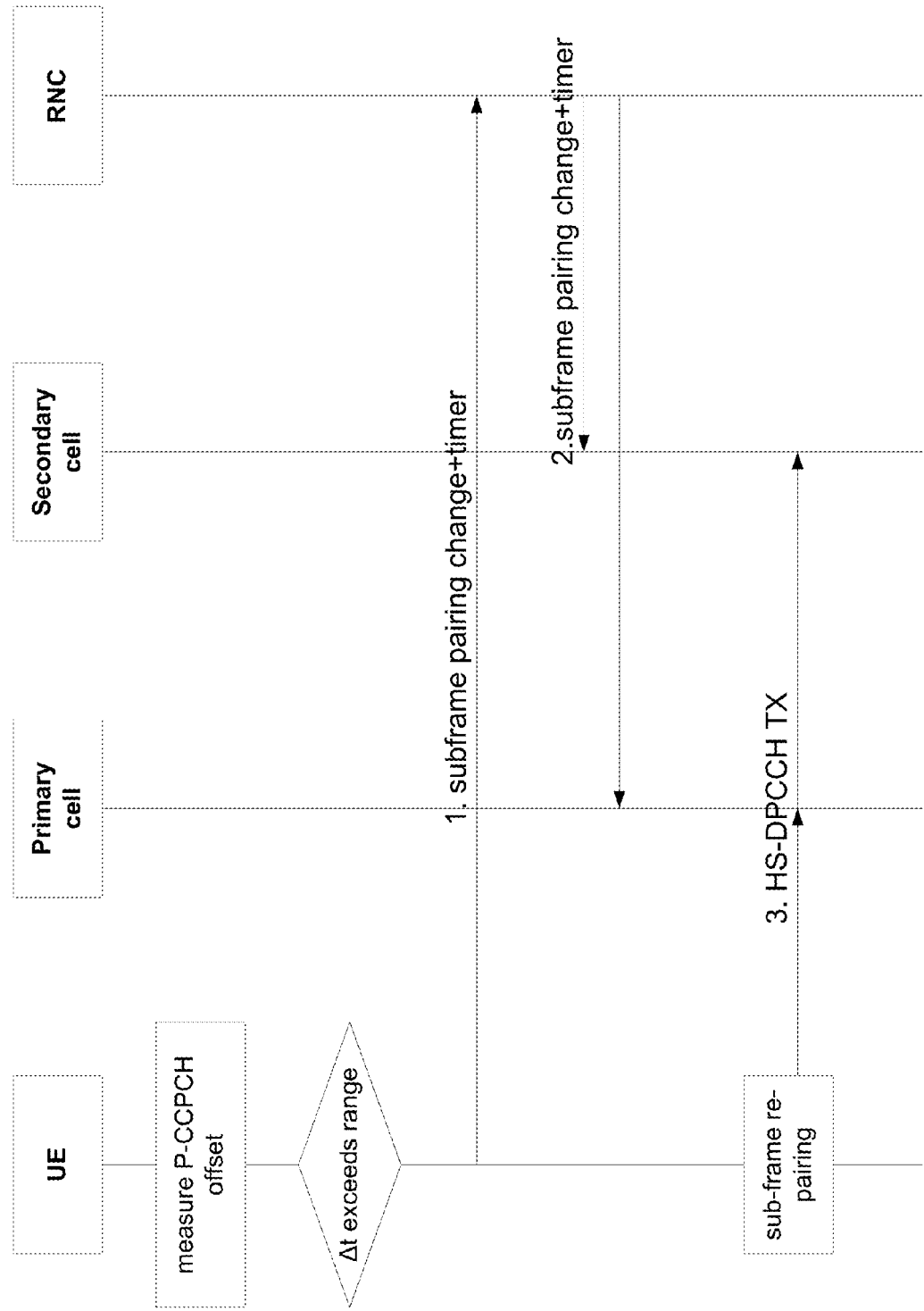
FIG. 44 is a diagram illustrating an example of a timer based procedure to report change of subframe pairing.

A timer based implementation may be disclosed. For example, as shown in FIG. 44, where a WTRU may report to the RNC the change of subframe pair with a timer. This timer may be set as a delay, or a specific subframe number of executing the change action. The RNC may forward the message to the NodeBs of the cells. Though the RRC implementations described herein may describe the RRC/NBAP support to HD-DPCCH transmission under the context of the operation mode with additional HARA processes, the implementations may be utilized in other situations (e.g., the cases described herein). For example, the implementations may be utilized where 6 HARQ processes may be applied and the WTRU may be experiencing a reduction of HARQ processing budget.

Implementations relating to HARQ operation mode selection may be provided. For the HS-DPCCH timing design, a plurality of modes of operation may be described herein. A HARQ operation mode may include 6 HARQ processes for which peak rate may not be impacted but the WTRU may have a processing budget reduction. A HARQ operation mode may comprise one more HARQ process (e.g., 7 total HARQ processes) that may allow the WTRU to have more HARQ processing time.

Depending on the WTRU hardware capability, which may be vendor specific, flexible selection of the modes may be utilized at different types of multiflow operation. The HARQ operation mode may be determined at RRC configuration when the multiflow operation is configured.

Figure 45:
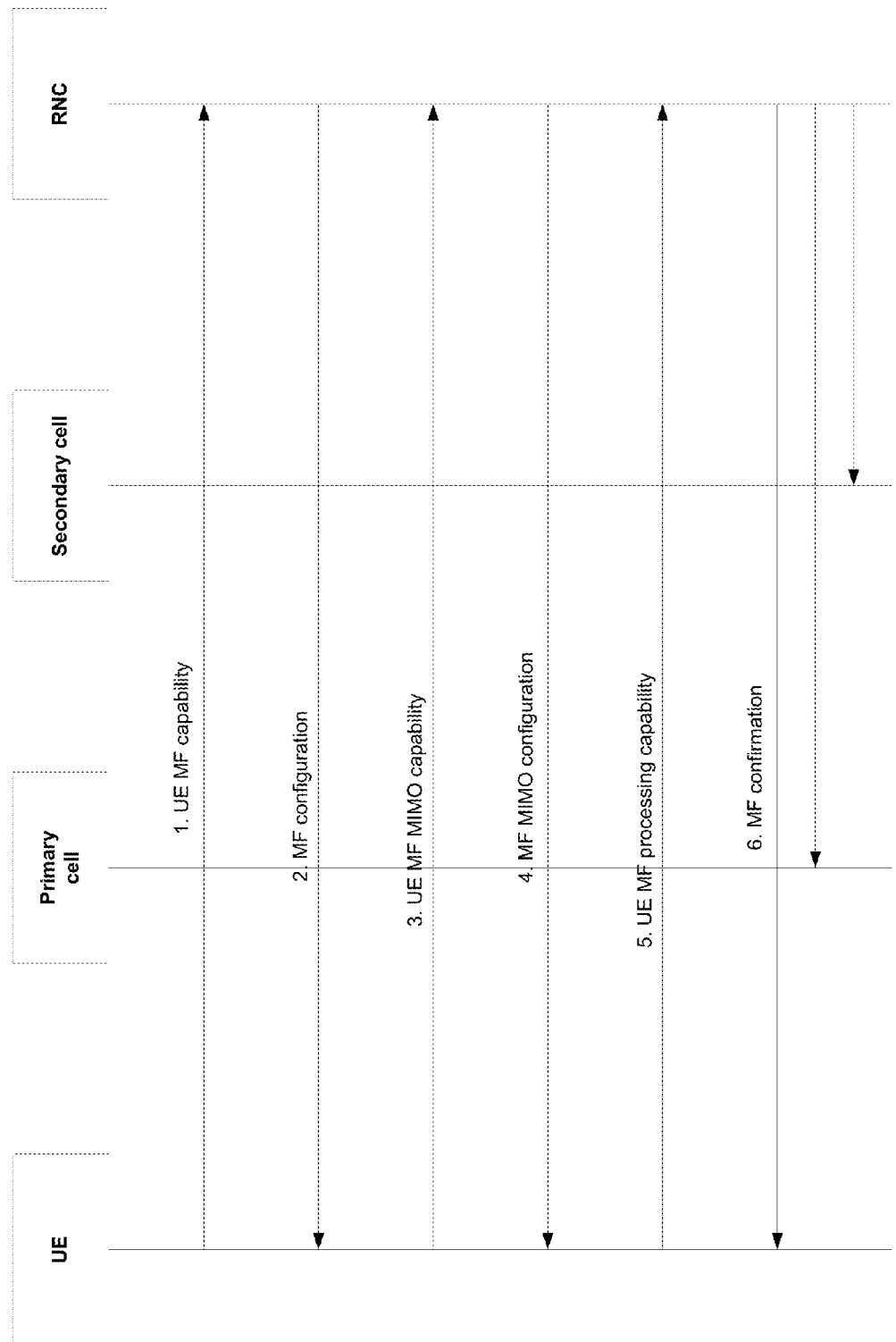
FIG. 45 is a diagram illustrating an example of a procedure that may be used for HARQ operation mode selection.

FIG. 45 depicts exemplary HARQ operation mode selection. When determining the HARQ operation mode, a multiflow configuration procedure may be performed at one or more stages, for example, in order to reduce signaling overhead. For example, an MF type configuration, a MF MIMO configuration, and/or a MF HARQ operation mode selection may be separated and/or may be executed in sequence. The messages in FIG. 45 may be as follows.

A WTRU MF capability may indicate whether the WTRU may be capable of supporting one or more of following multiflow operations. The type of MF operation may include: SF-DC: dual cell multiflow transmission operating in the same frequency; DF-DC: dual cell multiflow transmission operating in different frequencies; DF-3C: three cell multiflow transmission operating in two different frequencies; TF-3C: three cell multiflow transmission operating in three different frequencies; DF-4C: four cell multiflow transmission operating in two different frequencies; TF-4C: four cell multiflow transmission operating in three different frequencies; and/or QF-FC: four cell multiflow transmission operating in four different frequencies.

A WTRU MF MIMO capability may indicate whether the WTRU may be capable of supporting simultaneous multiflow and MIMO operation at the given type of multiflow operation, and/or whether the WTRU may be capable of supporting single stream or dual stream MIMO.

A WTRU MF processing capability may indicate whether the WTRU may be capable of supporting the required type of multiflow operation with normal HARQ operation mode (e.g., with a reduced HARQ processing budget).

An MF configuration may configure the WTRU with a specific type of multiflow operation indicated in WTRU MF capability.

An MF MIMO configuration may configure the WTRU with whether and/or how MIMO may be enabled for multiflow transmission. For example, MIMO operation may not be enabled with multiflow transmission, a single stream MIMO operation may not be enabled with multiflow transmission, and/or a dual stream MIMO operation may be enabled with multiflow transmission.

An MF confirmation may confirm a final selection of the MF HARQ and MIMO operation mode. This decision may be made depending on the network's preference (e.g., whether it has the required memory for increased soft buffer, whether it prefers not to operate with higher number of HARQ processes, etc.). If the network decides not to enable the additional HDARQ operation mode, the MIMO operation may not be enabled even though the WTRU indicates it may be capable of doing so. This message may be sent to the NodeBs of the serving cells via NBAP.

Figure 46:
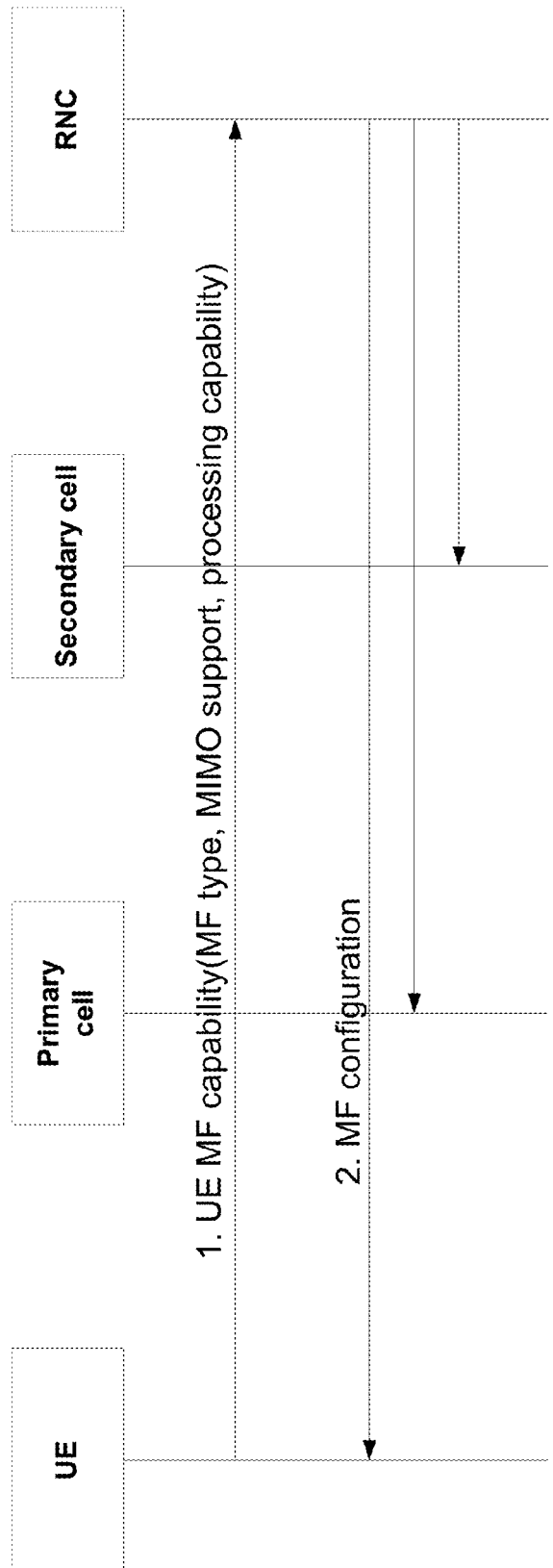
FIG. 46 is a diagram illustrating an example of another procedure that may be used for HARQ operation mode selection.

FIG. 46 depicts exemplary HARQ operation mode selection. WTRU MF MIMO capability and WTRU MF processing capability may be indicated for each type of the MF operations the WTRU supports. The messages of WTRU MF capability, WTRU MF MIMO capability, and WTRU MF processing capability may be combined into a composite message and sent together to the RNC via RRC signaling. Upon receiving the composite WTRU MF capability message, the RNC may configure the WTRU and the NodeBs of the MP cells via the MF configuration message delivering the decision on the type of the multiflow operation, the mode of MIMO operation, and/or the mode of the HARQ operation. Additional signaling overhead may be introduced. The RRC procedure may have less latency, for example, as shown in FIG. 46.

Figure 47:
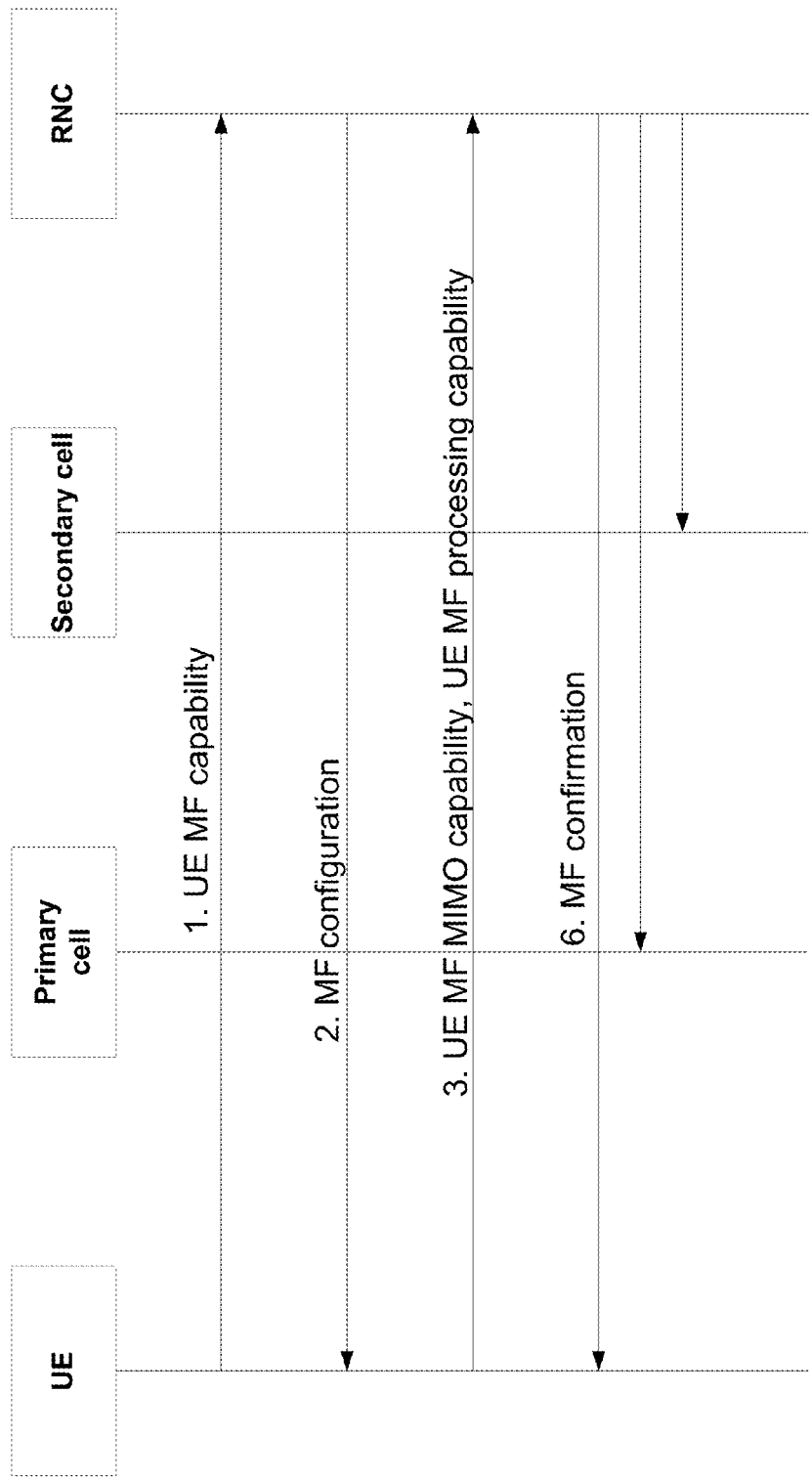
FIG. 47 is a diagram illustrating an example of another procedure that may be used for HARQ operation mode selection.

FIG. 47 exemplary HARQ operation mode selection. The message of WTRU MF MIMO capability and WTRU MF processing capability may be combined into a composite message. The MF type selection may be performed first. Once the type of multiflow operation is decided, the WTRU may indicate its MIMO and HARQ processing capability specifically for the enabled MF type. The network may make a decision on MIMO and HARQ operation in terms of its preference. The network may choose to disable MIMO mode, either single stream or dual stream, if it decides not to support the additional HARQ process. This decision may be sent to the WTRU and to the NodeBs of the MP cells via the MF confirmation message.

Uplink transmission timing control may be provided when dual HS-DPCCH format is used. With use of the dual HS-DPCCH format of uplink feedback, the transmission timing of HS-DPCCH2 may be tracking the downlink of the secondary serving cell such that a substantially constant offset (e.g., 7.5 slots) between the HS-PDSCH and HS-DPCCH subframes may be observed at the NodeB of the secondary serving cell. The HS-DPCCH2 may be aligned in symbol boundary with the other uplink channels to maintain channel orthogonality and allow the NodeB receiver to perform reliable demodulation/decoding with assistance of the pilot signal embedded in UL DPCCH.

Figure 48:
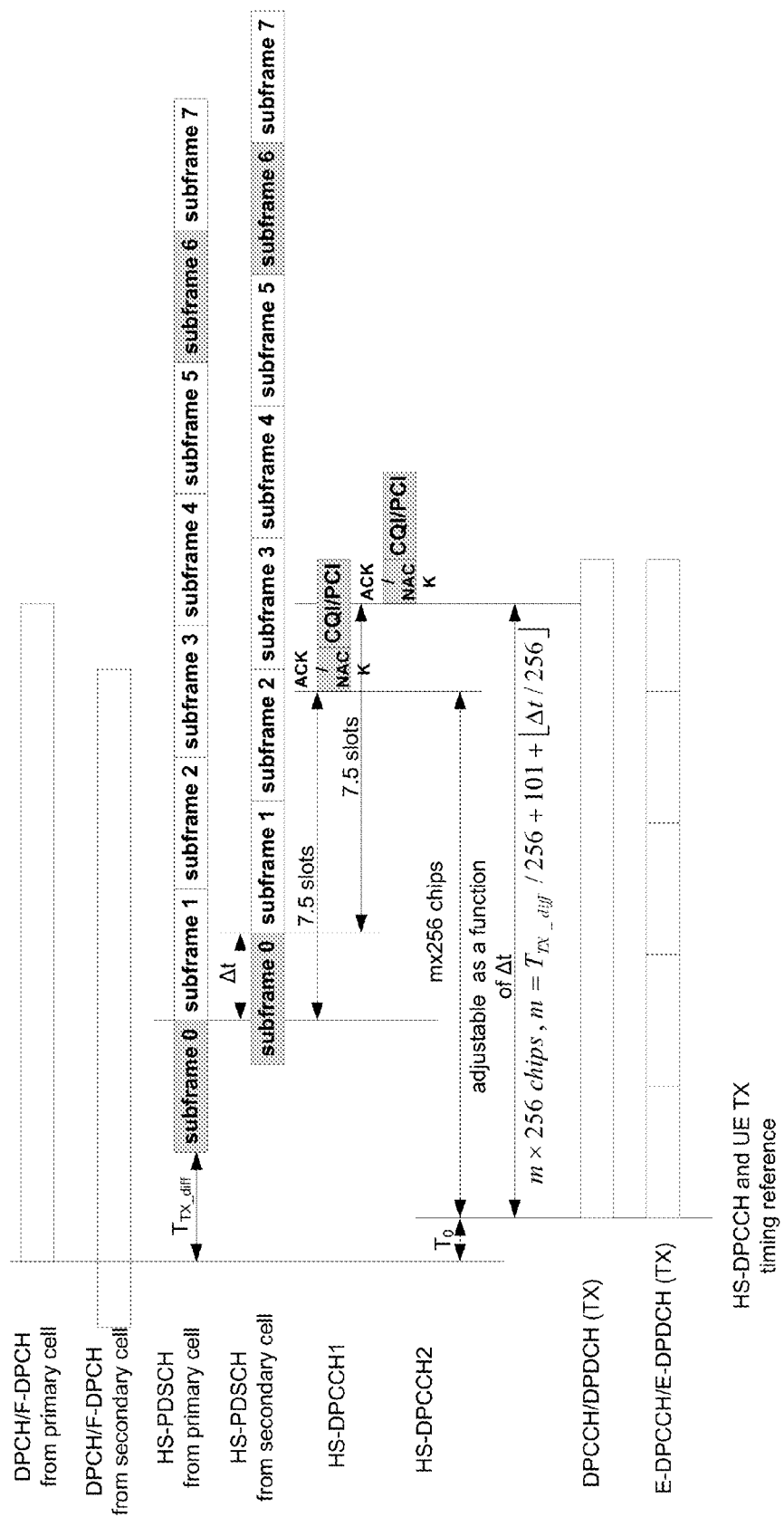
FIG. 48 is a diagram illustrating an example of HS-DPCCH transmission timing for dual channel format.

FIG. 48 (HS-DPCCH transmission timing for dual channel format) is an exemplary HS-DPCCH2 transmission where a common uplink timing reference may be used. The HS-DPCCH2 may be transmitted according to an offset defined by an adjustable m value with reference to the common reference timing. At may be defined as a time offset of two overlapped HS-PDSCH sub-frames from the two cells, with the primary cell being placed first. The amount of adjustment applied to m may be specified as:

$$m = T_{TX\_diff}/256 + 101 + \Delta m$$

$$\Delta m = \lceil \Delta t/256 \rceil$$

The transmission timing for the HS-DPCCH1 may remain the same (e.g., may use a fixed m value.

The HS-DPCCH2 timing adjustment may be informed to the NodeB of the secondary serving cell at initial MP configuration and cell activation. When the network clock drifts, it may be updated. Similar RRC/NBAP signaling as described herein may be applied to synchronize the WTRU and the NodeB of secondary serving cell, for example, with corresponding modifications.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method comprising:
transmitting, with a wireless transmit/receive unit (WTRU), first uplink data on a high speed dedicated physical control channel (HS-DPCCH) to a first serving cell and a second serving cell, wherein the first serving cell is used as a timing reference cell;
receiving first downlink data from the first serving cell and second downlink data from the second serving cell;
changing a timing reference for uplink transmission such that the second serving cell is the timing reference cell; and
transmitting second uplink data on the HS-DPCCH to the first serving cell and the second serving cell using the second serving cell as the timing reference cell.

2. The method of claim 1, wherein the first serving cell is associated with a first NodeB and the second serving cell is associated with a second NodeB.

3. The method of claim 1, wherein reception of a primary common control physical channel (P-CCPCH) of the timing reference cell serves as a reference for the WTRU for transmission timing of uplink data on the HS-DPCCH.

4. The method of claim 1, wherein the second downlink data is received prior to the first downlink data.

5. The method of claim 1, wherein a subframe of the first downlink data is offset from a subframe of the second downlink data.

6. The method of claim 5, further comprising:
pairing the subframe of the first downlink data with the subframe of the second downlink data such that there is a substantially maximized overlap between the subframe of the first downlink data and the subframe of the second downlink data.

7. The method of claim 5, wherein, prior to changing the timing reference, a paired subframe of the second serving cell is received prior to a paired subframe of the first serving cell.

8. The method of claim 1, wherein the first uplink data and the second uplink data comprises one or more of a HARQ-ACK, a HARQ-NACK, or CQI data.

9. The method of claim 1, wherein the first uplink data comprises first feedback data for the first serving cell and the second uplink data comprises second feedback data for the second service cell, and wherein the first feedback data and the second feedback data are allocated into separate fields of the HS-DPCCH based on NodeB destination.

10. The method of claim 9, wherein the separate fields have different transmit power.

11. The method of claim 1, wherein transmission timing for an uplink dedicated physical control channel (DPCCH) is not changed.

12. The method of claim 1, wherein the changed timing reference is based on a timing offset of the first downlink data or the second downlink data.

13. The method of claim 1, further comprising:
receiving an radio resource control (RRC) message, wherein the RRC message indicates that the second serving cell is the timing reference cell.

14. The method of claim 13, wherein the RRC message is received prior to changing the timing reference for uplink transmission from the first serving cell to the second serving cell.

15. A wireless transmit/receive unit (WTRU) comprising:
a processor configured to:
transmit first uplink data on a high speed dedicated physical control channel (HS-DPCCH) to a first serving cell and a second serving cell, wherein the first serving cell is used as a timing reference cell;
receive first downlink data from the first serving cell and second downlink data from the second serving cell;
change timing reference for uplink transmission such that the second serving cell is the timing reference cell; and
transmit uplink data on the HS-DPCCH to the first serving cell and the second serving cell using the second serving cell as the timing reference cell.

16. The WTRU of claim 15, wherein the first serving cell is associated with a first NodeB and the second serving cell is associated with a second NodeB.

17. The WTRU of claim 15, wherein reception of data on a primary common control physical channel (P-CCPCH) of the timing reference cell serves as a reference for the WTRU for transmission timing of uplink data on the HS-DPCCH.

18. The WTRU of claim 15, wherein the processor receives the second downlink data prior to the first downlink data.

19. The WTRU of claim 15, wherein a subframe of the first downlink data is offset from a subframe of the second downlink data.

20. The WTRU of claim 19, wherein the processor is further configured to:
pair the subframe of the first downlink data with the subframe of the second downlink data such that there is a substantially maximized overlap between the subframe of the first downlink data and the subframe of the second downlink data.

21. The WTRU of claim 20, wherein, prior to changing the timing reference, the processor receives a paired subframe of the second serving cell prior to a paired subframe of the first serving cell.

22. The WTRU of claim 15, wherein the first uplink data and the second uplink data comprises one or more of a HARQ-ACK, a HARQ-NACK, or CQI data.

23. The WTRU of claim 15, wherein the first uplink data comprises first feedback data for the first serving cell and the second uplink data comprises second feedback data for the second serving cell, and wherein the processor is further configured to allocate the first feedback data and the second feedback data into separate fields of the HS-DPCCH based on NodeB destination.

24. The WTRU of claim 23, wherein the separate fields have different transmit power.

25. The WTRU of claim 15, wherein the processor does not change transmission timing for an uplink dedicated physical control channel (DPCCH) when changing the timing reference for uplink transmission.

26. The WTRU of claim 15, wherein the processor is configured to change the timing reference for uplink transmission based on a timing offset of the first downlink data or the second downlink data.

27. The WTRU of claim 15, wherein the processor is configured to receive an radio resource control (RRC) message, wherein the RRC message indicates that the second serving cell is the timing reference cell.

28. The WTRU of claim 27, wherein the processor is configured to receive the RRC message prior to changing the timing reference for uplink transmission from the first serving cell to the second serving cell.

* * * * *